(12) United States Patent
David et al.

(10) Patent No.: US 10,817,104 B2
(45) Date of Patent: Oct. 27, 2020

(54) TOUCH SENSOR DEVICE AND METHOD

(71) Applicant: 1004335 Ontario Inc., Ottawa (CA)

(72) Inventors: Albert M. David, Ottawa (CA);
Gueorgui Pavlov, Ottawa (CA);
Robert Donald McCulloch, Ottawa (CA)

(73) Assignee: 1004335 Ontario Inc., Ottawa (CA)

( * ) Notice: Subject to any disclaimer, the term of this patent is extended or adjusted under 35 U.S.C. 154(b) by 0 days.

(21) Appl. No.: 15/752,724

(22) PCT Filed: May 19, 2017

(86) PCT No.: PCT/CA2017/050606
§ 371 (c)(1),
(2) Date: Feb. 14, 2018

(87) PCT Pub. No.: WO2017/219124
PCT Pub. Date: Dec. 28, 2017

(65) Prior Publication Data
US 2019/0102033 A1    Apr. 4, 2019

Related U.S. Application Data

(63) Continuation of application No. 15/190,329, filed on Jun. 23, 2016, now abandoned.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *G06F 2203/04104* (2013.01); *G06F 2203/04112* (2013.01)

(58) Field of Classification Search
None
See application file for complete search history.

(56) References Cited

U.S. PATENT DOCUMENTS

| | | |
|---|---|---|
| 8,547,118 B1 | 10/2013 | Vojjala |
| 2013/0033450 A1 | 2/2013 | Coulson et al. |

(Continued)

FOREIGN PATENT DOCUMENTS

| | | |
|---|---|---|
| WO | WO2013016765 A1 | 2/2013 |
| WO | WO2015115307 A1 | 8/2015 |

OTHER PUBLICATIONS

Walker, Geoff, "Fundamentals of Projected Capacitive Touch Technology", presentation, Jun. 1, 2014.

(Continued)

*Primary Examiner* — Brian M Butcher
(74) *Attorney, Agent, or Firm* — Maschoff Brennan

(57) ABSTRACT

A common capacitive touch sensor may have a two dimensional array of transparent conductive strips going from edge to edge on a substrate layer or sheet of a touch sensor. According to some aspects, there is provided a capacitive touch sensor device including a substrate layer and a plurality of resonant circuits. Each resonant circuit includes an electrode, and each resonant circuit has a respective resonance frequency that is unique within the plurality of resonant circuits. The electrodes of the resonant circuits are distributed on the substrate layer. A controller for a touch sensor is also provided that includes a signal generator to drive at least one plurality of resonant circuits, where each resonant circuit has a respective resonance frequency. The signal generator is tunable to generate input signals at each of the resonance frequencies. The controller also includes a detector.

18 Claims, 16 Drawing Sheets

(56) References Cited

U.S. PATENT DOCUMENTS

| | | |
|---|---|---|
| 2013/0207911 A1 | 8/2013 | Barton et al. |
| 2014/0092056 A1* | 4/2014 | Jhou ...................... G06F 3/044 345/174 |
| 2015/0041302 A1 | 2/2015 | Okumura et al. |
| 2015/0241924 A1 | 8/2015 | Chang et al. |
| 2016/0018940 A1 | 1/2016 | Lo et al. |

OTHER PUBLICATIONS

Wang et al., "Multi-Channel Capacitive Sensor Arrays", Sensors, vol. 16, issue 150, Jan. 25, 2016.
International Search Report and Written Opinion dated Apr. 8, 2019, in PCT Application No. PCT/CA2018/051644.
International Search Report and Written Opinion dated Mar. 11, 2019, in PCT Application No. PCT/CA2018/051645.
Wang et al., Multi-Channel Capacitive Sensor Arrays, Sensors 2016, 16, 150; doi:10.3390/s16020150.

* cited by examiner

TOUCH SENSOR DEVICE AND METHOD

FIELD OF THE DISCLOSURE

The present disclosure relates generally to capacitive touch sensing technology, and more particularly to Radio Frequency (RF) touch sensing devices.

BACKGROUND

Of various interfaces available for interacting with a computer system, one of the easiest to use and understand is the touchscreen. This technology allows a user to simply touch an icon or picture to navigate through the system, display the information the user is seeking, and to enter data. For this reason, this technology is widely used in many applications, including desktop computers, tablet computers, mobile devices, bank machines, information kiosks, restaurants, cars, navigation systems, etc.

A number of different conventional touchscreen technologies exist. These methodologies include resistive, capacitive, surface acoustic wave, infrared, and optical touchscreen technology.

A common capacitive touch sensor (e.g. for a touchscreen) has a two dimensional array (e.g. criss-cross) of transparent conductive strips going from edge to edge on a substrate layer or sheet of a touch sensor. A number of conductor lines connect the strips to the inputs of a microcontroller. The transparent conductive stripes are typically made of indium-tin-oxide (ITO). Alternatively, a thin metal mesh may be deposited on a glass substrate. Each conductive strip may form a capacitor of around 50-200 pF in value, for example. A protective top layer of glass or plastic will typically cover the substrate layer and the conductive strips. When a human finger (or another member with a conductive surface) is applied over one of the conductive strips, the capacitance of this strip with respect to ground changes, and this change in capacitance is detectable. For example, the capacitance for the strip may increase by a value of 10 to 30 pF. Thus, by monitoring each conductive strip, it can be determined where the sensor was touched. For two-dimensional sensing, two overlapping sets of strips in perpendicular directions may be monitored, thereby allowing for determination of the position of the touch in two dimensions.

Conventional capacitive touch sensors may use self-capacitance or mutual capacitance. In self-capacitance touch sensors, the capacitance of each electrode strip is detected separately. In mutual capacitance touch sensors, the mutual capacitance between two electrode strips (e.g. two perpendicular channels) is detected. For example, in a grid of horizontal and vertical electrodes, the mutual capacitance at each intersection of the horizontal and vertical electrodes is monitored.

One method of detecting changes in capacitance is by individually monitoring resonant circuit outputs for changes. A radio frequency (RF) touch sensors may employ a plurality of resonant circuits, each including of inductor and capacitor (LCR circuit). The properties of such LCR resonant circuits, consisting of a series or parallel connection of inductor and capacitor, are well known. If an RF modulated voltage is applied, the impedance of an LCR resonant circuit depends on the frequency of the applied signal. The LCR resonant circuit has a resonance frequency that are a function of the inductance value of the inductor and the capacitance value of the capacitor. When the capacitance of a resonant circuit (or the mutual capacitance of a pair of perpendicular electrodes of two resonant circuits) changes, the resonant frequency for that circuit also changes. Thus, a change in the voltage at a test point on the resonant circuit may be detected due to the impedance change.

A resonant circuit including one or more electrode strips deposited on a substrate may commonly be referred to as a "channel". A conventional capacitive touch sensor may include multiple channels, each with the same resonant frequency. The multiple channels are typically sequentially scanned. Scanning is typically accomplished by sequentially driving electrodes of the channels with an input signal at the resonant frequency. This scanning method requires an input of each channel to be individually and separately connected to the input signal source so that the channels can be individually and separately driven. The channels must also have outputs individually connected to a detector. A controller including an input signal source and a detector typically controls the scanning process by selectively driving and measuring the output of the channels. As sensor size and/or resolution of the sensor increases, so does the number of electrodes and circuits being scanned. This, in turn, increases the number of connections that must be made between the inputs and outputs of the channels the controller. The high number of connections can take up substantial room on the substrate and also increases the number of wires or other connections between the touch sensor panel itself and the controller.

Another disadvantage of conventional capacitive touch sensors arises from the number of inputs and outputs being dependent on the number of channels included in the sensor. Different controllers and/or controller configurations may be needed to control different sensor devices due to the varying number of inputs and outputs that must be connected and managed. Controller complexity and cost may increase with a higher numbers of channels.

SUMMARY

According to one aspect, there is provided a capacitive touch sensor device comprising: a substrate layer; and a plurality of resonant circuits, each comprising at least one respective electrode, the electrodes of the plurality of resonant circuits being distributed on the substrate layer, and each of the plurality of resonant circuits having a respective resonance frequency that is unique within the plurality of resonant circuits.

In some embodiments, the capacitive touch sensor further comprises, a respective circuit input and a respective circuit output, the plurality of resonant circuits being collectively connected to the respective circuit input and collectively connected to the respective circuit output.

In some embodiments, for each said resonant circuit, the at least one respective electrode comprises at least one electrode strip.

In some embodiments, the at least one electrode strip comprises a first electrode strip and a second electrode strip parallel to and spaced apart from the first electrode strip.

In some embodiments, the capacitive touch sensor further comprises, a signal generator that selectively generates signals at each of the resonance frequencies to drive the plurality of resonant circuits.

In some embodiments, the capacitive touch sensor further comprises, a detector that measures output of the plurality of resonant circuits.

In some embodiments, the capacitive touch sensor further comprises, a processor that controls the tunable signal generator and the detector to scan the plurality of resonant circuits, said scanning comprising sequentially generating the signals at each of the resonant frequencies, and measuring the output of the plurality of resonant circuits.

In some embodiments, the capacitive touch sensor further comprises, a respective circuit input and a respective circuit output, the plurality of resonant circuits being collectively connected to the respective circuit input and collectively connected to the respective circuit output, wherein the touch sensor device comprises a controller that comprises the signal generator, the detector and the processor, the controller being connected to said circuit input to drive the plurality of resonant circuits with the signals, and the controller being connected to said circuit output for the detector to measure the output of the plurality of resonant circuits.

In some embodiments, the capacitive touch sensor further comprises, at least one additional plurality of resonant circuits, each resonant circuit of the at least one additional plurality of resonant circuits comprising at least one respective electrode, the electrodes of the at least one additional plurality of resonant circuits being distributed on the substrate layer, wherein for each said additional plurality of resonant circuits, each said resonant circuit of the additional plurality has a respective resonance frequency that is unique within the additional plurality of resonant circuits.

In some embodiments, the capacitive touch sensor further comprises: a signal generator that selectively generates signals at each of the resonance frequencies of the pluralities of resonant circuits; a detector that measures output of each of the pluralities of resonant circuits; and switching circuitry connected to the signal generator for selectively driving the pluralities of resonant circuits with the signals.

In some embodiments, the capacitive touch sensor further comprises, a processor that controls the signal generator, the detector and the switching circuitry to scan each of the pluralities of resonant circuits, said scanning comprising, for each plurality of resonant circuits, sequentially generating the signals at each of the respective resonant frequencies, and measuring the output of the plurality of resonant circuits.

In some embodiments, at least one of the resonant frequencies for at least two of the pluralities of resonant circuits are substantially similar.

In some embodiments, the detector comprises at least one of: an analog to digital converter (ADC); and a comparator.

In some embodiments, the detector comprises at least one of: an analog to digital converter (ADC); and a comparator.

In some embodiments, each resonant circuit comprises a respective capacitor having a respective capacitance value and a respective inductor having a respective inductance value, a combination of the respective capacitance value and the respective inductance value being unique within the plurality of resonant circuits.

In some embodiments, the inductors of the plurality of resonant circuits are planar inductors, each planar inductor comprising at least one respective conductor layer deposited on the substrate layer.

In some embodiments, for each said planar inductor, the at least one respective conductor layer comprises at least one spiral shaped inductor coil.

In some embodiments, the resonant frequencies of the at least one plurality of resonant circuits are in the Radio Frequency (RF) range, and the signal generator is a tunable RF signal generator.

According to another aspect, there is provided a method for a capacitive touch sensor comprising at least one plurality of resonant circuits, each plurality of resonant circuits having a respective plurality of resonance frequencies, the method comprising: for each said at least one plurality of resonant circuits: sequentially generating signals at each of the respective plurality of resonance frequencies for driving the plurality of resonant circuits; and measuring an output of the plurality of resonant circuits.

In some embodiments, said sequentially generating comprises selectively generating signals at each of the respective plurality of resonance frequencies in a cyclic or random hopping pattern.

According to another aspect, there is provided a controller for a capacitive touch sensor comprising at least one plurality of resonant circuits, each plurality of resonant circuits having a respective plurality of resonance frequencies, the controller comprising: a signal generator to drive the at least one plurality of resonant circuits, the signal generator being tunable to selectively generate signals at each of the resonance frequencies for driving the at least one plurality of resonant circuits; and a detector to measure output the at least one plurality of resonant circuits.

In some embodiments, the controller further comprises a processor that controls the signal generator and the detector to scan the at least one plurality of resonant circuits, said scanning comprising, for each said plurality of resonant circuits, sequentially generating the signals at each of the resonant frequencies, and measuring the output of the plurality of resonant circuits.

In some embodiments, the controller further comprises switching circuitry connected to the signal generator for selectively driving the at least one plurality of resonant circuits with the signals.

In some embodiments, the controller further comprises at least one output, each said at least one output for connecting to a corresponding input of a respective one of the at least one plurality of resonant circuits.

In some embodiments, the detector comprises at least one of: an analog to digital converter (ADC); and a comparator.

According to an aspect, the present disclosure provides an apparatus comprising: a radio frequency device; a dielectric substrate layer, such as glass; a first conductive layer such as an ITO layer, a mesh metal layer, or other transparent or translucent conductive material forming strips on the dielectric substrate; another dielectric substrate layer with a second conductive layer forming strips thereon; the strips of the first and second conductive layers forming a criss-cross system; a number of capacitors and inductors connected in pairs around the periphery of the dielectric substrate layers, each pair including one of the conductors and one of the inductors in series or in parallel, and each pair connected to a respective strip to form a respective resonant circuit comprising, the resonant circuits collective connected to an input and an output.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which.

DETAILED DESCRIPTION

The present disclosure provides a capacitive sensing apparatus and method, which may be used for touch sensor panels (e.g. a touchscreen) that may be engaged with a finger or fingers, or any other conductive object such as a stylus. The touch sensor may implement one-dimensional or two-dimensional sensing.

While the embodiments shown in the figures and described below are capacitive touch sensors operating in the RF range, aspects of the disclosure may also be implemented in non-RF touch sensors.

Figure 1:
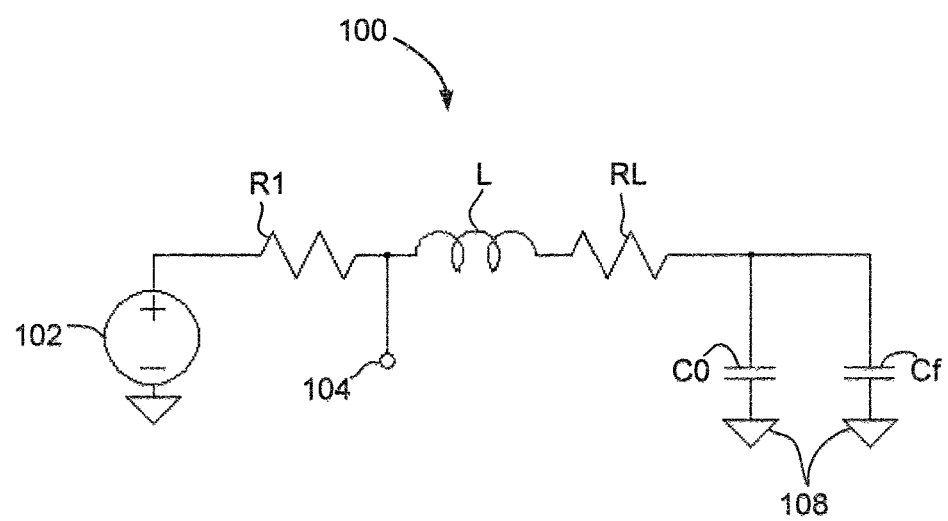
FIG. 1 is a schematic diagram of an example serial LCR resonant circuit.

FIG. 1 is a schematic diagram of an example serial LCR resonant circuit 100. The circuit 100 consists of a fixed resistor R1, a fixed inductor L, a fixed capacitor C0, a variable capacitance Cf, and an RF signal input 102. The fixed resistor R1, the fixed inductor L0 and the fixed capacitor C0 are connected in series between the RF signal input 102 and ground 103. The fixed capacitor C0 is connected to ground 108. The variable capacitance Cf is connected in parallel with the fixed capacitor C0 and represents additional capacitance induced by an external conductive object like a human finger touching the circuit 100. The fixed capacitor C0 represents the capacitance of an ITO strip or a mesh metal deposit on a glass substrate and an additional external capacitance. The value of the induced variable capacitance Cf is typically around 10 pF. The variable capacitance Cf will not be present in the absence of touch. The value of the fixed capacitor C0 may be set, for example, at a value not more than ten times the variable capacitance Cf. In this example, the fixed capacitor C0 is set at 100 pF. The value of the fixed inductance in this example is 10 µH, such that the resonance frequency is in the single digit megahertz range. FIG. 1 shows also a series resistor RL, which represents resistance of the inductor and other parasitic resistive losses. The resistance RL in this example is assumed to be 3 ohm in this example. The fixed resistor R1 is 100 ohm in this example. Of course, values of the resistors, capacitors, and inductors of LCR resonant circuits used in a touch sensor may vary. The specific values provided above are only by way of example. An output point 104 of the circuit 100 is also shown in FIG. 1.

Figure 2:
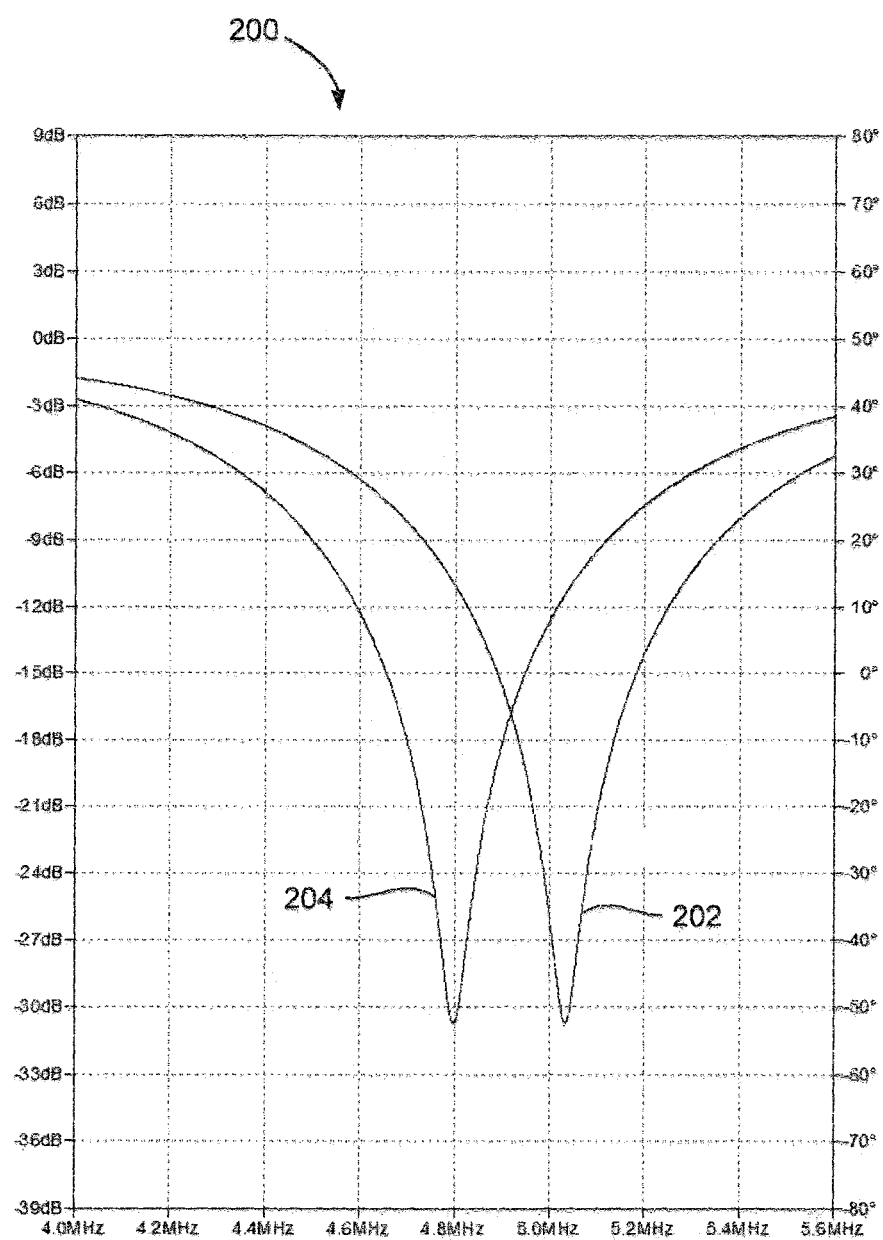
FIG. 2 is a graph of first and second simulated frequency response curves of the LCR resonant circuit of FIG. 1.

FIG. 2 is a graph 200 of first and second simulated frequency response curves 202 and 204 of the circuit 100 of FIG. 1 taken at the output point 104. The first curve 202 shows the frequency response of the circuit with no touch (i.e. without the variable capacitance Cf). The second curve 204 shows the frequency response of the circuit including the variable capacitance Cf during a touch event. As shown in FIG. 2, the first curve 202 is an upside down bell shape curve with the peak resonance frequency of 5.05 MHz. In this example, the resonance frequency goes down to 4.8 MHz when the variable capacitor (from touch) is connected. As shown in FIG. 2, if the frequency of the input signal is continuously 5.05 MHz, and the circuit is touched, the input impedance of the circuit 100 at that frequency increases (because the resonance frequency has changed) and the voltage amplitude at the output point 104 (shown in FIG. 1) will rise. FIG. 2 shows an approximate rise in voltage of 20 dB at 5.05 MHz. This calculation does not take into account the internal resistance of the voltage source; in real life, the voltage change is typically not so drastic. The width and depth of the first and second curves 202 and 204 depend on the specific value of the series resistance R1. Typically, the width of the first and second curves will increase with an increasing resistance for R1, and the depth of the first and second curves will decrease with an increasing resistance for R1.

As discussed above, conventional capacitive touch sensor panels may require a large number of connections between the electrodes in the touch sensor panel and a signal generator (such as an RF signal generator). For example, a touch sensor panel with a 10×10 grid of electrode channels may require 20 separate input connections and 20 separate output connections for a self-capacitance configuration, and 10 inputs and 10 outputs for a mutual capacitance configuration. The inputs and outputs may be an RF signal at a single frequency that is time-multiplexed to all inputs. These connections may require a significant amount of space on the edges of the touch sensor panel and a large bundle of wires to connect the touch sensor panel to the controller. Thus, it may be desirable to reduce the number of connections required, which may free up space near the edges of the touch sensor panel and may simplify controller connection and construction. Some embodiments described herein use what may be considered input signal frequency multiplexing which may reduce the number of inputs and outputs required, as will be described below.

Figure 3:
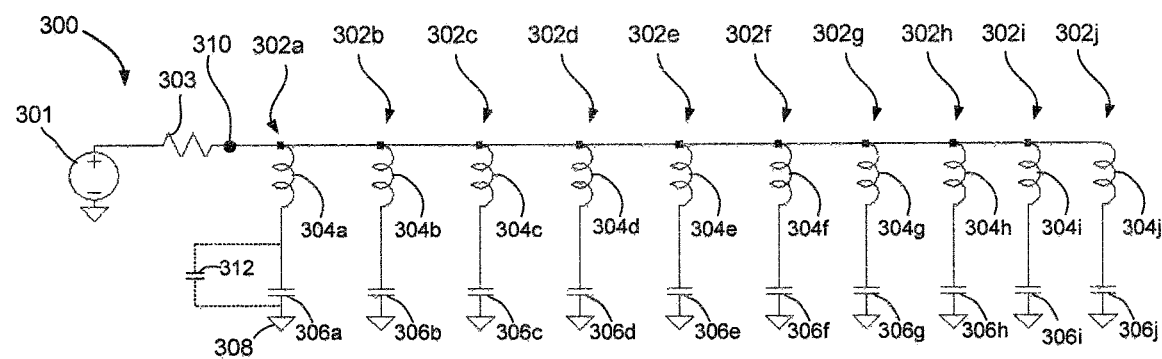
FIG. 3 is a schematic diagram of a circuit that may be used in a capacitive touch sensor device according to one embodiment.

FIG. 3 is a schematic diagram of a circuit 300 design that may be used in a capacitive touch sensor device 350 according to one embodiment. The circuit 300 includes a plurality of resonant circuits 302a, 302b, 302c, 302d, 302e, 302f, 302g, 302h, 302i and 302j connected in parallel to a single tunable RF signal generator 301. A fixed resistor 303 is connected in series between the tunable RF signal generator 301 and the resonant circuits 302a to 302j. Each resonant circuit 302a to 302j includes a respective inductor 304a to 304j connected in series to a respective capacitor 306a to 306j between the RF signal generator 301 (via resistor 303) and ground 308. FIG. 3 also shows an output point 310 of the circuit 300 to which all of the resonant circuits 302a to 302j are connected.

The capacitor 306a to 306j for each resonant circuit 302a to 302j is connected to ground. Each of the resonant circuits 302a to 302j has a resonance frequency that is unique within the set of resonant circuits 302a to 302j. In this example, the inductance value is the same for all inductors 304a to 304j, but the capacitors 306a to 306j each have a different capacitance as follows: first capacitor 306a is 220 pF; second capacitor 306b is 180 pF; third capacitor 306c is 150 pF; fourth capacitor 306d is 120 pF; fifth capacitor 306e is 100 pF; sixth capacitor 82f is 180 pF; seventh capacitor 306g is 68 pF; eighth capacitor 306h is 58 pF; ninth capacitor 306i is 47 pF; and tenth capacitor 306j is 39 pF. The varying capacitances provide the unique resonance frequencies for the resonant circuit 302a to 302j. In other embodiments, the inductance of each resonant circuit (in addition to instead of the capacitance) may vary to provide the unique resonance frequencies.

The tunable RF signal generator 301 is tunable to selectively generate an output at each of the unique resonant frequencies for driving the resonant circuits 302a to 302j. For an input signal at a given resonant frequency of one of the resonant circuits 302a to 302j, only the resonant circuit 302a to 302j having that resonant frequency may experience a significant voltage drop, while the remaining resonant circuits 302a to 302j may appear to have high input impedance. If the capacitance of one of the resonant circuits 302a to 302j changes, due to a touch, then its resonance frequency will also change. Take for example the first resonant circuit 302a having a first unique resonance frequency. A touch event is represented in by variable capacitance 312 in FIG. 3. In the event of touch on the first resonant circuit 302a, then the actual resonance frequency for the first resonant circuit 302a changes due to the combined capacitance 312 and 306a. Thus, when the signal generator V1 is tuned to the first unique resonance frequency for the first resonant circuit 302a, the measured output will change (a dB increase) in the presence of the touch. By sequentially tuning the tunable RF signal generator 301 through the unique resonance frequencies for all resonant circuits 302a to 302j, each of the circuits may be sequentially scanned to detect for a capacitance change due to touch. The tunable RE signal generator 301 may comprise a single signal generator with one or more tunable elements that alters the frequency of signals generated. In other embodiments, a signal generator may be tunable in that multiple signal generating sources are present for different frequencies, and a switching mechanism may control which signal generating source is actually providing output at a given time.

Figure 4:
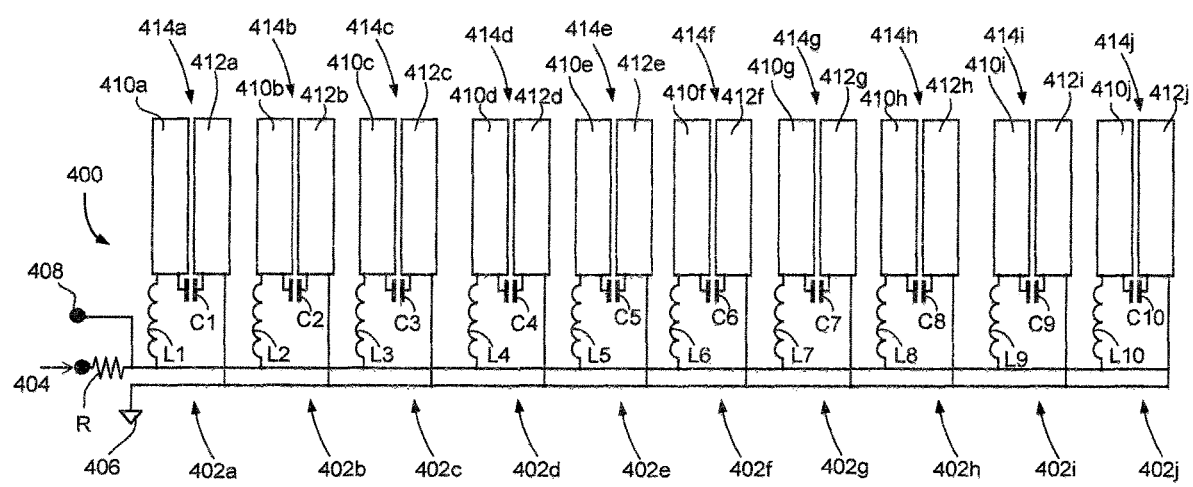
FIG. 4 is a schematic of an example capacitive touch circuit according to one embodiment.
Figure 5A:
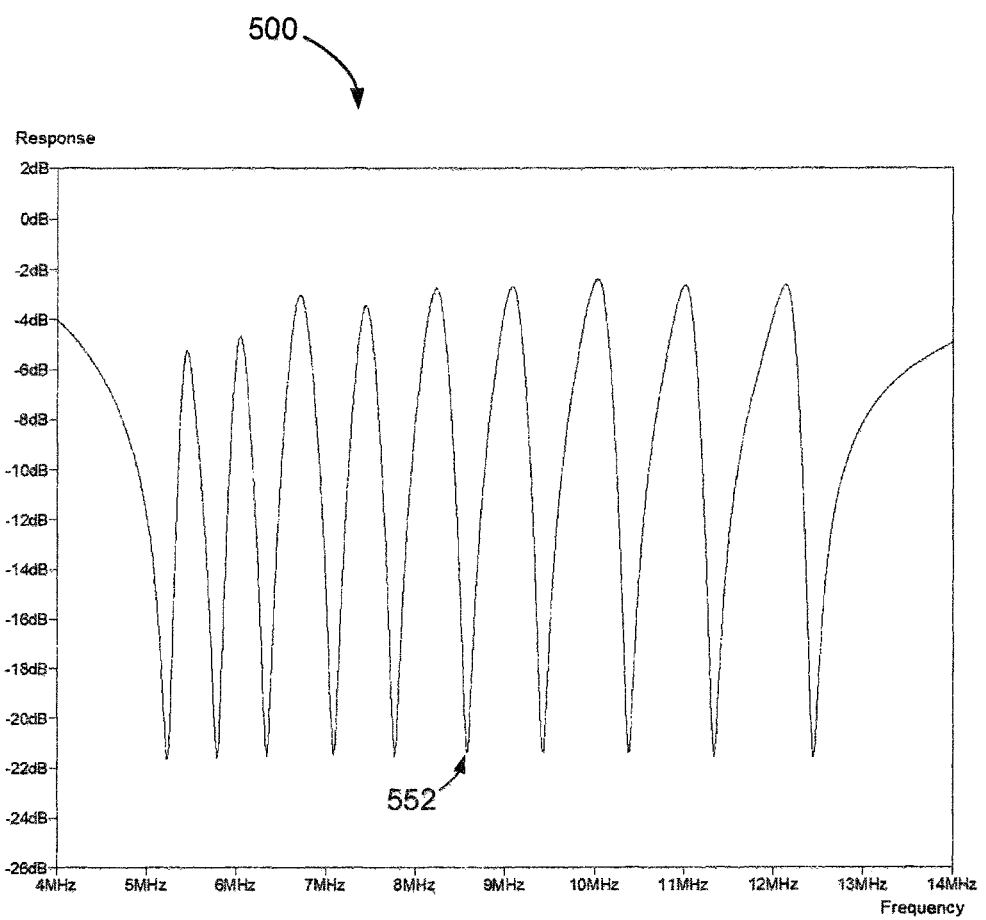
FIG. 5A shows a graph of a simulated frequency response of the capacitive touch circuit of FIG. 4 in the absence of touch.
Figure 5B:
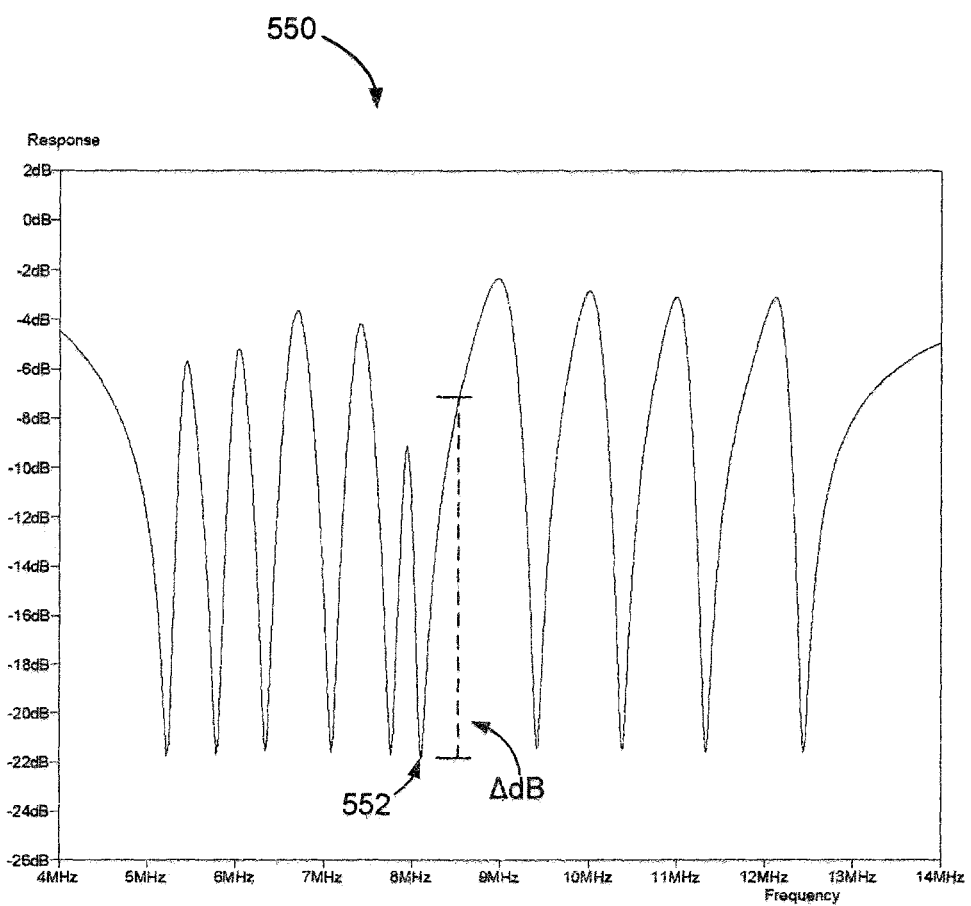
FIG. 5B shows a graph of a simulated frequency response of the capacitive touch circuit of FIG. 4 with a channel touched.
Figure 6:
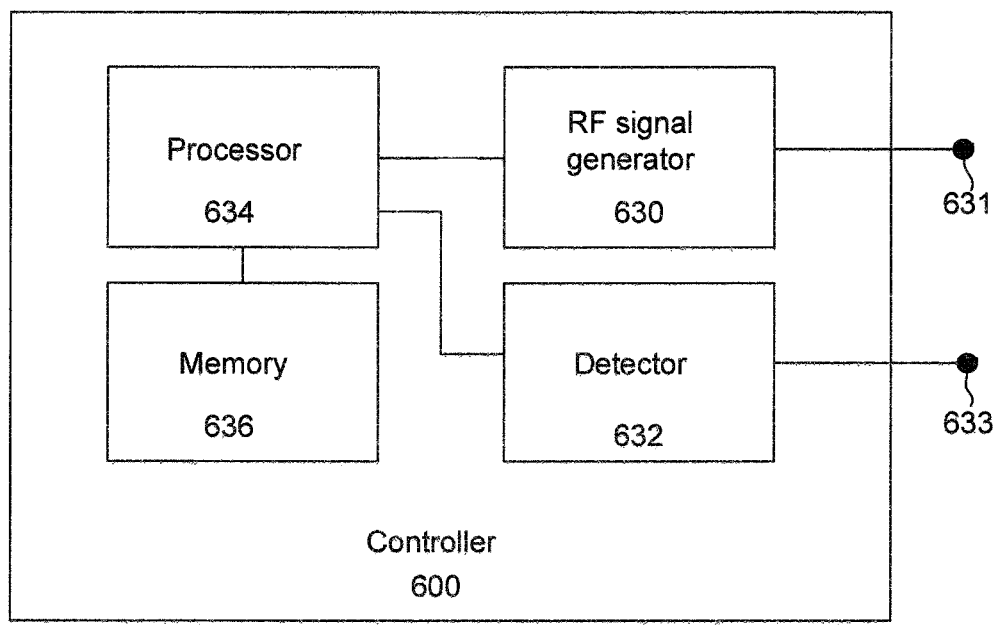
FIG. 6 is a block diagram of a controller that may be used to control a capacitive touch sensor according to some embodiments.

FIGS. 4 to 6 illustrate one example of how the above concepts above may be implemented, including the placement of electrodes.

FIG. 4 is a schematic of an example capacitive touch circuit 400 similar to the circuit 300 in FIG. 3, according to one embodiment. The capacitive touch circuit 400 in FIG. 4 includes a plurality of resonant circuits 402a to 402j collectively connected to a circuit input 404, via a resistor R, and to ground 406. Ten resonant circuits 402a to 402j are shown in FIG. 4, but the actual number of resonant circuits will vary in other embodiments. The capacitive touch circuit 400 also includes a circuit output 408 connected to each of the resonant circuits 402a to 402j. The resonant circuits 402a to 402j are connected in parallel to the input 404 (via resistor R). The circuit output 408 and circuit input 404 are connected to opposite terminals of the resistor R in this embodiment.

The first resonant circuit 402a includes an inductor L1, a capacitor C1, a first ITO strip 410a and a second ITO strip 412a. The first and second ITO strips 410a and 412a form a pair and run parallel to each other. The ITO strips are deposited onto a transparent dielectric substrate layer (not shown). The first and second ITO strips effectively form a capacitor. The capacitor C1 is connected between the first and second ITO strips 410a and 412a, thus being connected parallel to the capacitor formed by the first and second parallel and spaced apart ITO strips 410a and 412a. The capacitance of the pair of ITO strips 410a and 412a is extremely low, and the capacitor C1 and the pair of strips 410a and 412a together provide a total capacitance several times higher than the capacitance created by the touching finger.

Embodiments are not limited to ITO for electrodes, and other conductive (possibly transparent or translucent) materials may be used. Electrodes may be deposited or printed using a chemical process, or may also be laser printed onto the substrate layer. Typical ITO strips may have a resistance of approximately 100 ohms/square. A relatively low resistance of the electrode strips may be preferable to reduce diminishment of the RF signals. Electrodes formed by a fine metal mesh may provide a lower resistance than conventional ITO strips, and may, therefore, be more suitable for larger touch panels. Embodiments are not limited to any particular type of electrode. The shape of the electrodes may also vary and electrodes are not necessarily strips. For example, some embodiments may include electrodes in one or more other shapes such as rectangles or circles, rather than strips.

The inductor L1 is connected between the RF input (via resistor 406) and the first ITO strip 410a. The second ITO strip 412 is connected to ground (as well as the capacitor C1). Thus, as shown in FIG. 4, the inductor L1 of the first resonant circuit is in series with the capacitor C1 and the effective capacitor formed by the parallel first and second ITO strips 410a and 410b. The remaining resonant circuits 402b to 402j are all similarly arranged with respective capacitors (C2, C3, C4, C5, C6, C7, C8, C9, C10), inductors (L2, L3, L4, L5, L6, L7, L8, L9 and L10), first ITO strips (410b, 410c, 410d, 410e, 410f, 410g, 410h, 410i, 410j) and second ITO strips (412b, 412c, 412d, 412e, 412f, 412g, 412h, 412i, 412j), together forming respective touch sensitive "channels" 414b to 414j.

The inductors L1 to L10 and capacitors C1 to C10 in these resonant circuits 402a to 402j are chosen to provide a set of unique resonance frequencies, where each resonant circuit resonates at a slightly different frequency. The resonance frequencies are unique within the resonant circuits 402a to 402j. However, in embodiments including multiple sets of resonant circuits, resonant frequencies in two or more sets may overlap. The set of unique frequencies may be chosen based on a permissible tuning range and bandwidth of the RF input 404. For example, in certain environments, the allowable RF frequency operating bandwidth may be limited or dictated by regulations, other equipment, etc. The spread between adjacent resonant frequencies for the channels may be chosen to be sufficiently large to enable clear distinction between channels, though the actual spread may vary in different embodiments.

The capacitors C1 to C10 may be lumped circuit elements or they may be made as part of multilayer touch panel structure. For example, the capacitors C1 to C10 may be a chip capacitor or may formed by a deposition of one or more additional layers of conductive material on the substrate layer. A multilayer structure may be preferable since it may typically not be practical to solder surface mount chip capacitors on a glass or any dielectric substrates. The inductors L1 to L10 may also be lumped circuit elements or they may be made as part of multilayer touch panel structure.

It may be possible to distinguish a touch on any particular channel 414a to 414j, as will be discussed in more detail below. The touch sensitive channels 414a to 414j may be distributed on the substrate layer to form a one-dimensional touch sensor system. For example, the electrodes 410a to 410j and 412a to 412j of the channels 414a to 414j may extend substantially across the substrate layer to form a touch sensitive panel.

FIG. 5A shows a graph 500 of a simulated frequency response of the capacitive touch circuit 400 shown in FIG. 4 when none of the channels 414a to 414j is touched. The simulation was produced in Spice™. As shown in FIG. 5A, the circuit includes 10 resonant frequencies indicated by the 10 separate valleys or drops in the output decibel level. FIG. 5B shows a graph 550 of a simulated frequency response of the capacitive touch circuit 400 shown in FIG. 4 when the sixth channel 414f (shown in FIG. 4) is touched. As shown, the sixth resonant frequency 552 (also shown in FIG. 5A) has shifted from about 8.57 MHz to about 8.11 MHz, due to the capacitance of the channel increasing by 10 pF. If the applied RE input is tuned to 8.57 MHz, then by touching the corresponding pair of ITO strips, the measured output signal amplitude of the capacitive touch circuit 400 will change the amount AdB shown in FIG. 5B (which is approximately 15 dB in this example). The change in output level, when detected, is treated as a touch event for the sixth channel 414f.

FIG. 6 is a block diagram of a controller 600 for a capacitive touch sensor according to some embodiments. The controller 600 may be used to control the capacitive touch sensor circuit 400 shown in FIG. 4 as well as other capacitive touch circuits in various devices. The controller includes a tunable RE signal generator 630 connected to controller output 631, a detector 632 connected to controller input 633, a processor 634, and a memory 636. The tunable RF signal generator 630 is output (via wire 628) for input to the panel 601. The detector 632 is also connected to the processor 634. The tunable RF signal generator 630 is connected to and controlled by the processor 634. The detector 632 receives and measures output from the panel 601 via wire 629. The memory 636 is connected to the processor 634 and stores executable instructions thereon to cause the processor 634 to control the RF signal generator 630 and the detector 632 as described below. In other embodiments, the processor 634 may be configured without use of external memory to control the RF signal generator 630 and the detector 632.

The controller 600 shown in FIG. 6 may be connected to control the capacitive touch circuit 400 shown in FIG. 4. Specifically, the controller output 631 (FIG. 6) may be connected to the circuit input 404 (FIG. 4) of the touch circuit 404, and the controller input 633 (FIG. 6) may be connected to the circuit output 408 (FIG. 4) of the touch circuit 400. In operation, the RF signal generator 630 of the controller 600 may sequentially scan the unique resonant frequencies of all channels 414a to 414j of the capacitive touch circuit 400 to detect touch events on the channels 414a to 414j. The channels 414a to 414j may be scanned sequentially or in any random order. If more than one channel 414a to 414j is out of resonance, a multi-touch event is registered. The scanning sequence may follow a repeating sequence or a random hopping pattern.

To perform the scanning functionality, the processor 634 of the controller 600 controls the RF signal generator 630 to selectively and sequentially generate RF signals at each of the unique resonance frequencies. The detector 632 measures the output received by the controller (via controller input 633) originating from circuit output 408 in FIG. 4 and passes the measurements to the processor. The detector 632 may include an Analog to Digital Converter (ADC) for converting the RF output to digital signals for transmission to the processor 634. The detector 632 and/or the processor 634 also include a comparator to compare the measured output levels to the expected non-touch output level. The processor 634 analyzes the measurements to detect touch events on the channels 604 and 606. For example, if there is a change from the expected amplitude output for a particular resonance frequency, then the processor 634 determines that the particular channel 414a to 414j corresponding to that resonance frequency is touched. The input generated by the RF signal generator may remain at a given selected frequency for period of time. When multiple capacitance changes are detected on multiple channels, the microcontroller may register a multiple touch event.

In other embodiments, some or all of the controller circuitry (including the tunable signal generator and/or the detector) may be integrated directly into a touch sensor panel rather than included in a separate controller.

A person skilled in the art will appreciate that other resonant circuit configurations may also be used where each resonant circuit of a group of resonant circuits has a different resonant frequency. The example circuit configuration shown in FIGS. 2 and 4 to 6 are provided by way of example, and embodiments are not limited to this configuration. Any suitable resonant circuits that can be provided with different resonance frequencies may be used, and embodiments are not limited to the LCR type circuits shown in the figures.

In some embodiments, measuring the output (e.g. by the detector 632 in FIG. 6) is performed by measuring the amplitude of the voltage output from the capacitive touch circuit.

In some embodiments, two perpendicular sets of channels may be used to provide a two-dimensional touch sensor (such as a touchscreen for a mobile device or other electronic display panel). The system may still only require a single RF source may still be used for channel excitation and a single touch registration output. Each of the channels of both perpendicular sets could be connected to the single input and to the single output to enable scanning of both sets of channels.

Figure 7:
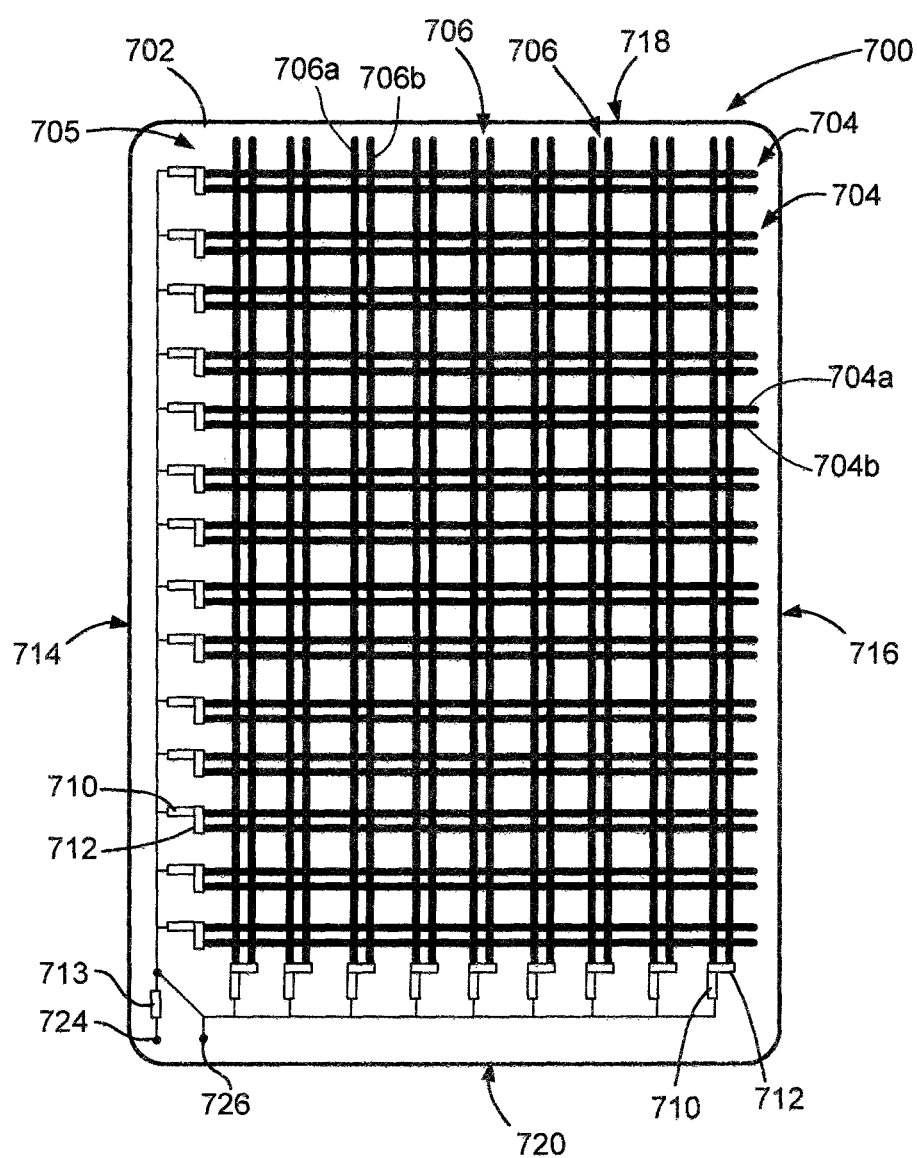
FIG. 7 is a top view of a touch sensor panel according to another embodiment.

FIG. 7 is a top view of a touch sensor panel 700 according to another embodiment. The touch sensor panel 700 includes a substrate layer 702. Distributed on the substrate layer 702 are horizontal channels 704 and vertical channels 706. Each horizontal channel 704 is a resonant circuit including a respective capacitor 710 and inductor 712 connected to a pair of first and second horizontal electrode strips 704a and a 704b in a manner similar to the channels 414a to 414j of FIG. 4. Each vertical channel 706 is a resonant circuit including a respective capacitor 710 and inductor 712 connected to a pair of first and second vertical electrode strips 706a and a 706b in a manner similar to the channels 414a to 414j of FIG. 4. A resistor 713 is also shown in FIG. 7 and is arranged similarly to the resistor R in FIG. 4.

Each channel 704 and 706 in FIG. 7 has a unique combination of capacitance and inductance values to provide a unique resonance frequency (similar to the capacitive touch circuit 400 in FIG. 4). The horizontal channels 704 and the vertical channels 706 are distributed on opposite respective faces of the substrate layer 702. For example, the vertical channels 706 may be on a top face 705, and the horizontal channels 704 may be on a bottom face (now shown), or vice versa. Alternatively, the sets of horizontal and vertical channels 704 and 706 may be arranged on two different substrate layers (not shown) that are stacked on one another. Any conventional method of arranging a two dimensional array of touch sensitive channels on one or more substrate layers may be used.

As seen in this example, the horizontal channels 704 extend between opposite side edges 714 and 716 of the substrate layer 702, while the vertical channels extend substantially from the top 718 to the bottom 720 of the substrate layer 702. Each channel may include a pair of electrodes, an inductor 712 and a capacitor 710 arranged similar to the channels 414a to 414j of the capacitive touch circuit 400 shown in FIG. 4. The horizontal and vertical channels 704 and 706 are collectively connected to a single circuit input 724 and also collectively connected to a single circuit output 726 in this example. A controller (such as the controller 600 shown in FIG. 6) including a tunable signal generator and/or detector may be connected (e.g. using wires) to the substrate layer 702 via the circuit input 724 and the circuit output 726 to scan the channels 704 and 706. The touch sensor panel 700 may be integrated together with a controller within a single device housing (not shown). For example, the housing may be in the form of a protective tablet housing complete with gaskets and/or other seals to protect the touch sensor panel 700, as well as other parts of a tablet. The touch sensor panel 700 may typically include a transparent protective layer (not shown) such as glass or plastic covering the substrate layer 702 and the channels 704 and 706. In other embodiments, some or all of the controller circuitry (including the tunable signal generator and/or the detector) may be integrated in to the touch sensor panel 700 rather than included in a separate controller.

Each channel the 704 and 706 has a unique resonance frequency. Thus, by scanning each of the channels 704 and 706 (by cycling through the resonance frequencies and detecting changes in output when tuned to each frequency), touch may be registered in two dimensions. The two dimensional arrangement of the channels 704 and 706 will create mutual capacitances between the channels. This may be taken into account when configuring how touch is detected.

A controller, such as the controller 600 shown in FIG. 6, may selectively drive the channels 704 and 706 in the touch sensor panel 700 and may detect touch events. For the two dimensional sensing, the controller may detect a touch event on at least one horizontal channel 704 and at least one vertical channel 706.

A single touch may affect and be detected for multiple channels to varying degrees. For example, a touch on one channel may affect the adjacent channel(s) to a lesser degree. A touch between two channels may affect those two channels in a similar manner. By measuring the degree of output change for multiple channels, a controller may infer the location of a touch event, even though that touch event is not directly over a given single channel.

As mentioned above, some embodiments may use a multilayer structure to create the capacitors in the resonant circuits (such as capacitors C1 to C10 in FIG. 4). Examples of calculations of the capacitance that may be achieved using a multilayer structure are provided below. The usual dielectrics used in touch sensor panel manufacturing are the polyethylene terephthalate (PET) and various kinds of adhesives. The dielectric constant of the PET is typically within the range of 3 to 3.5, and most suitable adhesive materials for holding dielectric layers (such as PET) together have dielectric constant around 1.5. The thickness of the PET films varies between 50 um to 250 um, and the thickness of the adhesive layer is usually between 25 and 150 um.

The above results mean that if a mutual capacitive touch sensor panel has ITO strips 1 cm wide each, and they cross each other at the right angle, the capacitance of this two-layer structure at every intersection may be between 8.85 pF to 62 pF depending on the type and thickness of the dielectric substrate. The capacitance may be varied by changing the width of the strip or by adding areas on the periphery of the touch sensor panel. If more than two layers are used this addition may take very little room on the side of the touch sensor panel, since the capacitance doubles, triples, etc. For a self-capacitive touch sensor panel, on the other hand, there may be only a single layer of dielectric substrate. Thus, to increase capacitance may require increasing the capacitive area. Thus, electrodes and/or fixed capacitor elements of resonant circuits with a desired capacitance may be created using planar conductor (e.g. ITO or metal) on a substrate layer.

In some embodiments, inductors (such as the inductors L1 to L10 in FIG. 4) may be deposited on the dielectric substrate layer, similar to electrode strips. For example, planar spiral inductors may be used in some embodiments. Planar spiral inductors may be less expensive than either chip or coil inductors for surface based designs. Each inductor may include at least one layer of a conductor on a substrate layer. The one or more conductor layers may define one or more spiral-shaped inductor coil.

A multilayer inductor creates mutual inductance, and may be difficult to simulate. The simulation process may take a long time, and the results may be inconsistent. However, for a two layer inductor, the following two equations may be used for the coupling value, KC, to obtain the total inductor value with a mutual inductance:

$$Lt = L1 + L2 + 2*Kc*(L1+L2)^2$$

When both inductor layers have the same pattern, the formula is simplified:

$$Lt = 2L*(1+K*C)$$

From the experiments the coupling coefficient may be approximately in the range of 0.5-0.7 on a standard Printed Circuit Board (PCB) with 62 mil thickness.

FIGS. 8A to 8D show example planar inductor coils, according to some embodiments, that may be deposited or printed onto a substrate, such as a PCB.

Figure 8A:
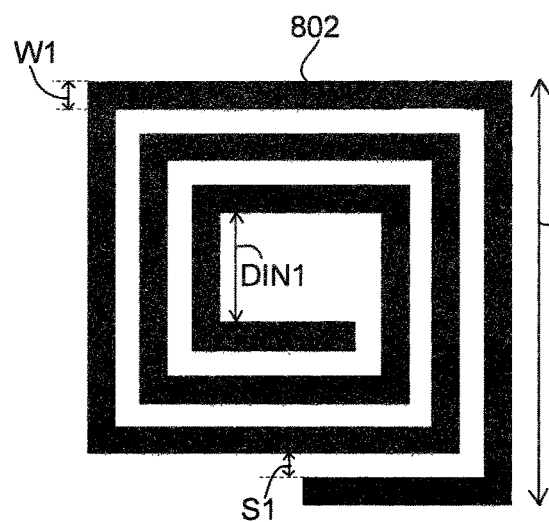
FIG. 8A is a top view of a planar inductor coil according to one embodiment.

FIG. 8A is a top view of an inductor 802 with a square spiral shape. The inductor 802 is created by depositing silver ink or metal mesh on a glass or transparent polyester layer. The inductor 802 is a single layer inductor with 10 mm outer diameter DOUT1, traces having 125 um width W1 that are spaced apart by a 125 um trace spacing S1, and having 15 turns. The inner diameter DIN1 shown in FIG. 8A is 2.75 mm. This inductor may, for example, have approximately to have 1.64 uH inductance, although embodiments are not limited to any particular inductance. The inner diameter DIN provides space for a ferromagnetic core (not shown) to be inserted.

For a two layer structure, with each layer using a layout similar to those shown in FIG. 8A, the coupling coefficient KC has been found to be approximately 0.5 for experiments with 62 mil PCB. However, for a thinner PCB spacer the coupling coefficient KC may be higher. Assuming that KC=0.5, the total inductance of a two layer structure may be approximately 2*1.64 uH*(1+0.5)=4.92 uH. A four-layer inductor may have the value of 14.76 uH, and an eight-layer inductor will have 44.28 uH. A ferromagnetic core in the center of the inductor may increase the inductance value even further.

The total resistance of the coil of an inductor may be very important. The total length of a single layer flat inductor may be estimated as the length of the outer turn multiplied by the number of turns. Using the layout of the inductor 802 in FIG. 8A, the estimated length would be approximately 60 cm for a single layer inductor. If the inductor 802 may be printed from silver ink, which has a resistivity approximately twice as high as the resistivity of pure silver and equals to $2*10^{-6}$ ohm/cm, the total DC resistance of the single layer inductor 802 may be approximately 3.2 ohm. A two layer or two-sided inductor using the same layout may have a DC resistance of 6.4 ohm. A four layer or four-sided inductor may be approximately 12.8 ohm. An eight layer or eight-sided inductor may be approximately 25.4 ohm.

The series resistance of the coil affects the LCR quality factor Q. The quality factor Q may be calculated by the formula Q=1/R*SQUARE (L/C), where R is the series resistance, L is the inductance and C is the capacitance. The quality factor Q may need to be at least 10 for the circuit to properly resonate. A higher the Q factor may also provide better frequency resolution (channel separation) of the frequency response curve, such that the resonance frequencies of the channels may be placed closer to each other occupying less overall frequency band. To increase the Q factor, it may be necessary to lower the series resistance and/or raise the inductance of the inductor. It may be less practical to alter capacitance to increase the Q factor because the capacitance value may need to stay in the same order of magnitude as the finger touch, which may be around 10 pF.

Figure 8B:
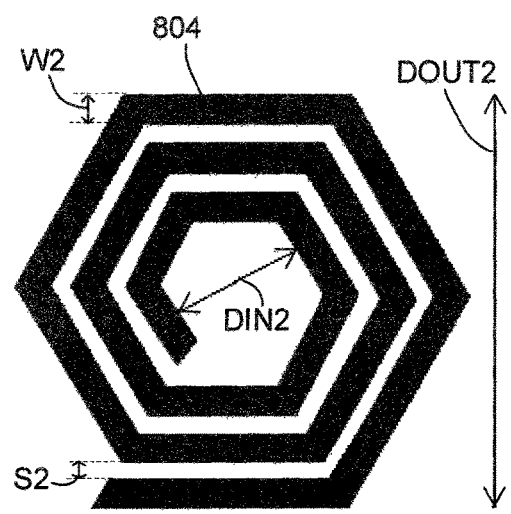
FIG. 8B is a top view of a planar inductor coil according to another embodiment.

FIG. 8B is a top view of an inductor 804 with a hexagonal spiral shape. The values of DOUT2, DIN2, W2 and S2 shown in FIG. 8B may be the same or different than DOUT1, DIN1, W1 and S1 shown in FIG. 8A depending on the desired inductance.

Figure 8C:
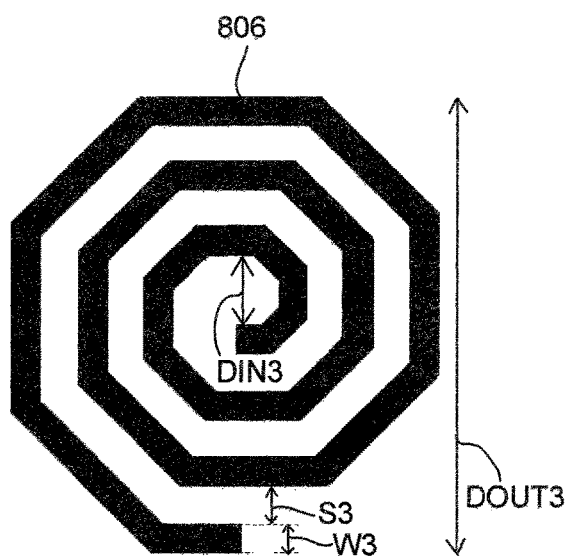
FIG. 8C is a top view of a planar inductor coil according to still another embodiment.

FIG. 8C is a top view of an inductor 806 with an octagonal spiral shape. The values of DOUT3, DIN3, W3 and S3 shown in FIG. 8B may be the same or different than DOUT1, DIN1, W1 and S1 shown in FIG. 8A depending on the desired inductance.

Figure 8D:
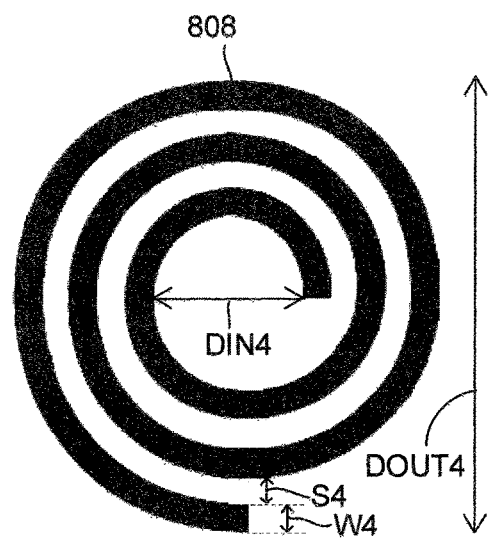
FIG. 8D is a top view of a planar inductor coil according to yet another embodiment.

FIG. 8D is a top view of an inductor 808 with a circular spiral shape. The values of DOUT4, DIN4, W4 and S4 shown in FIG. 8B may be the same or different than DOUT1, DIN1, W1 and S1 shown in FIG. 8A depending on the desired inductance. The inductance of the example inductors in FIGS. 8A to 8D depends on the exact materials (substrate and conductor) used as well as the geometry of the inductor coil. The inductance may range from 1 µH to 100 µH, for example, depending on the specific dimensions and materials.

By varying the dimensions of the inductors 802, 804, 806 and 808 in FIGS. 8A to 8D, including the number of turns, a variety of inductances may be provided as desired. For example, using such designs, variations in the inductances may be provided for achieving multiple unique resonance frequencies in a capacitive touch circuit (such as the circuit 400 shown in FIG. 4). For example, a plurality of similar inductors could be arranged on a PCB, for either one or two dimensional sensing, with each inductor having a slight variation in one or more dimensions.

The flat inductors made of several layers of silver ink or other conductor printed of a dielectric film have their own capacitance. This capacitance of the inductor may be used as a capacitance part of a resonant circuit, such that an additional external capacitor is not needed. When the number of turns in the inductor coil changes, both the inductance and self-capacitance change, thereby also changing the resonance frequency of the resonant circuit. Thus, by using different numbers of coil turns and/or geometrical variations for inductors in different channels, different resonance frequencies for the channels may achieved.

Figure 9:
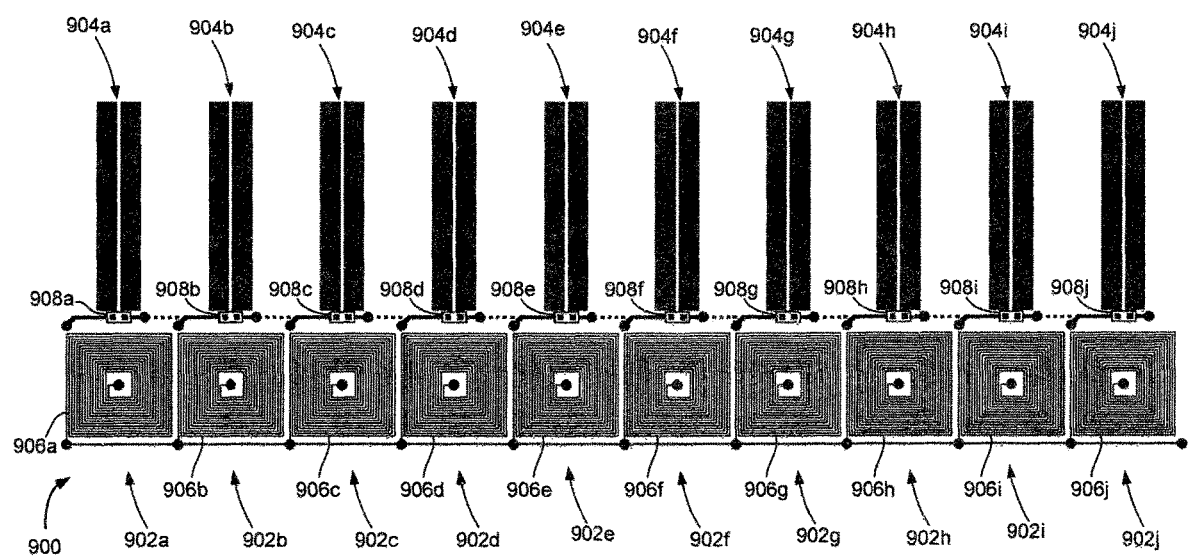
FIG. 9 is a layout of capacitive touch sensor circuit according to yet another embodiment.

FIG. 9 shows a layout of an example capacitive touch sensor circuit 900. The capacitive touch sensor circuit 900 may be manufactured as a copper-on-PCB circuit. The capacitive touch sensor circuit 900 includes ten resonant circuits 902a to 902j forming ten respective channels 904a to 904j that are similar to the channels 914a to 914j in FIG. 4. The number of channels may vary in other embodiments. Each resonant circuit 902a to 902j and includes a respective includes a respective planar inductor 906a to 906j deposited on the PCB and a respective chip capacitor 908a to 908j. The channels 904a to 904j, inductors 906a to 906j and capacitors 908a to 908j are connected similar to the capacitive touch sensor circuit 400 shown in FIG. 4.

Each planar inductor 906a to 906j is a square spiral structure similar to that of the inductor 802 shown in FIG. 8A, but with several more turns. The planar inductors 906a to 906j all have the same dimensions and inductance. Unique resonance frequencies in this example are provided by varying the capacitance of varying capacitances of the capacitors 908a to 908j.

Figure 10:
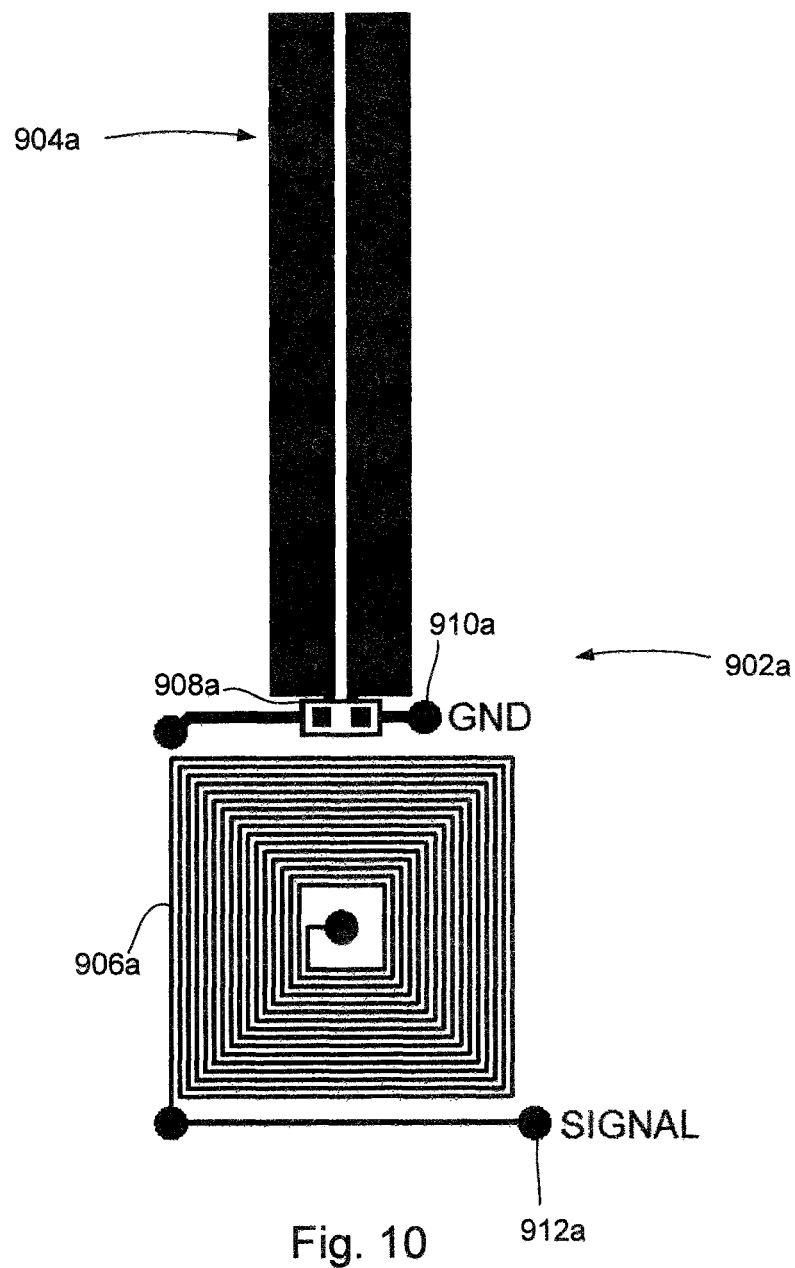
FIG. 10 is an enlarged view of the layout of a first resonant circuit of the touch sensor circuit of FIG. 9.

FIG. 10 is an enlarged view of the layout of the first single resonant circuit 902a of the touch circuit 900 of FIG. 9, including the first channel 904a, the first inductor 906a and the first capacitor 908a. Ground connection 910a and circuit input connection 912a are also visible in FIG. 10. The remaining resonant circuits 902b to 902j (shown in FIG. 9) are similarly connected.

Turning again to FIG. 9, to obtain an operating frequency range in the single digit megahertz range the value of the inductors 906a to 906j should be in the single digit micro Henry range. On the experimental touch panel circuit that was manufactured, the inductors 906a to 906j were manufactured as square two-layer inductors. The inductors 906a to 906j each have approximate dimensions of 13×13 mm, conductive trace width of 0.2 mm with spacing in between of 0.2 mm, and 14 turns. The measured value of the inductance was approximately 3.9 uH, which was confirmed by the resonant frequency calculation and measurement. The capacitors 908a to 908j are ceramic capacitors of the 0603 size, although the particular capacitor used in other embodiments may vary.

The manufactured inductors 906a to 906j have shown the following approximate results (per inductor): single side inductance is 1.13 uH; total inductance is 3.90 uH, mutual magnetic coupling is 0.72; inductor series resistance is 2.75 ohms; and parasitic capacitance of capacitor pads is between 7.4 pF and 8.1 pF. To decrease the size of the planar coil inductor a multilayer structure may be used. When the number of layers doubles the inductance may triple because of the mutual inductance between the layers contributes.

The value of inductance may be increased, or the size may be decreased keeping the same value, by inserting a ferrite core inside the coil. Including a ferrite rod may increase the resonance frequency, based on some experimentation.

Figure 11:
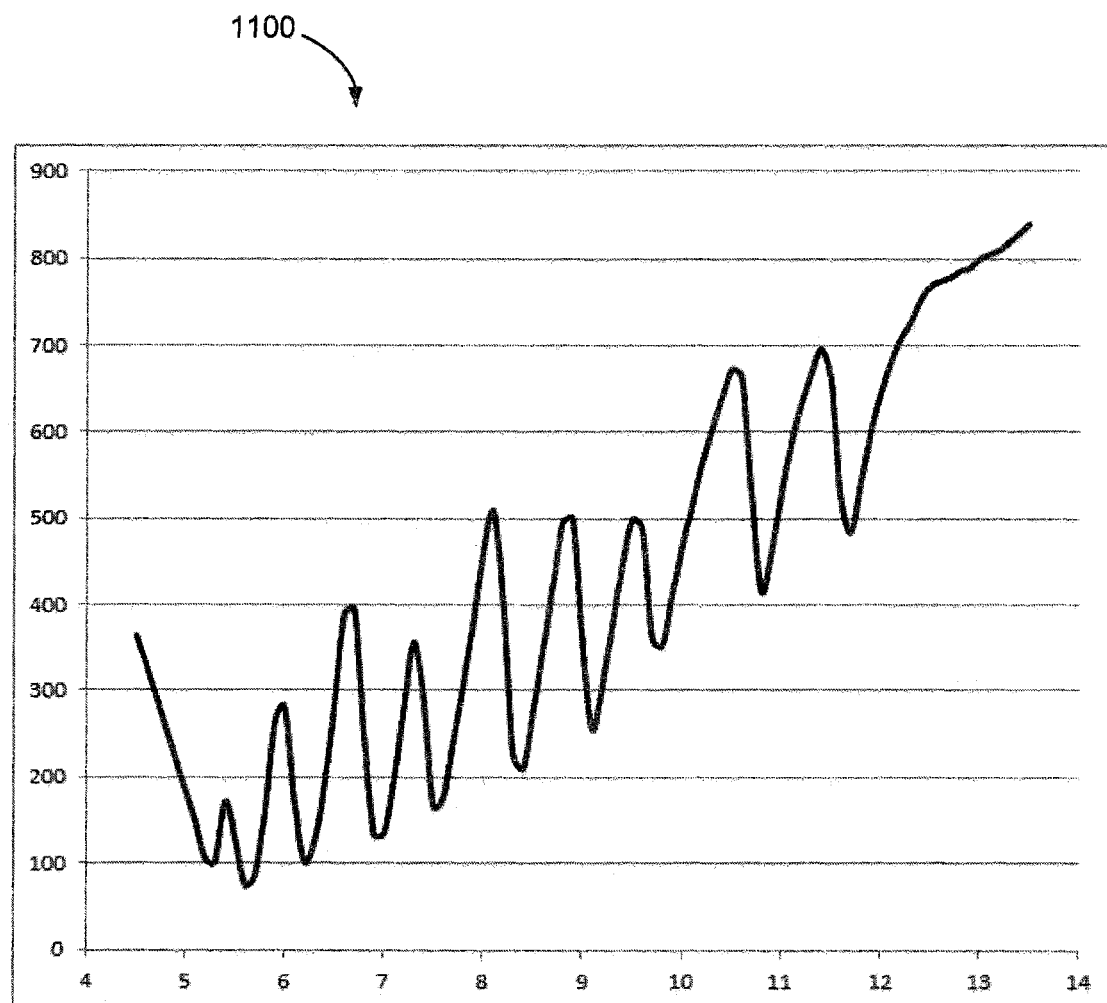
FIG. 11 is a graph of a frequency response obtained for the capacitive touch circuit of FIG. 9

FIG. 11 is a graph 1100 of a frequency response obtained for the capacitive touch circuit 900 of FIG. 9. As seen in FIG. 11, the frequency response shows 10 separate valleys indicating different resonance frequencies for the ten channels.

While the examples described above include two electrode strips per channel, with one electrode strip in each channel connected to ground, other embodiments may not include electrodes connected to ground as part of the channel. Rather, some embodiments may utilize channels that comprise a single electrode and omit the second electrode connected to ground.

Government regulations may limit the total bandwidth available for use in a touchscreen device (e.g. an RF touchscreen), which may limit the number and spread of resonance frequencies that may be used. For this or other reasons it may be desirable to limit the number of resonance frequencies used in a touch sensor device. In some embodiments, a touch sensor device may include two or more sets of resonant circuits (forming two or more sets of channels). Specifically, the touch sensor device may include a first plurality or set of resonant circuits as described above, as well as one or more additional pluralities or sets of resonant circuits. Each of the sets of resonant circuits may include one or more electrodes distributed on the substrate layer. For example, the first set could form horizontal channels, and a second set could form vertical channels. Alternatively, different sets of channels (resonant circuits) could provide coverage for different areas of a panel. Each set of resonant circuits may have a corresponding set of resonance frequencies, each being unique within the respective set.

Each set of resonant circuits may include a separate input connection (e.g. connected to a controller having a signal generator). Output from a single tunable signal generator may be switched between inputs for the sets of resonant circuits to selectively drive sets of resonant circuits. For example, switching circuitry may be connected to the tunable signal generator for selectively driving the sets of resonant circuits. Two or more sets of resonant circuits may include one or more common (i.e. same or substantially similar) resonance frequencies. Thus, the resonance frequencies for two or more sets of resonant circuits may at least partially overlap. Thus, signals from a single tunable signal generator may be used to drive and scan multiple sets of resonant circuits having at least some common resonance frequencies. In this manner, the total number of resonance frequencies used in a touch circuit device may be less than the total number of resonant circuits, but the number of connections (e.g. wires) needed to connect to the resonant circuits (i.e. channels) for scanning may still be reduced in comparison to conventional touch sensor devices. Alternatively, two or more tunable signal generators may be separately connected to drive two or more respective sets of resonant circuits. In still other embodiments, two or more signal generators may be used to drive separate sets of resonant circuits.

Figure 12:
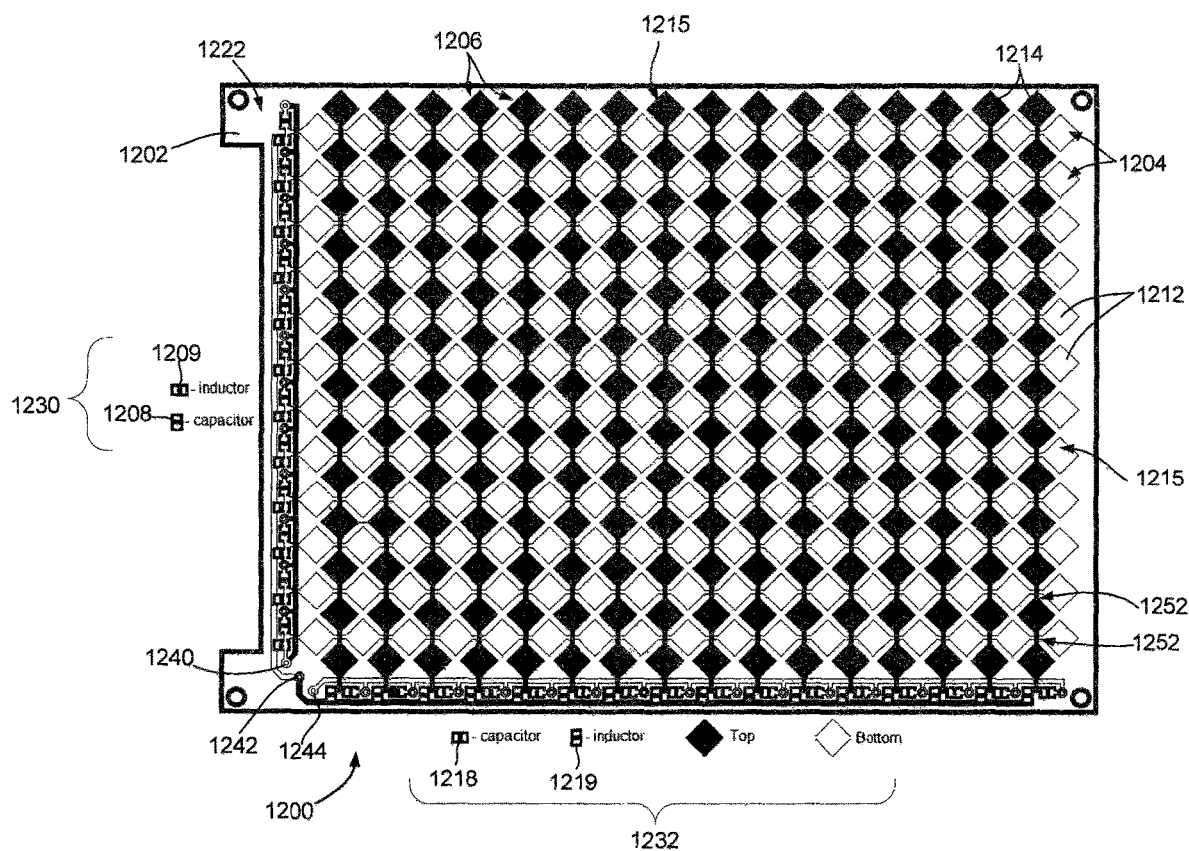
FIG. 12 is a top view of a capacitive touch sensor panel according to another embodiment.

FIG. 12 is a top view of a layout for a capacitive touch sensor panel 1200 (in the form of a panel) according to yet another embodiment. The capacitive touch panel includes conductor elements discussed below printed, deposited or etched on a substrate. The substrate in this example is a PCB and including a top PCB layer 1202 and a bottom PCB layer that underlays the top PCB layer in this example, although another substrate (such as a transparent substrate) may be used as well. The touch sensor panel 1200 is a single plane pattern.

The capacitive touch sensor panel 1200 in this embodiment includes horizontal channels 1204 and vertical channels 1206. In this embodiment, each of the vertical and horizontal channels 1206 arranged as part of resonant circuits similar to the resonant circuits 402a to 402j in FIG. 4, but with no electrode connected directly to physical ground. Instead, each channel 1204 and 1206 includes a single electrode 1212 or 1214, which has a diamond pattern as discussed below. In this capacitive touch sensor panel 1200, the human finger acts as a virtual path to ground (via anything touched by the user).

The capacitive touch sensor panel 1200 may be manufactured using copper (or another conductor) on the top PCB layer 1202 and the bottom PCB layer. In this embodiment the electrodes 1214 of the vertical channels 1206 are formed on a top surface (not visible in FIG. 12) of the bottom PCB layer. The conductor portions of the vertical channels 1206 including the electrodes 1214 are shown as solid black in FIG. 12 for illustrative purposes, but would normally not be visible through the top PCB layer 1202. The electrodes 1212 of the horizontal channels 1204 are formed on a bottom surface (not visible in FIG. 12) of the top PCB layer 1202, and thus face the electrodes 1214 of the vertical channels 1206. The conductor portions of the horizontal channels 1204 including the electrodes 1212 are shown as outlined white in FIG. 12 for illustrative purposes, but would not normally be visible through the top PCB layer 1202. To prevent contact between the vertical channels 1206 and the horizontal channels 1204, an insulating layer (such as a solder mask) is provided between the horizontal and vertical channels 1204 and 1206. In other embodiments, a single substrate layer (e.g. PCB or a transparent substrate) may be used with horizontal channels on one face of the substrate layer, and horizontal channels on the opposite face. Embodiments are not limited to any particular arrangement of multiple layers of channels and/or substrate layers.

Each horizontal channel 1204 and each vertical channel 1206 includes a respective pair of a lump capacitor 1208 or 1218 and a lump inductor 1209 or 1219 (as opposed to PCB traces for planar inductors and/or capacitor). The lump capacitors 1208 for the horizontal channels 1204 are each indicated by the respective vertically arranged capacitor icon 1208 shown in first legend section 1230 of FIG. 10. The lump inductors 1209 for the horizontal channels 1204 are each indicated by the respective horizontally arranged inductor icon 1209 shown in the first legend section 1230. The lump capacitors 1218 for the vertical channels 1206 are each indicated by the respective horizontally arranged capacitor icon 1218 shown in second legend section 1232 of FIG. 10. The lump inductors 1219 for the horizontal channels 1204 are each indicated by the respective vertically arranged inductor icon 1219 shown in the second legend section 1232.

The horizontal channels 1204 are collectively connected to a first input/output port 1240 and are collectively connected to ground 1242 (with each horizontal channel 1204 having the corresponding capacitor 1208 and inductor 1209 connected in series between the first input/output port 1240 and ground 1242). The vertical channels 1206 are collectively connected to a second input/output port 1244 and are also collectively connected to ground 1242 (with each horizontal channel 1206 having the corresponding capacitor 1218 and inductor 1219 connected in series between the second input/output port 1244 and ground 1242).

The horizontal channels 1204 each have a different respective resonance frequency. The vertical channels 1206 each have a different respective resonance frequency. The resonance frequencies for the horizontal channels 1204 and the resonance frequencies for the vertical channels 1206 partially overlap in this embodiment. In particular, the capacitive touch sensor panel 1200 includes twelve horizontal channels 1204 and sixteen vertical channels 1206. For each horizontal channel 1204, the respective capacitor 1208 and inductor 1209 pair are a different combination of capacitance and inductance to provide a resonance frequency for each channel 1204 and 1206 that is different than the other horizontal channels. The vertical channels 1206 similarly each have a respective resonance frequency, provided by the capacitors 1218 and inductors 1219, that is different than the other vertical channels. The twelve resonance frequencies for the horizontal channels 1204 are repeated for the vertical channels 1206, and the vertical channels 1206 include four additional frequencies (for 16 total). However, it is to be understood that the number of unique frequencies may vary. For example, the number and/or spread of frequencies used may depend on needs of the device and/or government regulations.

The capacitors 1208 and 1218 and inductors 1209 and 1219 may all located on a top surface 1222 of the top PCB layer 1202 and connected through the top PCB layer 1202 and the bottom PCB layer (not shown) to the electrodes 1212 and 1214, respective first and second input/output ports 1240 and 1244 and ground 1242 as needed. Other arrangements are also possible. Any suitable arrangement connecting circuit elements together into the layout shown in FIG. 12 may be used.

A touch event on the capacitive touch sensor panel 1200 may register a change in capacitance for at least one horizontal channel 1204 and at least one vertical channel 1206, thereby enabling a determination of a position of the touch event in two dimensions.

As shown in FIG. 12, each of the vertical and horizontal channels 1204 and 1206 includes the single elongated electrode strip 1212 or 1214 that each form several consecutive diamond shapes 1215 along their length. These diamond shapes 1215 do not overlap. Rather, horizontal channels 1204 intersect the vertical channels 1206 at narrow portions 1252 of the electrodes 1212 and 1214 between adjacent diamond shapes 1215.

The electrodes 1212 and 1214 are not directly connected to a ground plane, and the capacitors 1208 and 1218 and inductors 1209 and 1219 do not overlap on the ground plane. Therefore, the electrodes 1212 and 1214 will "hover" over the top PCB 1202 layer and the bottom PCB layer (not shown). The horizontal and vertical channels 1204 and 1206 are connected to a physical ground via ground connection 1242. The touch of a finger provides a virtual ground through the body. Thus, when a human finger is applied to the touch sensor panel 1200, the amplitude read at the outputs will increase due to the change in capacitance, despite the absence the ground plane. In an experimental setting, the layout described above provided an output amplitude change of 5 to 6 percent from a touch event.

Figure 13:
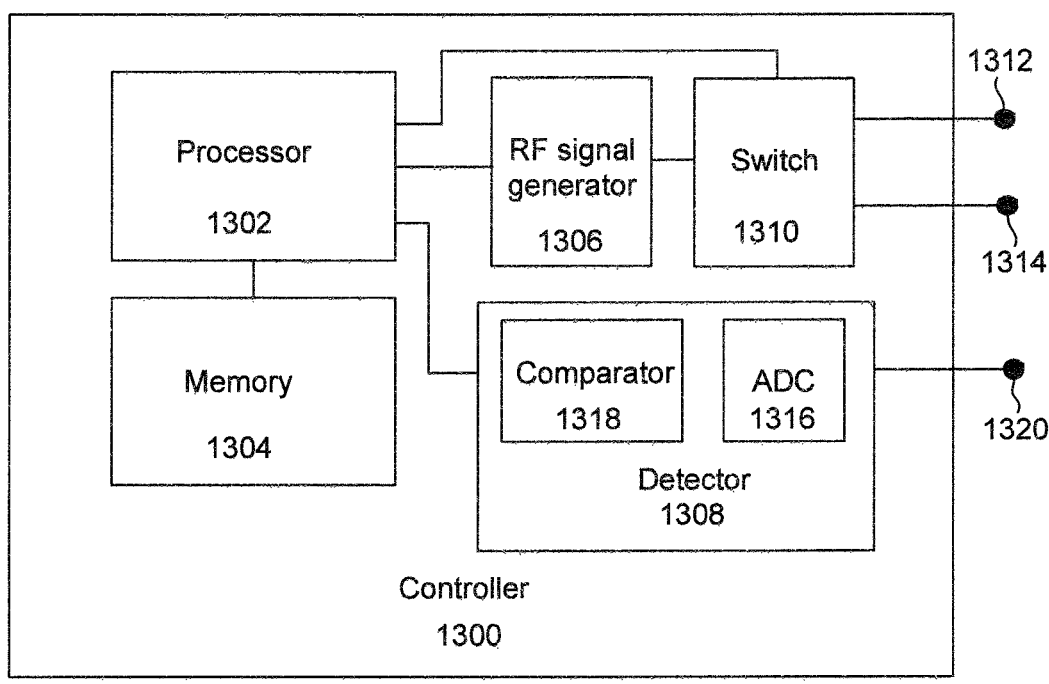
FIG. 13 is a block diagram of a controller according to another embodiment that may be connected to the touch sensor panel of FIG. 12.

FIG. 13 is a block diagram of a controller 1300 that may be connected to control the touch sensor panel 1200 shown in FIG. 12. The controller 1300 includes a processor 1302, a memory 1304, tunable RF signal generator 1306, detector 1308 and switch 1310. The memory 1304 stores computer-executable code thereon for causing the processor 1302 to perform functions described below. In other embodiments, the memory 1304 may be incorporated as part of the processor 1302, rather than external to the processor 1302 as shown in FIG. 13. The processor 1302 is also connected to communicate with the tunable RF signal generator 1306, the detector 1308, and the switch 1310. The communication may include providing control signals to the tunable RF signal generator 1306, the detector 1308 and the switch 1310, as well as receiving, as input, data output from the detector 1308.

A first output terminal 1312 of the controller 1300 may be connected to the first input/output port 1240 for horizontal channels 1204 of the touch sensor panel 1200 of FIG. 12 to drive the horizontal channels 1204. A second output terminal 1314 of the controller 1300 may be connected to the second input/output port 1244 for vertical channels 1206 of the touch sensor panel 1200 of FIG. 12 to drive the vertical channels 1206.

RF signals generated by the tunable RE signal generator 1306 are selectively output through the switch 1310 to either a first output terminal 1312 or a second output terminal 1314 as directed by the processor 1302. The tunable RF signal generator 1306 in this example is capable of selectively generating signals (for input to the touch sensor panel 1200) at each of the resonant frequencies of the horizontal and vertical channels 1204 and 1206 (shown in FIG. 12). The processor 1302 controls the switch 1310 and the tunable RF signal generator 1306 to scan each of the horizontal and vertical channels 1204 and 1206. For example, the switch 1310 may first be set to direct the RF signals to the first output terminal 1312 while the tunable RF signal generator 1306 cycles through all of the resonance frequencies for the horizontal channels 1204. Then the switch 1310 may be set to direct the RF signals to the second output 1314 terminal while the tunable RF signal generator 1306 cycles through all of the resonance frequencies for the vertical channels 1206. Other scanning sequences may also be used (including random sequences).

The detector 1308 in this example includes an ADC 1316 and a comparator 1318. The detector 1308 is connected to controller input terminal 1320 to receive, as input, the output from the touch sensor panel 1200 (shown in FIG. 12). The controller input terminal 1320 may also be connected to the first and second output ports 1240 and 1244 of the touch sensor panel 1200 to measure the output for the horizontal and vertical channels 1204 and 1206 (shown in FIG. 12). The detector 1308 receives analog output from the touch sensor panel 1200 and first converts the analog signal to digital values using the ADC 1316. The digital values are compared to expected output levels (e.g. expected output for no touch event) by the comparator 1318. The comparison data from the comparator 1318 is passed to the processor 1302. Based on the output from the detector 1308, the current state of the switch 1310 and the current selected resonance frequency, the processor determines which of the horizontal channels 1204 and which of the vertical channels 1206 (shown in FIG. 12) is currently touched.

Figure 14:
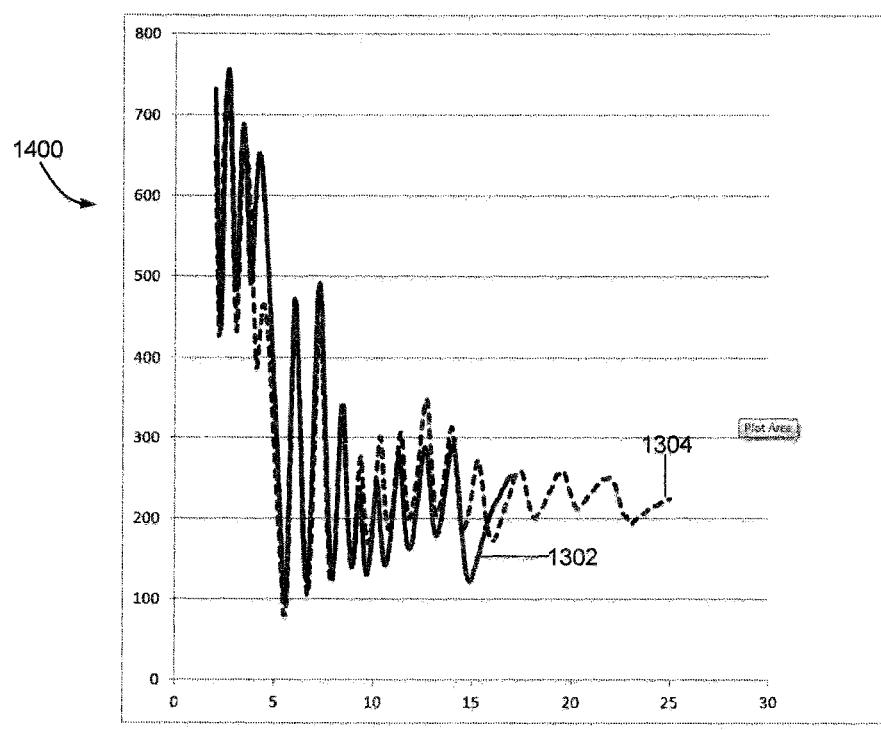
FIG. 14 is a graph of a frequency response for the touch sensor panel of FIG. 12.

The tunable RF signal generator 1306 may include a synthesizer chip or circuit. The switch 1310 of the controller 1300 may include a PIN diode (not shown) that can divert the RE signal from the tunable RE signal generator 1306 to the first or second output terminals 1312 and 1314. The processor 1302 (or possibly the switch 1310) may include a switch driver control circuit that controls the PIN diode. The switch driver control circuit may turn the PIN diode on and off, for example, by applying a forward or reverse bias. The switch driver control circuit may use a low-pass filter between the RE signal generator and the switch. FIG. 14 is a graph 1400 of a frequency response obtained for the capacitive touch sensor panel 1200 of FIG. 12. A first, solid line 1302 is shown for the frequency response of the horizontal channels 1204 and a second, dotted line 1304 is shown for the frequency response of the vertical channels 1206. The first line 1302 shows 12 valleys or drops for the 12 resonant frequencies of the horizontal channels 1204, and the second line 1304 shows 16 valleys or drops for the resonance frequencies of the vertical channels 1206. As shown, the resonant frequencies of the horizontal channels 1204 (FIG. 12) shown by dips or valleys in line 1302 are close several of the resonant frequencies of the vertical channels 1206 (FIG. 12) shown by line 1304. In other words, at least some of the resonant frequencies of the horizontal channels 1204 are the same or similar to at least some of the resonant frequencies of the vertical channels 1206. Thus, the total number of resonant frequencies needed to scan all of the channels 1204 and 1206 may be less than the total number of channels 1204 and 1206. An exact match of the overlapping resonant frequencies is not necessary to allow a single frequency to be used to scan both a horizontal channel 1204 and a vertical channel 1206.

A controller of the capacitive touch circuits described herein may include functionality for programming or configuring the controller. Such software may provide a graphical interface on a PC. Such software may be created with Borland visual C++ Builder, for example. The software may include various functions and components including, but not limited to: a block of library; the description of variables; the USB block of the Open Communication Port; the ADC block of the Read File; the block of decision of the solution; the visual block that created the graphic interface. The graphic interface may show an image that represents the area covered by channels. The graphic interface may also include controls such as a "start button", selecting service information, and may display a graphical indicator in the displayed area to represent a detected touch. If multiple touches are detected, two or more graphical indicators to represent the touches may be shown. The touches will be detected at different times due to the sequential scanning. However, the speed of change of the applied RF signal for the scanning is very high, and the touch sensor panel indicators appears as simultaneous multi-touch.

Figure 15:
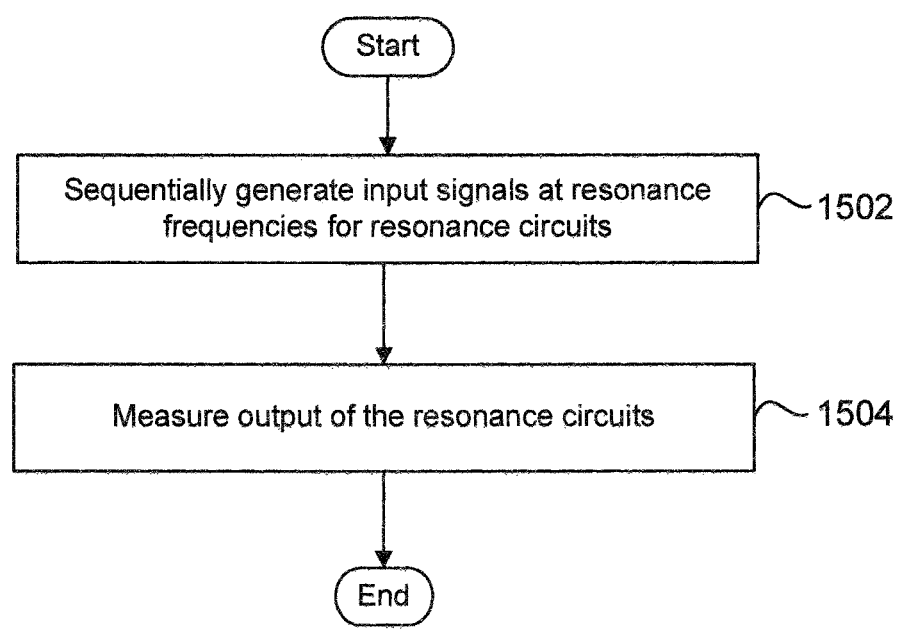
FIG. 15 is a flowchart of a method for controlling a touch sensor according to some embodiments.

FIG. 15 is a flowchart of a method for controlling a touch sensor (such as the touch sensor circuits 400 and 900 shown in FIGS. 4 and 9 or the touch sensor panels 700 and 1200 shown in FIG. 12) according to some embodiments. The touch sensor capacitive touch sensor includes a plurality of resonant circuits, each resonant circuit comprising at least one respective electrode, and each resonant circuit having a respective resonance frequency unique within the plurality of resonant circuits. At block 1502, generating input signals at each of the resonance frequencies are sequentially generated for input to the resonant circuits. This generating at block 1502 may include selectively generating input signals at each of the resonance frequencies in a cyclic or random hopping pattern, as described above. At block 1504, the output of the resonant circuits is measured to detect touch. This measurement may include ADC conversion and/or comparison as described above. The method may be adapted for controlling any of the touch sensor panels described above and may include the performing the functions of the controllers (such as controllers 600 and 1300 of FIGS. 6 and 13) described above.

The controller for a touch sensor (such as the controller 600 or 1300 shown in FIGS. 6 and 13) may be provided separately from the touch sensor panel. Since only a single input and single output may be required for various sizes, a single controller may be configured to work with touch sensor panels of various sizes and sensor resolutions.

In some embodiments, a single touch panel may include multiple sets channels, where each set of channels is connected to a respective input and output. For example, one set of horizontal channels could have a first input/output, and second set of vertical channels could have a second input/output. Each set of channels may be scanned sedately by a controller. Alternatively, a large panel may have multiple designated areas, where the channels in each area form their own circuit as described above, with their own input and output. A single controller may still control the multiple sets of channels (with resonant circuits), provided the necessary number of inputs and outputs are provided. A first set of resonance frequencies for a first set of channels may be repeated for a second set of channels that are on a different circuit.

The embodiments described herein may reduce the number of input and output connections required for capacitive touch sensor devices. Reducing the number of inputs and outputs required may allow for better use of space around the edges of a substrate layer, reduce controller complexity and increase the adaptability of the controller for use with different sensor devices. Furthermore, a single controller may be programmed to function with multiple differently configured touch sensor devices. The reduction in the amount of wires to be connected to the inputs and outputs may allow a single controller to be configured for both small and large panels by configuring the scanning process (e.g. the frequencies to be scanned).

It is to be understood that a combination of more than one of the approaches described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the claims.

The invention claimed is:

1. A capacitive touch sensor device comprising:
a substrate layer; and
a plurality of resonant circuits, each comprising at least one respective electrode, the electrodes of the plurality of resonant circuits being distributed on the substrate layer, and the plurality of resonant circuits having a plurality of resonance frequencies; and
wherein each resonant circuit comprises a respective first capacitor having a respective capacitance value and a respective inductor having a respective inductance value, the inductor and capacitor forming a resonant filter, the device further comprising, for each of at least one of the plurality of resonant circuits, a respective second capacitor connected between and in series with the electrode and the resonant filter and configured to reduce a resonance frequency swing caused by a touch event.

2. The capacitive touch sensor device of claim 1, wherein each of the plurality of resonant circuits has a respective resonance frequency, of the plurality of resonance frequencies, that is unique within the plurality of resonant circuits.

3. The capacitive touch sensor device of claim 1, wherein, for each said resonant circuit, the at least one respective electrode comprises at least one electrode strip.

4. The capacitive touch sensor device of claim 3, wherein the at least one electrode strip comprises a first electrode strip and a second electrode strip parallel to and spaced apart from the first electrode strip.

5. The capacitive touch sensor device of claim 1, further comprising a signal generator that generates signals that selectively excite resonances of each of the plurality of resonant circuits.

6. The capacitive touch sensor device of claim 5, further comprising a detector that measures responses of the plurality of resonant circuits.

7. The capacitive touch sensor device of claim 6, further comprising control circuitry that controls the signal generator and the detector to scan the plurality of resonant circuits, said scanning comprising generating signals that excite the resonant circuits, and measuring the responses of the plurality of resonant circuits.

8. The capacitive touch sensor device of claim 7, wherein said generating signals that excite the resonant circuits comprises generating signals that sequentially excite each of the resonant circuits.

9. The capacitive touch sensor device of claim 7, wherein
said generating signals that excite the resonant circuits comprises generating a signal that concurrently excites two or more of the resonant circuits, and
said measuring the responses of the plurality of resonant circuits comprises measuring a frequency response of the two or more concurrently excited resonant circuits.

10. The capacitive touch sensor device of claim 7, further comprising a controller that comprises the signal generator, the detector and the control circuitry, the plurality of resonant circuits being collectively connected to an output of the controller to receive the signals from the signal generator, and the plurality of resonant circuits being collectively connected to an input of the controller for the detector to measure the responses of the plurality of resonant circuits.

11. The capacitive touch sensor device of claim 2, further comprising at least one additional plurality of resonant circuits, each resonant circuit of the at least one additional plurality of resonant circuits comprising at least one respective electrode, the electrodes of the at least one additional plurality of resonant circuits being distributed on the substrate layer, wherein
for each said additional plurality of resonant circuits, each said resonant circuit of the additional plurality has a respective resonance frequency that is unique within the additional plurality of resonant circuits.

12. The capacitive touch sensor device of claim 11, further comprising:
a signal generator that generates signals that selectively excite resonances of each of the resonant circuits of the pluralities of resonant circuits;
a detector that measures responses of each of the pluralities of resonant circuits; and
switching circuitry connected to the signal generator for selectively exciting the pluralities of resonant circuits with the signals.

13. The capacitive touch sensor device of claim 12, further comprising control circuitry that controls the signal generator, the detector and the switching circuitry to scan each of the pluralities of resonant circuits, said scanning comprising, for each plurality of resonant circuits, generating the signals that excite each of the respective resonant circuits, and measuring the responses of the plurality of resonant circuits.

14. The capacitive touch sensor device of claim 11, wherein at least one of the resonant frequencies for at least two of the pluralities of resonant circuits are substantially similar.

15. The capacitive touch sensor device of claim 6, wherein the detector comprises at least one of: an analog to digital converter (ADC); and a comparator.

16. The capacitive touch sensor device of claim 1, wherein for each resonant circuit, a combination of the respective capacitance value of the first capacitor and the respective inductance value of the inductor unique within the plurality of resonant circuits.

17. The capacitive touch sensor device of claim 1, wherein the inductors of the plurality of resonant circuits are planar inductors, each planar inductor comprising at least one respective conductor layer on the substrate layer.

18. The capacitive touch sensor device of claim 17, wherein, for each said planar inductor, the at least one respective conductor layer comprises at least one spiral shaped inductor coil.

* * * * *

UNITED STATES PATENT AND TRADEMARK OFFICE
CERTIFICATE OF CORRECTION

PATENT NO. : 10,817,104 B2  
APPLICATION NO. : 15/752724  
DATED : October 27, 2020  
INVENTOR(S) : David et al.

Page 1 of 43

It is certified that error appears in the above-identified patent and that said Letters Patent is hereby corrected as shown below:

On the Title Page

In item (57) Abstract, replace:
"A common capacitive touch sensor may have a two dimensional array of transparent conductive strips going from edge to edge on a substrate layer or sheet of a touch sensor. According to some aspects, there is provided a capacitive touch sensor device including a substrate layer and a plurality of resonant circuits. Each resonant circuit includes an electrode, and each resonant circuit has a respective resonance frequency that is unique within the plurality of resonant circuits. The electrodes of the resonant circuits are distributed on the substrate layer. A controller for a touch sensor is also provided that includes a signal generator to drive at least one plurality of resonant circuits, where each resonant circuit has a respective resonance frequency. The signal generator is tunable to generate input signals at each of the resonance frequencies. The controller also includes a detector."

With:
--A common capacitive touch sensor may have a two dimensional array of transparent conductive strips going from edge to edge on a substrate layer or sheet of a touch sensor. According to some aspects, there is provided a capacitive touch sensor device including a substrate layer and a plurality of resonant circuits. Each resonant circuit includes an electrode, and each resonant circuit has a respective resonance frequency that is unique within the plurality of resonant circuits. The electrodes of the resonant circuits are distributed on the substrate layer. A controller for a touch sensor is also provided that includes a signal generator to excite at least one plurality of resonant circuits, where each resonant circuit has a respective resonance frequency. The signal generator is tunable to generate input signals to excite the resonant circuits. The controller also includes a detector for measuring the responses of the resonant circuits.--

In the Specification

In Column 1, Line 1 – Column 20, Line 37, replace:
"TOUCH SENSOR DEVICE AND METHOD Signed and Sealed this  
Twelfth Day of April, 2022

Drew Hirshfeld  
*Performing the Functions and Duties of the  
Under Secretary of Commerce for Intellectual Property and  
Director of the United States Patent and Trademark Office*

FIELD OF THE DISCLOSURE

The present disclosure relates generally to capacitive touch sensing technology, and more particularly to Radio Frequency (RF) touch sensing devices.

BACKGROUND

Of various interfaces available for interacting with a computer system, one of the easiest to use and understand is the touchscreen. This technology allows a user to simply touch an icon or picture to navigate through the system, display the information the user is seeking, and to enter data. For this reason, this technology is widely used in many applications, including desktop computers, tablet computers, mobile devices, bank machines, information kiosks, restaurants, cars, navigation systems, etc.

A number of different conventional touchscreen technologies exist. These methodologies include resistive, capacitive, surface acoustic wave, infrared, and optical touchscreen technology.

A common capacitive touch sensor (e.g. for a touchscreen) has a two dimensional array (e.g. criss-cross) of transparent conductive strips going from edge to edge on a substrate layer or sheet of a touch sensor. A number of conductor lines connect the strips to the inputs of a microcontroller. The transparent conductive stripes are typically made of indium-tin-oxide (ITO). Alternatively, a thin metal mesh may be deposited on a glass substrate. Each conductive strip may form a capacitor of around 50-200 pF in value, for example. A protective top layer of glass or plastic will typically cover the substrate layer and the conductive strips. When a human finger (or another member with a conductive surface) is applied over one of the conductive strips, the capacitance of this strip with respect to ground changes, and this change in capacitance is detectable. For example, the capacitance for the strip may increase by a value of 10 to 30 pF. Thus, by monitoring each conductive strip, it can be determined where the sensor was touched. For two-dimensional sensing, two overlapping sets of strips in perpendicular directions may be monitored, thereby allowing for determination of the position of the touch in two dimensions.

Conventional capacitive touch sensors may use self-capacitance or mutual capacitance. In self-capacitance touch sensors, the capacitance of each electrode strip is detected separately. In mutual capacitance touch sensors, the mutual capacitance between two electrode strips (e.g. two perpendicular channels) is detected. For example, in a grid of horizontal and vertical electrodes, the mutual capacitance at each intersection of the horizontal and vertical electrodes is monitored.

One method of detecting changes in capacitance is by individually monitoring resonant circuit outputs for changes. A radio frequency (RF) touch sensors may employ a plurality of resonant circuits, each including of inductor and capacitor (LCR circuit). The properties of such LCR resonant circuits, consisting of a series or parallel connection of inductor and capacitor, are well known. If an RF modulated voltage is applied, the impedance of an LCR resonant circuit depends on the frequency of the applied signal. The LCR resonant circuit has a resonance frequency that are a function of the inductance value of the inductor and the capacitance value of the capacitor. When the capacitance of a resonant circuit (or the mutual capacitance of a pair of perpendicular electrodes of two resonant circuits) changes, the resonant frequency for that circuit also changes. Thus, a change in the voltage at a test point on the resonant circuit may be detected due to the impedance change.

A resonant circuit including one or more electrode strips deposited on a substrate may commonly be referred to as a "channel". A conventional capacitive touch sensor may include multiple channels, each with the same resonant frequency. The multiple channels are typically sequentially scanned. Scanning is typically accomplished by sequentially driving electrodes of the channels with an input signal at the resonant frequency. This scanning method requires an input of each channel to be individually and separately connected to the input signal source so that the channels can be individually and separately driven. The channels must also have outputs individually connected to a detector. A controller including an input signal source and a detector typically controls the scanning process by selectively driving and measuring the output of the channels. As sensor size and/or resolution of the sensor increases, so does the number of electrodes and circuits being scanned. This, in turn, increases the number of connections that must be made between the inputs and outputs of the channels the controller. The high number of connections can take up substantial room on the substrate and also increases the number of wires or other connections between the touch sensor panel itself and the controller.

Another disadvantage of conventional capacitive touch sensors arises from the number of inputs and outputs being dependent on the number of channels included in the sensor. Different controllers and/or controller configurations may be needed to control different sensor devices due to the varying number of inputs and outputs that must be connected and managed. Controller complexity and cost may increase with a higher numbers of channels.

SUMMARY

According to one aspect, there is provided a capacitive touch sensor device comprising: a substrate layer; and a plurality of resonant circuits, each comprising at least one respective electrode, the electrodes of the plurality of resonant circuits being distributed on the substrate layer, and each of the plurality of resonant circuits having a respective resonance frequency that is unique within the plurality of resonant circuits.

In some embodiments, the capacitive touch sensor further comprises, a respective circuit input and a respective circuit output, the plurality of resonant circuits being collectively connected to the respective circuit input and collectively connected to the respective circuit output.

In some embodiments, for each said resonant circuit, the at least one respective electrode comprises at least one electrode strip.

In some embodiments, the at least one electrode strip comprises a first electrode strip and a second electrode strip parallel to and spaced apart from the first electrode strip.

In some embodiments, the capacitive touch sensor further comprises, a signal generator that selectively generates signals at each of the resonance frequencies to drive the plurality of resonant circuits.

In some embodiments, the capacitive touch sensor further comprises, a detector that measures output of the plurality of resonant circuits.

In some embodiments, the capacitive touch sensor further comprises, a processor that controls the tunable signal generator and the detector to scan the plurality of resonant circuits, said scanning comprising sequentially generating the signals at each of the resonant frequencies, and measuring the output of the plurality of resonant circuits.

In some embodiments, the capacitive touch sensor further comprises, a respective circuit input and a respective circuit output, the plurality of resonant circuits being collectively connected to the respective circuit input and collectively connected to the respective circuit output, wherein the touch sensor device comprises a controller that comprises the signal generator, the detector and the processor, the controller being connected to said circuit input to drive the plurality of resonant circuits with the signals, and the controller being connected to said circuit output for the detector to measure the output of the plurality of resonant circuits.

In some embodiments, the capacitive touch sensor further comprises, at least one additional plurality of resonant circuits, each resonant circuit of the at least one additional plurality of resonant circuits comprising at least one respective electrode, the electrodes of the at least one additional plurality of resonant circuits being distributed on the substrate layer, wherein for each said additional plurality of resonant circuits, each said resonant circuit of the additional plurality has a respective resonance frequency that is unique within the additional plurality of resonant circuits.

In some embodiments, the capacitive touch sensor further comprises: a signal generator that selectively generates signals at each of the resonance frequencies of the pluralities of resonant circuits; a detector that measures output of each of the pluralities of resonant circuits; and switching circuitry connected to the signal generator for selectively driving the pluralities of resonant circuits with the signals.

In some embodiments, the capacitive touch sensor further comprises, a processor that controls the signal generator, the detector and the switching circuitry to scan each of the pluralities of resonant circuits, said scanning comprising, for each plurality of resonant circuits, sequentially generating the signals at each of the respective resonant frequencies, and measuring the output of the plurality of resonant circuits.

In some embodiments, at least one of the resonant frequencies for at least two of the pluralities of resonant circuits are substantially similar.

In some embodiments, the detector comprises at least one of: an analog to digital converter (ADC); and a comparator.

In some embodiments, the detector comprises at least one of: an analog to digital converter (ADC); and a comparator.

In some embodiments, each resonant circuit comprises a respective capacitor having a respective capacitance value and a respective inductor having a respective inductance value, a combination of the respective capacitance value and the respective inductance value being unique within the plurality of resonant circuits.

In some embodiments, the inductors of the plurality of resonant circuits are planar inductors, each planar inductor comprising at least one respective conductor layer deposited on the substrate layer.

In some embodiments, for each said planar inductor, the at least one respective conductor layer comprises at least one spiral shaped inductor coil.

In some embodiments, the resonant frequencies of the at least one plurality of resonant circuits are in the Radio Frequency (RF) range, and the signal generator is a tunable RF signal generator.

According to another aspect, there is provided a method for a capacitive touch sensor comprising at least one plurality of resonant circuits, each plurality of resonant circuits having a respective plurality of resonance frequencies, the method comprising: for each said at least one plurality of resonant circuits: sequentially generating signals at each of the respective plurality of resonance frequencies for driving the plurality of resonant circuits; and measuring an output of the plurality of resonant circuits.

In some embodiments, said sequentially generating comprises selectively generating signals at each of the respective plurality of resonance frequencies in a cyclic or random hopping pattern.

According to another aspect, there is provided a controller for a capacitive touch sensor comprising at least one plurality of resonant circuits, each plurality of resonant circuits having a respective plurality of resonance frequencies, the controller comprising: a signal generator to drive the at least one plurality of resonant circuits, the signal generator being tunable to selectively generate signals at each of the resonance frequencies for driving the at least one plurality of resonant circuits; and a detector to measure output the at least one plurality of resonant circuits.

In some embodiments, the controller further comprises a processor that controls the signal generator and the detector to scan the at least one plurality of resonant circuits, said scanning comprising, for each said plurality of resonant circuits, sequentially generating the signals at each of the resonant frequencies, and measuring the output of the plurality of resonant circuits.

In some embodiments, the controller further comprises switching circuitry connected to the signal generator for selectively driving the at least one plurality of resonant circuits with the signals.

In some embodiments, the controller further comprises at least one output, each said at least one output for connecting to a corresponding input of a respective one of the at least one plurality of resonant circuits.

In some embodiments, the detector comprises at least one of: an analog to digital converter (ADC); and a comparator. According to an aspect, the present disclosure provides an apparatus comprising: a radio frequency device; a dielectric substrate layer, such as glass; a first conductive layer such as an ITO layer, a mesh metal layer, or other transparent or translucent conductive material forming strips on the dielectric substrate; another dielectric substrate layer with a second conductive layer forming strips thereon; the strips of the first and second conductive layers forming a criss-cross system; a number of capacitors and inductors connected in pairs around the periphery of the dielectric substrate layers, each pair including one of the conductors and one of the inductors in series or in parallel, and each pair connected to a respective strip to form a respective resonant circuit comprising, the resonant circuits collective connected to an input and an output.

Other aspects and features of the present disclosure will become apparent, to those ordinarily skilled in the art, upon review of the following description of the specific embodiments of the disclosure.

BRIEF DESCRIPTION OF THE DRAWINGS

The present disclosure will be better understood having regard to the drawings in which:

FIG. 1 is a schematic diagram of an example serial LCR resonant circuit;

FIG. 2 is a graph of first and second simulated frequency response curves of the LCR resonant circuit of FIG. 1;

FIG. 3 is a schematic diagram of a circuit that may be used in a capacitive touch sensor device according to one embodiment;

FIG. 4 is a schematic of an example capacitive touch circuit according to one embodiment;

FIG. 5A shows a graph of a simulated frequency response of the capacitive touch circuit of FIG. 4 in the absence of touch;

FIG. 5B shows a graph of a simulated frequency response of the capacitive touch circuit of FIG. 4 with a channel touched;

FIG. 6 is a block diagram of a controller that may be used to control a capacitive touch sensor according to some embodiments;

FIG. 7 is a top view of a touch sensor panel according to another embodiment;

FIG. 8A is a top view of a planar inductor coil according to one embodiment;

FIG. 8B is a top view of a planar inductor coil according to another embodiment;

FIG. 8C is a top view of a planar inductor coil according to still another embodiment;

FIG. 8D is a top view of a planar inductor coil according to yet another embodiment;

FIG. 9 is a layout of capacitive touch sensor circuit according to yet another embodiment;

FIG. 10 is an enlarged view of the layout of a first resonant circuit of the touch sensor circuit of FIG. 9;

FIG. 11 is a graph of a frequency response obtained for the capacitive touch circuit of FIG. 9

FIG. 12 is a top view of a capacitive touch sensor panel according to another embodiment;

FIG. 13 is a block diagram of a controller according to another embodiment that may be connected to the touch sensor panel of FIG. 12;

FIG. 14 is a graph of a frequency response for the touch sensor panel of FIG. 12; and FIG. 15 is a flowchart of a method for controlling a touch sensor according to some embodiments.

DETAILED DESCRIPTION

The present disclosure provides a capacitive sensing apparatus and method, which may be used for touch sensor panels (e.g. a touchscreen) that may be engaged with a finger or fingers, or any other conductive object such as a stylus. The touch sensor may implement one-dimensional or two-dimensional sensing.

While the embodiments shown in the figures and described below are capacitive touch sensors operating in the RF range, aspects of the disclosure may also be implemented in non-RF touch sensors.

FIG. 1 is a schematic diagram of an example serial LCR resonant circuit 100. The circuit 100 consists of a fixed resistor R1, a fixed inductor L, a fixed capacitor C0, a variable capacitance Cf, and an RF signal input 102. The fixed resistor R1, the fixed inductor L0 and the fixed capacitor C0 are connected in series between the RF signal input 102 and ground 103. The fixed capacitor C0 is connected to ground 108. The variable capacitance Cf is connected in parallel with the fixed capacitor C0 and represents additional capacitance induced by an external conductive object like a human finger touching the circuit 100. The fixed capacitor C0 represents the capacitance of an ITO strip or a mesh metal deposit on a glass substrate and an additional external capacitance. The value of the induced variable capacitance Cf is typically around 10 pF. The variable capacitance Cf will not be present in the absence of touch. The value of the fixed capacitor C0 may be set, for example, at a value not more than ten times the variable capacitance Cf. In this example, the fixed capacitor C0 is set at 100 pF. The value of the fixed inductance in this example is 10 .mu.H, such that the resonance frequency is in the single digit megahertz range. FIG. 1 shows also a series resistor RL, which represents resistance of the inductor and other parasitic resistive losses. The resistance RL in this example is assumed to be 3 ohm in this example. The fixed resistor R1 is 100 ohm in this example. Of course, values of the resistors, capacitors, and inductors of LCR resonant circuits used in a touch sensor may vary. The specific values provided above are only by way of example. An output point 104 of the circuit 100 is also shown in FIG. 1.

FIG. 2 is a graph 200 of first and second simulated frequency response curves 202 and 204 of the circuit 100 of FIG. 1 taken at the output point 104. The first curve 202 shows the frequency response of the circuit with no touch (i.e. without the variable capacitance Cf). The second curve 204 shows the frequency response of the circuit including the variable capacitance Cf during a touch event. As shown in FIG. 2, the first curve 202 is an upside down bell shape curve with the peak resonance frequency of 5.05 MHz. In this example, the resonance frequency goes down to 4.8 MHz when the variable capacitor (from touch) is connected. As shown in FIG. 2, if the frequency of the input signal is continuously 5.05 MHz, and the circuit is touched, the input impedance of the circuit 100 at that frequency increases (because the resonance frequency has changed) and the voltage amplitude at the output point 104 (shown in FIG. 1) will rise. FIG. 2 shows an approximate rise in voltage of 20 dB at 5.05 MHz. This calculation does not take into account the internal resistance of the voltage source; in real life, the voltage change is typically not so drastic. The width and depth of the first and second curves 202 and 204 depend on the specific value of the series resistance R1. Typically, the width of the first and second curves will increase with an increasing resistance for R1, and the depth of the first and second curves will decrease with an increasing resistance for R1.

As discussed above, conventional capacitive touch sensor panels may require a large number of connections between the electrodes in the touch sensor panel and a signal generator (such as an RF signal generator). For example, a touch sensor panel with a 10.times.10 grid of electrode channels may require 20 separate input connections and 20 separate output connections for a self-capacitance configuration, and 10 inputs and 10 outputs for a mutual capacitance configuration. The inputs and outputs may be an RF signal at a single frequency that is time-multiplexed to all inputs. These connections may require a significant amount of space on the edges of the touch sensor panel and a large bundle of wires to connect the touch sensor panel to the controller. Thus, it may be desirable to reduce the number of connections required, which may free up space near the edges of the touch sensor panel and may simplify controller connection and construction. Some embodiments described herein use what may be considered input signal frequency multiplexing which may reduce the number of inputs and outputs required, as will be described below.

FIG. 3 is a schematic diagram of a circuit 300 design that may be used in a capacitive touch sensor device 350 according to one embodiment. The circuit 300 includes a plurality of resonant circuits 302a. 302b, 302c, 302d, 302e, 302f, 302g, 302h, 302i and 302j connected in parallel to a single tunable RF signal generator 301. A fixed resistor 303 is connected in series between the tunable RF signal generator 301 and the resonant circuits 302a to 302j. Each resonant circuit 302a to 302j includes a respective inductor 304a to 304j connected in series to a respective capacitor 306a to 306j between the RF signal generator 301 (via resistor 303) and ground 308. FIG. 3 also shows an output point 310 of the circuit 300 to which all of the resonant circuits 302a to 302j are connected.

The capacitor 306a to 306j for each resonant circuit 302a to 302j is connected to ground. Each of the resonant circuits 302a to 302j has a resonance frequency that is unique within the set of resonant circuits 302a to 302j. In this example, the inductance value is the same for all inductors 304a to 304j, but the capacitors 306a to 306j each have a different capacitance as follows: first capacitor 306a is 220 pF; second capacitor 306b is 180 pF; third capacitor 306c is 150 pF; fourth capacitor 306d is 120 pF; fifth capacitor 306e is 100 pF; sixth capacitor 82f is 180 pF; seventh capacitor 306g is 68 pF; eighth capacitor 306h is 58 pF; ninth capacitor 306i is 47 pF; and tenth capacitor 306j is 39 pF. The varying capacitances provide the unique resonance frequencies for the resonant circuit 302a to 302j.
In other embodiments, the inductance of each resonant circuit (in addition to instead of the capacitance) may vary to provide the unique resonance frequencies.

The tunable RF signal generator 301 is tunable to selectively generate an output at each of the unique resonant frequencies for driving the resonant circuits 302a to 302j. For an input signal at a given resonant frequency of one of the resonant circuits 302a to 302j, only the resonant circuit 302a to 302j having that resonance frequency may experience a significant voltage drop, while the remaining resonant circuits 302a to 302j may appear to have high input impedance. If the capacitance of one of the resonant circuits 302a to 302j changes, due to a touch, then its resonance frequency will also change. Take for example the first resonant circuit 302a having a first unique resonance frequency. A touch event is represented in by variable capacitance 312 in FIG. 3. In the event of touch on the first resonant circuit 302a, then the actual resonance frequency for the first resonant circuit 302a changes due to the combined capacitance 312 and 306a. Thus, when the signal generator V1 is tuned to the first unique resonance frequency for the first resonant circuit 302a, the measured output will change (a dB increase) in the presence of the touch. By sequentially tuning the tunable RF signal generator 301 through the unique resonance frequencies for all resonant circuits 302a to 302j, each of the circuits may be sequentially scanned to detect for a capacitance change due to touch. The tunable RE signal generator 301 may comprise a single signal generator with one or more tunable elements that alters the frequency of signals generated. In other embodiments, a signal generator may be tunable in that multiple signal generating sources are present for different frequencies, and a switching mechanism may control which signal generating source is actually providing output at a given time.

FIGS. 4 to 6 illustrate one example of how the above concepts above may be implemented, including the placement of electrodes.

FIG. 4 is a schematic of an example capacitive touch circuit 400 similar to the circuit 300 in FIG. 3, according to one embodiment. The capacitive touch circuit 400 in FIG. 4 includes a plurality of resonant circuits 402a to 402j collectively connected to a circuit input 404, via a resistor R, and to ground 406. Ten resonant circuits 402a to 402j are shown in FIG. 4, but the actual number of resonant circuits will vary in other embodiments. The capacitive touch circuit 400 also includes a circuit output 408 connected to each of the resonant circuits 402a to 402j. The resonant circuits 402a to 402j are connected in parallel to the input 404 (via resistor R). The circuit output 408 and circuit input 404 are connected to opposite terminals of the resistor R in this embodiment.

The first resonant circuit 402a includes an inductor L1, a capacitor C1, a first ITO strip 410a and a second ITO strip 412a. The first and second ITO strips 410a and 412a form a pair and run parallel to each other. The ITO strips are deposited onto a transparent dielectric substrate layer (not shown). The first and second ITO strips effectively form a capacitor. The capacitor C1 is connected between the first and second ITO strips 410a and 412a, thus being connected parallel to the capacitor formed by the first and second parallel and spaced apart ITO strips 410a and 412a. The capacitance of the pair of ITO strips 410a and 412a is extremely low, and the capacitor C1 and the pair of strips 410a and 412a together provide a total capacitance several times higher than the capacitance created by the touching finger.

Embodiments are not limited to ITO for electrodes, and other conductive (possibly transparent or translucent) materials may be used. Electrodes may be deposited or printed using a chemical process, or may also be laser printed onto the substrate layer. Typical ITO strips may have a resistance of approximately 100 ohms/square. A relatively low resistance of the electrode strips may be preferable to reduce diminishment of the RF signals. Electrodes formed by a fine metal mesh may provide a lower resistance than conventional ITO strips, and may, therefore, be more suitable for larger touch panels. Embodiments are not limited to any particular type of electrode. The shape of the electrodes may also vary and electrodes are not necessarily strips. For example, some embodiments may include electrodes in one or more other shapes such as rectangles or circles, rather than strips.

The inductor L1 is connected between the RF input (via resistor 406) and the first ITO strip 410a. The second ITO strip 412 is connected to ground (as well as the capacitor C1). Thus, as shown in FIG. 4, the inductor L1 of the first resonant circuit is in series with the capacitor C1 and the effective capacitor formed by the parallel first and second ITO strips 410a and 410b. The remaining resonant circuits 402b to 402j are all similarly arranged with respective capacitors (C2, C3, C4, C5, C6, C7, C8, C9, C10), inductors (L2, L3, L4, L5, L6, L7, L8, L9 and L10), first ITO strips (410b, 410c, 410d, 410e, 410f, 410g, 410h, 410i, 410j) and second ITO strips (412b, 412c, 412d, 412e, 412f, 412g, 412h, 412i, 412j), together forming respective touch sensitive "channels" 414b to 414j.

The inductors L1 to L10 and capacitors C1 to C10 in these resonant circuits 402a to 402j are chosen to provide a set of unique resonance frequencies, where each resonant circuit resonates at a slightly different frequency. The resonance frequencies are unique within the resonant circuits 402a to 402j. However, in embodiments including multiple sets of resonant circuits, resonant frequencies in two or more sets may overlap. The set of unique frequencies may be chosen based on a permissible tuning range and bandwidth of the RF input 404. For example, in certain environments, the allowable RF frequency operating bandwidth may be limited or dictated by regulations, other equipment, etc. The spread between adjacent resonant frequencies for the channels may be chosen to be sufficiently large to enable clear distinction between channels, though the actual spread may vary in different embodiments.

The capacitors C1 to C10 may be lumped circuit elements or they may be made as part of multilayer touch panel structure. For example, the capacitors C1 to C10 may be a chip capacitor or may formed by a deposition of one or more additional layers of conductive material on the substrate layer. A multilayer structure may be preferable since it may typically not be practical to solder surface mount chip capacitors on a glass or any dielectric substrates. The inductors L1 to L10 may also be lumped circuit elements or they may be made as part of multilayer touch panel structure.

It may be possible to distinguish a touch on any particular channel 414a to 414j, as will be discussed in more detail below. The touch sensitive channels 414a to 414j may be distributed on the substrate layer to form a one-dimensional touch sensor system. For example, the electrodes 410a to 410j and 412a to 412j of the channels 414a to 414j may extend substantially across the substrate layer to form a touch sensitive panel.

FIG. 5A shows a graph 500 of a simulated frequency response of the capacitive touch circuit 400 shown in FIG. 4 when none of the channels 414a to 414j is touched. The simulation was produced in Spice.TM.. As shown in FIG. 5A, the circuit includes 10 resonant frequencies indicated by the 10 separate valleys or drops in the output decibel level. FIG. 5B shows a graph 550 of a simulated frequency response of the capacitive touch circuit 400 shown in FIG. 4 when the sixth channel 414f (shown in FIG. 4) is touched. As shown, the sixth resonant frequency 552 (also shown in FIG. 5A) has shifted from about 8.57 MHz to about 8.11 MHz, due to the capacitance of the channel increasing by 10 pF. If the applied RE input is tuned to 8.57 MHz, then by touching the corresponding pair of ITO strips, the measured output signal amplitude of the capacitive touch circuit 400 will change the amount AdB shown in FIG. 5B (which is approximately 15 dB in this example). The change in output level, when detected, is treated as a touch event for the sixth channel 414f.

FIG. 6 is a block diagram of a controller 600 for a capacitive touch sensor according to some embodiments. The controller 600 may be used to control the capacitive touch sensor circuit 400 shown in FIG. 4 as well as other capacitive touch circuits in various devices. The controller includes a tunable RE signal generator 630 connected to controller output 631, a detector 632 connected to controller input 633, a processor 634, and a memory 636. The tunable RF signal generator 630 is output (via wire 628) for input to the panel 601. The detector 632 is also connected to the processor 634. The tunable RF signal generator 630 is connected to and controlled by the processor 634. The detector 632 receives and measures output from the panel 601 via wire 629. The memory 636 is connected to the processor 634 and stores executable instructions thereon to cause the processor 634 to control the RF signal generator 630 and the detector 632 as described below. In other embodiments, the processor 634 may be configured without use of external memory to control the RF signal generator 630 and the detector 632.

The controller 600 shown in FIG. 6 may be connected to control the capacitive touch circuit 400 shown in FIG. 4. Specifically, the controller output 631 (FIG. 6) may be connected to the circuit input 404 (FIG. 4) of the touch circuit 404, and the controller input 633 (FIG. 6) may be connected to the circuit output 408 (FIG. 4) of the touch circuit 400. In operation, the RF signal generator 630 of the controller 600 may sequentially scan the unique resonant frequencies of all channels 414a to 414j of the capacitive touch circuit 400 to detect touch events on the channels 414a to 414j. The channels 414a to 414j may be scanned sequentially or in any random order. If more than one channel 414a to 414j is out of resonance, a multi-touch event is registered. The scanning sequence may follow a repeating sequence or a random hopping pattern.

To perform the scanning functionality, the processor 634 of the controller 600 controls the RF signal generator 630 to selectively and sequentially generate RF signals at each of the unique resonance frequencies. The detector 632 measures the output received by the controller (via controller input 633) originating from circuit output 408 in FIG. 4 and passes the measurements to the processor. The detector 632 may include an Analog to Digital Converter (ADC) for converting the RF output to digital signals for transmission to the processor 634. The detector 632 and/or the processor 634 also include a comparator to compare the measured output levels to the expected non-touch output level. The processor 634 analyzes the measurements to detect touch events on the channels 604 and 606. For example, if there is a change from the expected amplitude output for a particular resonance frequency, then the processor 634 determines that the particular channel 414a to 414j corresponding to that resonance frequency is touched. The input generated by the RF signal generator may remain at a given selected frequency for period of time. When multiple capacitance changes are detected on multiple channels, the microcontroller may register a multiple touch event.

In other embodiments, some or all of the controller circuitry (including the tunable signal generator and/or the detector) may be integrated directly into a touch sensor panel rather than included in a separate controller.

A person skilled in the art will appreciate that other resonant circuit configurations may also be used where each resonant circuit of a group of resonant circuits has a different resonant frequency. The example circuit configuration shown in FIGS. 2 and 4 to 6 are provided by way of example, and embodiments are not limited to this configuration. Any suitable resonant circuits that can be provided with different resonance frequencies may be used, and embodiments are not limited to the LCR type circuits shown in the figures.

In some embodiments, measuring the output (e.g. by the detector 632 in FIG. 6) is performed by measuring the amplitude of the voltage output from the capacitive touch circuit.

In some embodiments, two perpendicular sets of channels may be used to provide a two-dimensional touch sensor (such as a touchscreen for a mobile device or other electronic display panel). The system may still only require a single RF source may still be used for channel excitation and a single touch registration output. Each of the channels of both perpendicular sets could be connected to the single input and to the single output to enable scanning of both sets of channels.

FIG. 7 is a top view of a touch sensor panel 700 according to another embodiment. The touch sensor panel 700 includes a substrate layer 702. Distributed on the substrate layer 702 are horizontal channels 704 and vertical channels 706. Each horizontal channel 704 is a resonant circuit including a respective capacitor 710 and inductor 712 connected to a pair of first and second horizontal electrode strips 704a and a 704b in a manner similar to the channels 414a to 414j of FIG. 4. Each vertical channel 706 is a resonant circuit including a respective capacitor 710 and inductor 712 connected to a pair of first and second vertical electrode strips 706a and a 706b in a manner similar to the channels 414a to 414j of FIG. 4. A resistor 713 is also shown in FIG. 7 and is arranged similarly to the resistor R in FIG. 4.

Each channel 704 and 706 in FIG. 7 has a unique combination of capacitance and inductance values to provide a unique resonance frequency (similar to the capacitive touch circuit 400 in FIG. 4). The horizontal channels 704 and the vertical channels 706 are distributed on opposite respective faces of the substrate layer 702. For example, the vertical channels 706 may be on a top face 705, and the horizontal channels 704 may be on a bottom face (now shown), or vice versa. Alternatively, the sets of horizontal and vertical channels 704 and 706 may be arranged on two different substrate layers (not shown) that are stacked on one another. Any conventional method of arranging a two dimensional array of touch sensitive channels on one or more substrate layers may be used.

As seen in this example, the horizontal channels 704 extend between opposite side edges 714 and 716 of the substrate layer 702, while the vertical channels extend substantially from the top 718 to the bottom 720 of the substrate layer 702. Each channel may include a pair of electrodes, an inductor 712 and a capacitor 710 arranged similar to the channels 414a to 414j of the capacitive touch circuit 400 shown in FIG. 4. The horizontal and vertical channels 704 and 706 are collectively connected to a single circuit input 724 and also collectively connected to a single circuit output 726 in this example. A controller (such as the controller 600 shown in FIG. 6) including a tunable signal generator and/or detector may be connected (e.g. using wires) to the substrate layer 702 via the circuit input 724 and the circuit output 726 to scan the channels 704 and 706. The touch sensor panel 700 may be integrated together with a controller within a single device housing (not shown). For example, the housing may be in the form of a protective tablet housing complete with gaskets and/or other seals to protect the touch sensor panel 700, as well as other parts of a tablet. The touch sensor panel 700 may typically include a transparent protective layer (not shown) such as glass or plastic covering the substrate layer 702 and the channels 704 and 706. In other embodiments, some or all of the controller circuitry (including the tunable signal generator and/or the detector) may be integrated in to the touch sensor panel 700 rather than included in a separate controller.

Each channel the 704 and 706 has a unique resonance frequency. Thus, by scanning each of the channels 704 and 706 (by cycling through the resonance frequencies and detecting changes in output when tuned to each frequency), touch may be registered in two dimensions. The two dimensional arrangement of the channels 704 and 706 will create mutual capacitances between the channels. This may be taken into account when configuring how touch is detected.

A controller, such as the controller 600 shown in FIG. 6, may selectively drive the channels 704 and 706 in the touch sensor panel 700 and may detect touch events. For the two dimensional sensing, the controller may detect a touch event on at least one horizontal channel 704 and at least one vertical channel 706.

A single touch may affect and be detected for multiple channels to varying degrees. For example, a touch on one channel may affect the adjacent channel(s) to a lesser degree. A touch between two channels may affect those two channels in a similar manner. By measuring the degree of output change for multiple channels, a controller may infer the location of a touch event, even though that touch event is not directly over a given single channel.

As mentioned above, some embodiments may use a multilayer structure to create the capacitors in the resonant circuits (such as capacitors C1 to C10 in FIG. 4). Examples of calculations of the capacitance that may be achieved using a multilayer structure are provided below. The usual dielectrics used in touch sensor panel manufacturing are the polyethylene terephthalate (PET) and various kinds of adhesives. The dielectric constant of the PET is typically within the range of 3 to 3.5, and most suitable adhesive materials for holding dielectric layers (such as PET) together have dielectric constant around 1.5. The thickness of the PET films varies between 50 um to 250 um, and the thickness of the adhesive layer is usually between 25 and 150 um.

The above results mean that if a mutual capacitive touch sensor panel has ITO strips 1 cm wide each, and they cross each other at the right angle, the capacitance of this two-layer structure at every intersection may be between 8.85 pF to 62 pF depending on the type and thickness of the dielectric substrate. The capacitance may be varied by changing the width of the strip or by adding areas on the periphery of the touch sensor panel. If more than two layers are used this addition may take very little room on the side of the touch sensor panel, since the capacitance doubles, triples, etc. For a self-capacitive touch sensor panel, on the other hand, there may be only a single layer of dielectric substrate. Thus, to increase capacitance may require increasing the capacitive area. Thus, electrodes and/or fixed capacitor elements of resonant circuits with a desired capacitance may be created using planar conductor (e.g. ITO or metal) on a substrate layer.

In some embodiments, inductors (such as the inductors L1 to L10 in FIG. 4) may be deposited on the dielectric substrate layer, similar to electrode strips. For example, planar spiral inductors may be used in some embodiments. Planar spiral inductors may be less expensive than either chip or coil inductors for surface based designs. Each inductor may include at least one layer of a conductor on a substrate layer. The one or more conductor layers may define one or more spiral-shaped inductor coil.

A multilayer inductor creates mutual inductance, and may be difficult to simulate. The simulation process may take a long time, and the results may be inconsistent. However, for a two layer inductor, the following two equations may be used for the coupling value, KC, to obtain the total inductor value with a mutual inductance: $Lt = L1 + L2 + 2*Kc*(L1+L2)^2$ When both inductor layers have the same pattern, the formula is simplified: Lt=2L*(1+K*C)

From the experiments the coupling coefficient may be approximately in the range of 0.5-0.7 on a standard Printed Circuit Board (PCB) with 62 mil thickness.

FIGS. 8A to 8D show example planar inductor coils, according to some embodiments, that may be deposited or printed onto a substrate, such as a PCB.

FIG. 8A is a top view of an inductor 802 with a square spiral shape. The inductor 802 is created by depositing silver ink or metal mesh on a glass or transparent polyester layer. The inductor 802 is a single layer inductor with 10 mm outer diameter DOUT1, traces having 125 um width W1 that are spaced apart by a 125 um trace spacing S1, and having 15 turns. The inner diameter DIN1 shown in FIG. 8A is 2.75 mm. This inductor may, for example, have approximately to have 1.64 uH inductance, although embodiments are not limited to any particular inductance. The inner diameter DIN provides space for a ferromagnetic core (not shown) to be inserted.

For a two layer structure, with each layer using a layout similar to those shown in FIG. 8A, the coupling coefficient KC has been found to be approximately 0.5 for experiments with 62 mil PCB. However, for a thinner PCB spacer the coupling coefficient KC may be higher. Assuming that KC=0.5, the total inductance of a two layer structure may be approximately 2*1.64 uH*(1+0.5)=4.92 uH. A four-layer inductor may have the value of 14.76 uH, and an eight-layer inductor will have 44.28 uH. A ferromagnetic core in the center of the inductor may increase the inductance value even further.

The total resistance of the coil of an inductor may be very important. The total length of a single layer flat inductor may be estimated as the length of the outer turn multiplied by the number of turns. Using the layout of the inductor 802 in FIG. 8A, the estimated length would be approximately 60 cm for a single layer inductor. If the inductor 802 may be printed from silver ink, which has a resistivity approximately twice as high as the resistivity of pure silver and equals to $2*10^{-6}$ ohm/cm, the total DC resistance of the single layer inductor 802 may be approximately 3.2 ohm. A two layer or two-sided inductor using the same layout may have a DC resistance of 6.4 ohm. A four layer or four-sided inductor may be approximately 12.8 ohm. An eight layer or eight-sided inductor may be approximately 25.4 ohm.

The series resistance of the coil affects the LCR quality factor Q. The quality factor Q may be calculated by the formula Q=1/R*SQUARE (L/C), where R is the series resistance, L is the inductance and C is the capacitance. The quality factor Q may need to be at least 10 for the circuit to properly resonate. A higher the Q factor may also provide better frequency resolution (channel separation) of the frequency response curve, such that the resonance frequencies of the channels may be placed closer to each other occupying less overall frequency band. To increase the Q factor, it may be necessary to lower the series resistance and/or raise the inductance of the inductor. It may be less practical to alter capacitance to increase the Q factor because the capacitance value may need to stay in the same order of magnitude as the finger touch, which may be around 10 pF.

FIG. 8B is a top view of an inductor 804 with a hexagonal spiral shape. The values of DOUT2, DIN2, W2 and S2 shown in FIG. 8B may be the same or different than DOUT1, DIN1, W1 and S1 shown in FIG. 8A depending on the desired inductance.

FIG. 8C is a top view of an inductor 806 with an octagonal spiral shape. The values of DOUT3, DIN3, W3 and S3 shown in FIG. 8B may be the same or different than DOUT1, DIN1, W1 and S1 shown in FIG. 8A depending on the desired inductance.

FIG. 8D is a top view of an inductor 808 with a circular spiral shape. The values of DOUT4, DIN4, W4 and S4 shown in FIG. 8B may be the same or different than DOUT1, DIN1, W1 and S1 shown in FIG. 8A depending on the desired inductance. The inductance of the example inductors in FIGS. 8A to 8D depends on the exact materials (substrate and conductor) used as well as the geometry of the inductor coil. The inductance may range from 1 .mu.H to 100 .mu.H, for example, depending on the specific dimensions and materials.

By varying the dimensions of the inductors 802, 804, 806 and 808 in FIGS. 8A to 8D, including the number of turns, a variety of inductances may be provided as desired. For example, using such designs, variations in the inductances may be provided for achieving multiple unique resonance frequencies in a capacitive touch circuit (such as the circuit 400 shown in FIG. 4). For example, a plurality of similar inductors could be arranged on a PCB, for either one or two dimensional sensing, with each inductor having a slight variation in one or more dimensions.

The flat inductors made of several layers of silver ink or other conductor printed of a dielectric film have their own capacitance. This capacitance of the inductor may be used as a capacitance part of a resonant circuit, such that an additional external capacitor is not needed. When the number of turns in the inductor coil changes, both the inductance and self-capacitance change, thereby also changing the resonance frequency of the resonant circuit. Thus, by using different numbers of coil turns and/or geometrical variations for inductors in different channels, different resonance frequencies for the channels may achieved.

FIG. 9 shows a layout of an example capacitive touch sensor circuit 900. The capacitive touch sensor circuit 900 may be manufactured as a copper-on-PCB circuit. The capacitive touch sensor circuit 900 includes ten resonant circuits 902a to 902j forming ten respective channels 904a to 904j that are similar to the channels 914a to 914j in FIG. 4. The number of channels may vary in other embodiments. Each resonant circuit 902a to 902j and includes a respective includes a respective planar inductor 906a to 906j deposited on the PCB and a respective chip capacitor 908a to 908j. The channels 904a to 904j, inductors 906a to 906j and capacitors 908a to 908j are connected similar to the capacitive touch sensor circuit 400 shown in FIG. 4.

Each planar inductor 906a to 906j is a square spiral structure similar to that of the inductor 802 shown in FIG. 8A, but with several more turns. The planar inductors 906a to 906j all have the same dimensions and inductance. Unique resonance frequencies in this example are provided by varying the capacitance of varying capacitances of the capacitors 908a to 908j.

FIG. 10 is an enlarged view of the layout of the first single resonant circuit 902a of the touch circuit 900 of FIG. 9, including the first channel 904a, the first inductor 906a and the first capacitor 908a. Ground connection 910a and circuit input connection 912a are also visible in FIG. 10. The remaining resonant circuits 902b to 902j (shown in FIG. 9) are similarly connected.

Turning again to FIG. 9, to obtain an operating frequency range in the single digit megahertz range the value of the inductors 906a to 906j should be in the single digit micro Henry range. On the experimental touch panel circuit that was manufactured, the inductors 906a to 906j were manufactured as square two-layer inductors. The inductors 906a to 906j each have approximate dimensions of 13.times.13 mm, conductive trace width of 0.2 mm with spacing in between of 0.2 mm, and 14 turns. The measured value of the inductance was approximately 3.9 uH, which was confirmed by the resonant frequency calculation and measurement. The capacitors 908a to 908j are ceramic capacitors of the 0603 size, although the particular capacitor used in other embodiments may vary.

The manufactured inductors 906a to 906j have shown the following approximate results (per inductor): single side inductance is 1.13 uH; total inductance is 3.90 uH, mutual magnetic coupling is 0.72; inductor series resistance is 2.75 ohms; and parasitic capacitance of capacitor pads is between 7.4 pF and 8.1 pF. To decrease the size of the planar coil inductor a multilayer structure may be used. When the number of layers doubles the inductance may triple because of the mutual inductance between the layers contributes.

The value of inductance may be increased, or the size may be decreased keeping the same value, by inserting a ferrite core inside the coil. Including a ferrite rod may increase the resonance frequency, based on some experimentation.

FIG. 11 is a graph 1100 of a frequency response obtained for the capacitive touch circuit 900 of FIG. 9. As seen in FIG. 11, the frequency response shows 10 separate valleys indicating different resonance frequencies for the ten channels.

While the examples described above include two electrode strips per channel, with one electrode strip in each channel connected to ground, other embodiments may not include electrodes connected to ground as part of the channel. Rather, some embodiments may utilize channels that comprise a single electrode and omit the second electrode connected to ground.

Government regulations may limit the total bandwidth available for use in a touchscreen device (e.g. an RF touchscreen), which may limit the number and spread of resonance frequencies that may be used. For this or other reasons it may be desirable to limit the number of resonance frequencies used in a touch sensor device. In some embodiments, a touch sensor device may include two or more sets of resonant circuits (forming two or more sets of channels). Specifically, the touch sensor device may include a first plurality or set of resonant circuits as described above, as well as one or more additional pluralities or sets of resonant circuits. Each of the sets of resonant circuits may include one or more electrodes distributed on the substrate layer. For example, the first set could form horizontal channels, and a second set could form vertical channels. Alternatively, different sets of channels (resonant circuits) could provide coverage for different areas of a panel. Each set of resonant circuits may have a corresponding set of resonance frequencies, each being unique within the respective set.

Each set of resonant circuits may include a separate input connection (e.g. connected to a controller having a signal generator). Output from a single tunable signal generator may be switched between inputs for the sets of resonant circuits to selectively drive sets of resonant circuits. For example, switching circuitry may be connected to the tunable signal generator for selectively driving the sets of resonant circuits. Two or more sets of resonant circuits may include one or more common (i.e. same or substantially similar) resonance frequencies. Thus, the resonance frequencies for two or more sets of resonant circuits may at least partially overlap. Thus, signals from a single tunable signal generator may be used to drive and scan multiple sets of resonant circuits having at least some common resonance frequencies. In this manner, the total number of resonance frequencies used in a touch circuit device may be less than the total number of resonant circuits, but the number of connections (e.g. wires) needed to connect to the resonant circuits (i.e. channels) for scanning may still be reduced in comparison to conventional touch sensor devices. Alternatively, two or more tunable signal generators may be separately connected to drive two or more respective sets of resonant circuits. In still other embodiments, two or more signal generators may be used to drive separate sets of resonant circuits.

FIG. 12 is a top view of a layout for a capacitive touch sensor panel 1200 (in the form of a panel) according to yet another embodiment. The capacitive touch panel includes conductor elements discussed below printed, deposited or etched on a substrate. The substrate in this example is a PCB and including a top PCB layer 1202 and a bottom PCB layer that underlays the top PCB layer in this example, although another substrate (such as a transparent substrate) may be used as well. The touch sensor panel 1200 is a single plane pattern.

The capacitive touch sensor panel 1200 in this embodiment includes horizontal channels 1204 and vertical channels 1206. In this embodiment, each of the vertical and horizontal channels 1206 arranged as part of resonant circuits similar to the resonant circuits 402a to 402j in FIG. 4, but with no electrode connected directly to physical ground. Instead, each channel 1204 and 1206 includes a single electrode 1212 or 1214, which has a diamond pattern as discussed below. In this capacitive touch sensor panel 1200, the human finger acts as a virtual path to ground (via anything touched by the user).

The capacitive touch sensor panel 1200 may be manufactured using copper (or another conductor) on the top PCB layer 1202 and the bottom PCB layer. In this embodiment the electrodes 1214 of the vertical channels 1206 are formed on a top surface (not visible in FIG. 12) of the bottom PCB layer. The conductor portions of the vertical channels 1206 including the electrodes 1214 are shown as solid black in FIG. 12 for illustrative purposes, but would normally not be visible through the top PCB layer 1202. The electrodes 1212 of the horizontal channels 1204 are formed on a bottom surface (not visible in FIG. 12) of the top PCB layer 1202, and thus face the electrodes 1214 of the vertical channels 1206. The conductor portions of the horizontal channels 1204 including the electrodes 1212 are shown as outlined white in FIG. 12 for illustrative purposes, but would not normally be visible through the top PCB layer 1202. To prevent contact between the vertical channels 1206 and the horizontal channels 1204, an insulating layer (such as a solder mask) is provided between the horizontal and vertical channels 1204 and 1206. In other embodiments, a single substrate layer (e.g. PCB or a transparent substrate) may be used with horizontal channels on one face of the substrate layer, and horizontal channels on the opposite face. Embodiments are not limited to any particular arrangement of multiple layers of channels and/or substrate layers.

Each horizontal channel 1204 and each vertical channel 1206 includes a respective pair of a lump capacitor 1208 or 1218 and a lump inductor 1209 or 1219 (as opposed to PCB traces for planar inductors and/or capacitor). The lump capacitors 1208 for the horizontal channels 1204 are each indicated by the respective vertically arranged capacitor icon 1208 shown in first legend section 1230 of FIG. 10. The lump inductors 1209 for the horizontal channels 1204 are each indicated by the respective horizontally arranged inductor icon 1209 shown in the first legend section 1230. The lump capacitors 1218 for the vertical channels 1206 are each indicated by the respective horizontally arranged capacitor icon 1218 shown in second legend section 1232 of FIG. 10. The lump inductors 1219 for the horizontal channels 1204 are each indicated by the respective vertically arranged inductor icon 1219 shown in the second legend section 1232.

The horizontal channels 1204 are collectively connected to a first input/output port 1240 and are collectively connected to ground 1242 (with each horizontal channel 1204 having the corresponding capacitor 1208 and inductor 1209 connected in series between the first input/output port 1240 and ground 1242). The vertical channels 1206 are collectively connected to a second input/output port 1244 and are also collectively connected to ground 1242 (with each horizontal channel 1206 having the corresponding capacitor 1218 and inductor 1219 connected in series between the second input/output port 1244 and ground 1242).

The horizontal channels 1204 each have a different respective resonance frequency. The vertical channels 1206 each have a different respective resonance frequency. The resonance frequencies for the horizontal channels 1204 and the resonance frequencies for the vertical channels 1206 partially overlap in this embodiment. In particular, the capacitive touch sensor panel 1200 includes twelve horizontal channels 1204 and sixteen vertical channels 1206. For each horizontal channel 1204, the respective capacitor 1208 and inductor 1209 pair are a different combination of capacitance and inductance to provide a resonance frequency for each channel 1204 and 1206 that is different than the other horizontal channels. The vertical channels 1206 similarly each have a respective resonance frequency, provided by the capacitors 1218 and inductors 1219, that is different than the other vertical channels. The twelve resonance frequencies for the horizontal channels 1204 are repeated for the vertical channels 1206, and the vertical channels 1206 include four additional frequencies (for 16 total). However, it is to be understood that the number of unique frequencies may vary. For example, the number and/or spread of frequencies used may depend on needs of the device and/or government regulations.

The capacitors 1208 and 1218 and inductors 1209 and 1219 may all located on a top surface 1222 of the top PCB layer 1202 and connected through the top PCB layer 1202 and the bottom PCB layer (not shown) to the electrodes 1212 and 1214, respective first and second input/output ports 1240 and 1244 and ground 1242 as needed. Other arrangements are also possible. Any suitable arrangement connecting circuit elements together into the layout shown in FIG. 12 may be used.

A touch event on the capacitive touch sensor panel 1200 may register a change in capacitance for at least one horizontal channel 1204 and at least one vertical channel 1206, thereby enabling a determination of a position of the touch event in two dimensions.

As shown in FIG. 12, each of the vertical and horizontal channels 1204 and 1206 includes the single elongated electrode strip 1212 or 1214 that each form several consecutive diamond shapes 1215 along their length. These diamond shapes 1215 do not overlap. Rather, horizontal channels 1204 intersect the vertical channels 1206 at narrow portions 1252 of the electrodes 1212 and 1214 between adjacent diamond shapes 1215.

The electrodes 1212 and 1214 are not directly connected to a ground plane, and the capacitors 1208 and 1218 and inductors 1209 and 1219 do not overlap on the ground plane. Therefore, the electrodes 1212 and 1214 will "hover" over the top PCB 1202 layer and the bottom PCB layer (not shown). The horizontal and vertical channels 1204 and 1206 are connected to a physical ground via ground connection 1242. The touch of a finger provides a virtual ground through the body. Thus, when a human finger is applied to the touch sensor panel 1200, the amplitude read at the outputs will increase due to the change in capacitance, despite the absence the ground plane. In an experimental setting, the layout described above provided an output amplitude change of 5 to 6 percent from a touch event.

FIG. 13 is a block diagram of a controller 1300 that may be connected to control the touch sensor panel 1200 shown in FIG. 12. The controller 1300 includes a processor 1302, a memory 1304, tunable RF signal generator 1306, detector 1308 and switch 1310. The memory 1304 stores computer-executable code thereon for causing the processor 1302 to perform functions described below. In other embodiments, the memory 1304 may be incorporated as part of the processor 1302, rather than external to the processor 1302 as shown in FIG. 13. The processor 1302 is also connected to communicate with the tunable RF signal generator 1306, the detector 1308, and the switch 1310. The communication may include providing control signals to the tunable RF signal generator 1306, the detector 1308 and the switch 1310, as well as receiving, as input, data output from the detector 1308.

A first output terminal 1312 of the controller 1300 may be connected to the first input/output port 1240 for horizontal channels 1204 of the touch sensor panel 1200 of FIG. 12 to drive the horizontal channels 1204. A second output terminal 1314 of the controller 1300 may be connected to the second input/output port 1244 for vertical channels 1206 of the touch sensor panel 1200 of FIG. 12 to drive the vertical channels 1206.

RF signals generated by the tunable RE signal generator 1306 are selectively output through the switch 1310 to either a first output terminal 1312 or a second output terminal 1314 as directed by the processor 1302. The tunable RF signal generator 1306 in this example is capable of selectively generating signals (for input to the touch sensor panel 1200) at each of the resonant frequencies of the horizontal and vertical channels 1204 and 1206 (shown in FIG. 12). The processor 1302 controls the switch 1310 and the tunable RF signal generator 1306 to scan each of the horizontal and vertical channels 1204 and 1206. For example, the switch 1310 may first be set to direct the RF signals to the first output terminal 1312 while the tunable RF signal generator 1306 cycles through all of the resonance frequencies for the horizontal channels 1204. Then the switch 1310 may be set to direct the RF signals to the second output 1314 terminal while the tunable RF signal generator 1306 cycles through all of the resonance frequencies for the vertical channels 1206. Other scanning sequences may also be used (including random sequences).

The detector 1308 in this example includes an ADC 1316 and a comparator 1318. The detector 1308 is connected to controller input terminal 1320 to receive, as input, the output from the touch sensor panel 1200 (shown in FIG. 12). The controller input terminal 1320 may also be connected to the first and second output ports 1240 and 1244 of the touch sensor panel 1200 to measure the output for the horizontal and vertical channels 1204 and 1206 (shown in FIG. 12). The detector 1308 receives analog output from the touch sensor panel 1200 and first converts the analog signal to digital values using the ADC 1316. The digital values are compared to expected output levels (e.g. expected output for no touch event) by the comparator 1318. The comparison data from the comparator 1318 is passed to the processor 1302. Based on the output from the detector 1308, the current state of the switch 1310 and the current selected resonance frequency, the processor determines which of the horizontal channels 1204 and which of the vertical channels 1206 (shown in FIG. 12) is currently touched.

The tunable RF signal generator 1306 may include a synthesizer chip or circuit. The switch 1310 of the controller 1300 may include a PIN diode (not shown) that can divert the RE signal from the tunable RE signal generator 1306 to the first or second output terminals 1312 and 1314. The processor 1302 (or possibly the switch 1310) may include a switch driver control circuit that controls the PIN diode. The switch driver control circuit may turn the PIN diode on and off, for example, by applying a forward or reverse bias. The switch driver control circuit may use a low-pass filter between the RE signal generator and the switch. FIG. 14 is a graph 1400 of a frequency response obtained for the capacitive touch sensor panel 1200 of FIG. 12. A first, solid line 1302 is shown for the frequency response of the horizontal channels 1204 and a second, dotted line 1304 is shown for the frequency response of the vertical channels 1206. The first line 1302 shows 12 valleys or drops for the 12 resonant frequencies of the horizontal channels 1204, and the second line 1304 shows 16 valleys or drops for the resonance frequencies of the vertical channels 1206. As shown, the resonant frequencies of the horizontal channels 1204 (FIG. 12) shown by dips or valleys in line 1302 are close several of the resonant frequencies of the vertical channels 1206 (FIG. 12) shown by line 1304. In other words, at least some of the resonant frequencies of the horizontal channels 1204 are the same or similar to at least some of the resonant frequencies of the vertical channels 1206. Thus, the total number of resonant frequencies needed to scan all of the channels 1204 and 1206 may be less than the total number of channels 1204 and 1206. An exact match of the overlapping resonant frequencies is not necessary to allow a single frequency to be used to scan both a horizontal channel 1204 and a vertical channel 1206.

A controller of the capacitive touch circuits described herein may include functionality for programming or configuring the controller. Such software may provide a graphical interface on a PC. Such software may be created with Borland visual C++ Builder, for example. The software may include various functions and components including, but not limited to: a block of library; the description of variables; the USB block of the Open Communication Port; the ADC block of the Read File; the block of decision of the solution; the visual block that created the graphic interface. The graphic interface may show an image that represents the area covered by channels. The graphic interface may also include controls such as a "start button", selecting service information, and may display a graphical indicator in the displayed area to represent a detected touch. If multiple touches are detected, two or more graphical indicators to represent the touches may be shown. The touches will be detected at different times due to the sequential scanning. However, the speed of change of the applied RF signal for the scanning is very high, and the touch sensor panel indicators appears as simultaneous multi-touch.

FIG. 15 is a flowchart of a method for controlling a touch sensor (such as the touch sensor circuits 400 and 900 shown in FIGS. 4 and 9 or the touch sensor panels 700 and 1200 shown in FIG. 12) according to some embodiments. The touch sensor capacitive touch sensor includes a plurality of resonant circuits, each resonant circuit comprising at least one respective electrode, and each resonant circuit having a respective resonance frequency unique within the plurality of resonant circuits. At block 1502, generating input signals at each of the resonance frequencies are sequentially generated for input to the resonant circuits. This generating at block 1502 may include selectively generating input signals at each of the resonance frequencies in a cyclic or random hopping pattern, as described above. At block 1504, the output of the resonant circuits is measured to detect touch. This measurement may include ADC conversion and/or comparison as described above. The method may be adapted for controlling any of the touch sensor panels described above and may include the performing the functions of the controllers (such as controllers 600 and 1300 of FIGS. 6 and 13) described above.

The controller for a touch sensor (such as the controller 600 or 1300 shown in FIGS. 6 and 13) may be provided separately from the touch sensor panel. Since only a single input and single output may be required for various sizes, a single controller may be configured to work with touch sensor panels of various sizes and sensor resolutions.

In some embodiments, a single touch panel may include multiple sets channels, where each set of channels is connected to a respective input and output. For example, one set of horizontal channels could have a first input/output, and second set of vertical channels could have a second input/output. Each set of channels may be scanned sedately by a controller. Alternatively, a large panel may have multiple designated areas, where the channels in each area form their own circuit as described above, with their own input and output. A single controller may still control the multiple sets of channels (with resonant circuits), provided the necessary number of inputs and outputs are provided. A first set of resonance frequencies for a first set of channels may be repeated for a second set of channels that are on a different circuit.

The embodiments described herein may reduce the number of input and output connections required for capacitive touch sensor devices. Reducing the number of inputs and outputs required may allow for better use of space around the edges of a substrate layer, reduce controller complexity and increase the adaptability of the controller for use with different sensor devices. Furthermore, a single controller may be programmed to function with multiple differently configured touch sensor devices. The reduction in the amount of wires to be connected to the inputs and outputs may allow a single controller to be configured for both small and large panels by configuring the scanning process (e.g. the frequencies to be scanned).

It is to be understood that a combination of more than one of the approaches described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the claims."

With:
--TOUCH SENSOR DEVICE AND METHOD

Related Application

This application claims priority to U.S. Patent Application Serial No. 15/190,329 filed June 23, 2016, the entire contents of which are incorporated herein by reference.

Field of the Disclosure

The present disclosure relates generally to capacitive touch sensing technology, and more particularly to Radio Frequency (RF) touch sensing devices.

Background

Of various interfaces available for interacting with a computer system, one of the easiest to use and understand is the touchscreen. This technology allows a user to simply touch an icon or picture to navigate through the system, display the information the user is seeking, and to enter data. For this reason, this technology is widely used in many applications, including desktop computers, tablet computers, mobile devices, bank machines, information kiosks, restaurants, cars, navigation systems, etc.

A number of different conventional touchscreen technologies exist. These methodologies include resistive, capacitive, surface acoustic wave, infrared, and optical touchscreen technology.

A common capacitive touch sensor (e.g. for a touchscreen) has a two dimensional array (e.g. criss-cross) of transparent conductive strips going from edge to edge on a substrate layer or sheet of a touch sensor. A number of conductor lines connect the strips to the inputs of a microcontroller. The transparent conductive strips are typically made of indium-tin-oxide (ITO). Alternatively, a thin metal mesh may be deposited on a glass substrate. Each conductive strip may form a capacitor of around 50-200pF in value, for example. A protective top layer of glass or plastic will typically cover the substrate layer and the conductive strips. When a human finger (or another member with a conductive surface) is applied over one of the conductive strips, the capacitance of this strip with respect to ground changes, and this change in capacitance is detectable. For example, the capacitance for the strip may increase by a value of 10 to 30pF. Thus, by monitoring each conductive strip, it can be determined where the sensor was touched. For two-dimensional sensing, two overlapping sets of strips in perpendicular directions may be monitored, thereby allowing for determination of the position of the touch in two dimensions. Touch position resolution can be improved further, calculating using the relative levels of responses of sets of adjacent strips.

Conventional capacitive touch sensors may use self-capacitance or mutual capacitance. In self-capacitance touch sensors, the capacitance of each electrode strip is detected separately. In mutual capacitance touch sensors, the mutual capacitance between two electrode strips (e.g. two perpendicular channels) is detected. For example, in a grid of horizontal and vertical electrodes, the mutual capacitance at each intersection of the horizontal and vertical electrodes is monitored.

One method of detecting changes in capacitance is by individually monitoring resonant circuit responses for changes, radio frequency (RF) touch sensors may employ a plurality of resonant circuits, each including an inductor and capacitor (LCR circuit). The properties of such LCR resonant circuits, consisting of a series or parallel connection of inductor and capacitor, are well known. If an RF modulated voltage is applied, the impedance of an LCR resonant circuit depends on the frequency of the applied signal. The LCR resonant circuit has a resonance frequency that is a function of the inductance value of the inductor and the capacitance value of the capacitor. When the capacitance of a resonant circuit (or the mutual capacitance of a pair of perpendicular electrodes) changes, the resonant frequency for that circuit also changes. Thus, a change in the voltage at a test point on the resonant circuit may be detected due to the impedance change.

A resonant circuit including one or more electrode strips on a substrate may commonly be referred to as a "channel". A conventional capacitive touch sensor may include multiple channels, each with the same resonant frequency. The multiple channels are typically sequentially scanned. Scanning is typically accomplished by sequentially exciting electrodes of the channels with an input signal at the resonant frequency. This scanning method requires an input of each channel to be individually and separately connected to an output of the signal source so that the channels can be individually and separately excited. The channels must also each be individually connected to a separate input of a detector. A controller including the signal source and a detector typically controls the scanning process by selectively driving/exciting and measuring the response of the channels. As sensor size and/or resolution of the sensor increases, so does the number of electrodes and circuits being scanned. This, in turn, increases the number of input connections and output connections required by the controller to individually connect each of the channels. The high number of connections can take up substantial room on the substrate and also increases the number of wires or other connections between the touch sensor panel itself and the controller.

Another disadvantage of conventional capacitive touch sensors arises from the number of input and output connections between the channels and the controller being dependent on the number of channels included in the sensor. Different controllers and/or controller configurations are typically needed to control different sensor devices due to the varying number of inputs and outputs that must be connected and managed. Controller complexity and cost may increase with a higher numbers of channels.

Summary

According to one aspect, there is provided a capacitive touch sensor device comprising: a substrate layer; and a plurality of resonant circuits, each comprising at least one respective electrode, the electrodes of the plurality of resonant circuits being distributed on the substrate layer, and the plurality of resonant circuits having a plurality of resonance frequencies.

In some embodiments, each of the plurality of resonant circuits has a respective resonance frequency, of the plurality of different resonance frequencies, that is unique within the plurality of resonant circuits.

In some embodiments, for each said resonant circuit, the at least one respective electrode comprises at least one electrode strip.

In some embodiments, the at least one electrode strip comprises a first electrode strip and a second electrode strip parallel to and spaced apart from the first electrode strip.

In some embodiments, the device further comprises a signal generator that generates signals that selectively excite resonances of each of the plurality of resonant circuits.

In some embodiments, the device further comprises a detector that measures responses of the plurality of resonant circuits.

In some embodiments, the device further comprises control circuitry that controls the tunable signal generator and the detector to scan the plurality of resonant circuits, said scanning comprising generating signals that excite the resonant circuits, and measuring the responses of the plurality of resonant circuits.

In some embodiments, said generating signals that excite the resonant circuits comprises generating signals that sequentially excite each of the resonant circuits.

In some embodiments, said generating signals that excite the resonant circuits comprises generating a signal that concurrently excites two or more of the resonant circuits, and said measuring the responses of the plurality of resonant circuits comprises measuring a frequency response of the two or more concurrently excited resonant circuits.

In some embodiments, the device further comprises a controller that comprises the signal generator, the detector and the control circuitry, the plurality of resonant circuits being collectively connected to an output of the controller to receive the signals from the signal generator, and the plurality of resonant circuits being collectively connected to an input of the controller for the detector to measure the responses of the plurality of resonant circuits.

In some embodiments, the device further comprises at least one additional plurality of resonant circuits, each resonant circuit of the at least one additional plurality of resonant circuits comprising at least one respective electrode, the electrodes of the at least one additional plurality of resonant circuits being distributed on the substrate layer, wherein for each said additional plurality of resonant circuits, each said resonant circuit of the additional plurality has a respective resonance frequency that is unique within the additional plurality of resonant circuits.

In some embodiments, the device further comprises: a signal generator that generates signals that excite resonances of each of the resonant circuits of the pluralities of resonant circuits; a detector that measures responses of each of the pluralities of resonant circuits; and switching circuitry connected to the signal generator for selectively exciting the pluralities of resonant circuits with the signals.

In some embodiments, the device further comprises control circuitry that controls the signal generator, the detector and the switching circuity to scan each of the pluralities of resonant circuits, said scanning comprising, for each plurality of resonant circuits, generating the signals that excite each of the respective resonant circuits, and measuring the responses of the plurality of resonant circuits.

In some embodiments, at least one of the resonant frequencies for at least two of the pluralities of resonant circuits are substantially similar.

In some embodiments, the detector comprises at least one of: an analog to digital converter (ADC); and a comparator.

In some embodiments, each resonant circuit comprises a respective capacitor having a respective capacitance value and a respective inductor having a respective inductance value, a combination of the respective capacitance value and the respective inductance value being unique within the plurality of resonant circuits.

In some embodiments, each resonant circuit comprises a respective capacitor having a respective capacitance value and a respective inductor having a respective inductance value, and the inductors of the plurality of resonant circuits are planar inductors, each planar inductor comprising at least one respective conductor layer on the substrate layer.

In some embodiments, for each said planar inductor, the at least one respective conductor layer comprises at least one spiral shaped inductor coil.

According to another aspect, there is provided a method for a capacitive touch sensor comprising at least one plurality of resonant circuits, each plurality of resonant circuits having a respective plurality of resonance frequencies, the method comprising: for each said at least one plurality of resonant circuits: generating signals that excite resonances of each of the respective plurality of resonant circuits; and measuring a responses of the plurality of resonant circuits.

In some embodiments, said generating comprises generating signals that selectively and sequentially excite each of the respective plurality of resonant circuits in a cyclic or hopping pattern.

According to another aspect, there is provided a controller for a capacitive touch sensor comprising at least one plurality of resonant circuits, each plurality of resonant circuits having a respective plurality of resonance frequencies, the controller comprising: a signal generator that generates signals that excite resonances of each of the at least one plurality of resonant circuits, the signal generator being tunable to generate signals that selectively excite the resonant circuits of the at least one plurality of resonant circuits; and a detector to measure responses of the at least one plurality of resonant circuits.

In some embodiments, the controller further comprises control circuitry that controls the signal generator and the detector to scan the at least one plurality of resonant circuits, said scanning comprising, for each said plurality of resonant circuits, generating the signals that sequentially excite the plurality of resonant circuits, and measuring the responses of the plurality of resonant circuits.

In some embodiments, the controller further comprises switching circuitry connected to the signal generator for selectively exciting the at least one plurality of resonant circuits with the signals.

In some embodiments, the controller further comprises at least one output connection, each said at least one output connection of the controller being for connecting to a corresponding input connection of a respective one of the at least one plurality of resonant circuits.

In some embodiments, each resonant circuit comprises a respective capacitor having a respective capacitance value and a respective inductor having a respective inductance value, the inductor and capacitor forming a resonant filter, the device further comprising, for each of at least one of the plurality of resonant circuits, a respective capacitor connected in series between the electrode and the resonant filter.

Other aspects and features of the present disclosure will become apparent, to those ordinarily skilled in the art, upon review of the following description of the specific embodiments of the disclosure.

Brief Description of the Drawings

The present disclosure will be better understood having regard to the drawings in which:

Figure 1 is a schematic diagram of an example serial LCR resonant circuit;

Figure 2 is a graph of first and second simulated frequency response curves of the LCR resonant circuit of Figure 1;

Figure 3 is a schematic diagram of a circuit that may be used in a capacitive touch sensor device according to one embodiment;

Figure 4 is a schematic of an example capacitive touch circuit according to one embodiment;

Figure 5A shows a graph of a simulated frequency response of the capacitive touch circuit of Figure 4 in the absence of touch;

Figure 5B shows a graph of a simulated frequency response of the capacitive touch circuit of Figure 4 with a channel touched;

Figure 6 is a block diagram of a controller that may be used to control a capacitive touch sensor according to some embodiments;

Figure 7 is a top view of a touch sensor panel according to another embodiment;

Figure 8A is a top view of a planar inductor coil according to one embodiment;

Figure 8B is a top view of a planar inductor coil according to another embodiment;

Figure 8C is a top view of a planar inductor coil according to still another embodiment;

Figure 8D is a top view of a planar inductor coil according to yet another embodiment;

Figure 9 is a layout of a capacitive touch sensor circuit according to yet another embodiment;

Figure 10 is an enlarged view of the layout of a first resonant circuit of the touch sensor circuit of Figure 9;

Figure 11 is a graph of a frequency response obtained for the capacitive touch circuit of Figure 9

Figure 12 is a top view of a capacitive touch sensor panel according to another embodiment;

Figure 13 is a block diagram of a controller according to another embodiment that may be connected to the touch sensor panel of Figure 12;

Figure 14 is a graph of a frequency response for the touch sensor panel of Figure 12;

Figure 15 is a flowchart of a method for controlling a touch sensor according to some embodiments;

Figure 16 is a partial view of a modified version of the capacitive touch circuit of Figure 4.

Detailed Description

The present disclosure provides a capacitive sensing apparatus and method, which may be used for touch sensor panels (e.g. a touchscreen) that may be engaged with a finger or fingers, or any other conductive object such as a stylus. The touch sensor may implement one-dimensional or two-dimensional sensing.

While the embodiments shown in the figures and described below are capacitive touch sensors operating in the RF range, aspects of the disclosure may also be implemented in non-RF touch sensors.

Figure 1 is a schematic diagram of an example serial LCR resonant circuit 100. The circuit 100 consists of a fixed resistor R1 , a fixed inductor L, a fixed capacitor CO, a variable capacitance Cf, and an RF signal input 102. The fixed resistor R1 , the fixed inductor L and the fixed capacitor CO are connected in series between the RF signal input 102 and ground 108. The fixed capacitor CO is connected to ground 108. The variable capacitance Cf is connected in parallel with the fixed capacitor CO and represents additional capacitance induced by an external conductive object like a human finger touching the circuit 100. The fixed capacitor CO represents the capacitance of an ITO strip or a mesh metal deposit on a glass substrate and an additional external capacitance. The value of the induced variable capacitance Cf is typically around 10pF. The variable capacitance Cf will not be present in the absence of touch. The value of the fixed capacitor CO may be set, for example, at a value not more than ten times the variable capacitance Cf. In this example, the fixed capacitor CO is set at 10OpF. The value of the fixed inductance in this example is 10μH, such that the resonance frequency is in the single digit megahertz range. Figure 1 shows also a series resistor RL, which represents resistance of the inductor and other parasitic resistive losses. The resistance RL in this example is assumed to be 3 Ohms in this example. The fixed resistor R1 is 100 Ohms in this example. Of course, values of the resistors, capacitors, and inductors of LCR resonant circuits used in a touch sensor may vary. The specific values provided above are only by way of example. A response measurement point 104 of the circuit 100 is also shown in Figure 1 .

Figure 2 is a graph 200 of first and second simulated frequency response curves 202 and 204 of the circuit 100 of Figure 1 taken at the response measurement point 104. The first curve 202 shows the frequency response of the circuit with no touch (i.e. without the variable capacitance Cf). The second curve 204 shows the frequency response of the circuit including the variable capacitance Cf during a touch event. As shown in Figure 2, the first curve 202 is an upside down bell shape curve with the peak resonance frequency of 5.05 MHz. In this example, the resonance frequency goes down to 4.8 MHz when the variable capacitor (from touch) is connected. As shown in Figure 2, if the frequency of the input signal is continuously 5.05 MHz, and the circuit is touched, the input impedance of the circuit 100 at that frequency increases (because the resonance frequency has changed) and the voltage amplitude at the response measurement point 104 (shown in Figure 1 ) will rise. Figure 2 shows an approximate rise in voltage of 20dB at 5.05 MHz. This calculation does not take into account the internal resistance of the voltage source; in real life, the voltage change is typically not so drastic. The width and depth of the first and second curves 202 and 204 depend on the specific value of the series resistance R1 . Typically, the width of the first and second curves will increase with an increasing resistance for R1 , and the depth of the first and second curves will decrease with an increasing resistance for R1 .

As discussed above, conventional capacitive touch sensor panels may require a large number of connections between the electrodes in the touch sensor panel and a signal generator (such as an RF signal generator). For example, a touch sensor panel with a 10x10 grid of electrode channels may typically require 20 separate input and output connections and sometimes more connections for mutual capacitance configurations. The input signal may be an RF signal at a single frequency that is time-multiplexed to all input connections. These input and output connections may require a significant amount of space on the edges of the touch sensor panel and a large bundle of wires to connect the touch sensor panel to the controller. Thus, it may be desirable to reduce the number of connections required, which may free up space near the edges of the touch sensor panel and may simplify controller connection and construction.

Some embodiments described herein use what may be considered input signal frequency multiplexing which may reduce the number of input and output connections required, as will be described below.

Figure 3 is a schematic diagram of a circuit 300 design that may be used in a capacitive touch sensor device according to one embodiment. The circuit 300 includes a plurality of resonant circuits 302a, 302b, 302c, 302d, 302e, 302f, 302g, 302h, 302i and 302j connected in parallel to a single tunable RF signal generator 301 . A fixed resistor 303 is connected in series between the tunable RF signal generator 301 and the resonant circuits 302a to 302j. Each resonant circuit 302a to 302j includes a respective inductor 304a to 304j connected in series to a respective capacitor 306a to 306j between the RF signal generator 301 (via resistor 303) and ground 308. Figure 3 also shows an output point 310 of the circuit 300 to which all of the resonant circuits 302a to 302j are connected.

The capacitor 306a to 306j for each resonant circuit 302a to 302j is connected to ground. Each of the resonant circuits 302a to 302j has a resonance frequency that is unique within the set of resonant circuits 302a to 302j. In this example, the inductance value is the same for all inductors 304a to 304j, but the capacitors 306a to 306j each have a different capacitance as follows: first capacitor 306a is 220pF; second capacitor 306b is 180pF; third capacitor 306c is 150pF; fourth capacitor 306d is 120pF; fifth capacitor 306e is 10OpF; sixth capacitor 82f is 180pF; seventh capacitor 306g is 68pF; eighth capacitor 306h is 58pF; ninth capacitor 306i is 47pF; and tenth capacitor 306j is 39pF. The varying capacitances provide the unique resonance frequencies for the resonant circuit 302a to 302j. In other embodiments, the inductance of each resonant circuit (in addition to or instead of the capacitance) may vary to provide the unique resonance frequencies.

The tunable RF signal generator 301 is tunable to selectively generate a signal output to excite each of the resonant circuits 302a to 302j. The signal output is an RF signal generated at or near each of the unique resonance frequencies sequentially in this example. It is to be understood references to a signal being "at a resonant frequency" in this disclosure are meant to include a signal that is near, rather than precisely matching, that frequency. For greater clarity, for the purpose of this disclosure, a signal may be considered "at" the resonant frequency if it is within the bandwidth assigned to a given touch sensor channel. In some embodiments, the signals generated to sequentially excite the resonant circuits may be intentionally offset some amount from the exact resonant frequencies.

For an input signal at (or near) a given resonant frequency of one of the resonant circuits 302a to 302j, only the resonant circuit 302a to 302j having that resonant frequency may experience a significant voltage drop, while the remaining resonant circuits 302a to 302j may appear to have high input impedance. If the capacitance of one of the resonant circuits 302a to 302j changes, due to a touch, then its resonance frequency will also change. Take for example the first resonant circuit 302a having a first unique resonance frequency. A touch event is represented by variable capacitance 312 in Figure 3. In the event of touch on the first resonant circuit 302a, then the actual resonance frequency for the first resonant circuit 302a changes due to the combined capacitance 312 and 306a. Thus, when the signal generator is tuned to the first unique resonance frequency for the first resonant circuit 302a, the measured response will change (a dB increase) in the presence of the touch. By sequentially tuning the tunable RF signal generator 301 through the unique resonance frequencies for all resonant circuits 302a to 302j, each of the circuits may be sequentially scanned to detect a capacitance change due to touch. The tunable RF signal generator 301 may comprise a single signal generator with one or more tunable elements that alters the frequency of signals generated. In other embodiments, a signal generator may be tunable in that multiple signal generating sources are present for different frequencies, and a switching mechanism may control which signal generating source is actually providing output at a given time.

Figures 4 to 6 illustrate one example of how the above concepts above may be implemented, including the placement of electrodes.

Figure 4 is a schematic diagram of an example capacitive touch circuit 400 similar to the circuit 300 in Figure 3, according to one embodiment. The capacitive touch circuit 400 in Figure 4 includes a plurality of resonant circuits 402a to 402j collectively connected to an RF signal input 404, via a resistor R, and to ground 406. The RF signal input 404 may be output from a signal generator (not shown). Ten resonant circuits 402a to 402j are shown in Figure 4, but the actual number of resonant circuits will vary in other embodiments. The capacitive touch circuit 400 also includes a circuit output connection 408 connected to each of the resonant circuits 402a to 402j. The resonant circuits 402a to 402j are connected in parallel to the RF signal input 404 (via resistor R). The circuit output connection 408 and RF signal input 404 are connected to opposite terminals of the resistor R in this embodiment.

The first resonant circuit 402a includes an inductor L1, a capacitor C1, a first ITO strip 410a and a second ITO strip 412a. The first and second ITO strips 410a and 412a form a pair and run parallel to each other. The ITO strips are deposited onto a transparent dielectric substrate layer (not shown). The first and second ITO strips effectively form a capacitor. The capacitor C1 is connected between the first and second ITO strips 410a and 412a, thus being connected parallel to the capacitor formed by the first and second parallel and spaced apart ITO strips 410a and 412a. The capacitance of the pair of ITO strips 410a and 412a is extremely low, and the capacitor C1 and the pair of strips 410a and 412a together may typically provide a total capacitance several times higher than the capacitance created by the touching finger. However, embodiments are not limited to such arrangements.

Embodiments are not limited to ITO for electrodes, and other conductive (possibly transparent or translucent) materials may be used. Electrodes may be deposited or printed using a chemical process, or may also be printed onto the substrate layer. Typical ITO strips may have a resistance of approximately 100 Ohms/square. A relatively low resistance of the electrode strips may be preferable to reduce diminishment of the RF signals. Electrodes formed by a fine metal mesh may provide a lower resistance than conventional ITO strips, and may, therefore, be more suitable for larger touch panels. Embodiments are not limited to any particular type of electrode. The shape of the electrodes may also vary and electrodes are not necessarily strips. For example, some embodiments may include electrodes in one or more other shapes such as rectangles or circles, rather than strips.

The inductor L1 is connected between the RF signal input 404 (via resistor 408) and the first ITO strip 410a. The second ITO strip 412a is connected to ground (as well as the capacitor C1 ). Thus, as shown in Figure 4, the inductor L1 of the first resonant circuit is in series with the capacitor C1 and the effective capacitor formed by the parallel first and second ITO strips 410a and 412a. The remaining resonant circuits 402b to 402j are all similarly arranged with respective capacitors (C2, C3, C4, C5, C6, C7, C8, C9, C10), inductors (L2, L3, L4, L5, L6, L7, L8, L9 and L10), first ITO strips (410b, 410c, 41 Od, 41 Oe, 41 Of, 41 Og, 41 Oh, 41 Oi, 41 Oj) and second ITO strips (412b, 412c, 412d, 412e, 412f, 412g, 412h, 412i, 412j), together forming respective touch sensitive "channels" 414b to 414j.

The inductors L1 to L10 and capacitors C1 to C10 in these resonant circuits 402a to 402j are chosen to provide a set of unique resonance frequencies, where each resonant circuit resonates at a different frequency. The resonance frequencies are unique within the resonant circuits 402a to 402j. However, in embodiments including multiple sets of resonant circuits, resonant frequencies in two or more sets may overlap. The set of unique frequencies may be chosen based on a permissible tuning range and bandwidth of the RF signal input 404. For example, in certain environments, the allowable RF frequency operating bandwidth may be limited or dictated by regulations, other equipment, etc. The spread between adjacent resonant frequencies for the channels may be chosen to be sufficiently large to enable clear distinction between channels, though the actual spread may vary in different embodiments.

The capacitors C1 to C10 may be lumped circuit elements or they may be made as part of multilayer touch panel structure. For example, the capacitors C1 to C10 may be a chip capacitor or may be formed by a deposition of one or more additional layers of conductive and dielectric material on the substrate layer. A multilayer structure may be preferable since it may typically not be practical to solder surface mount chip capacitors on a glass or any dielectric substrates. The inductors L1 to L10 may also be lumped circuit elements or they may be made as part of multilayer touch panel structure.

It may be possible to distinguish a touch on any particular channel 414a to 414j, as will be discussed in more detail below. The touch sensitive channels 414a to 414j may be distributed on the substrate layer to form a one-dimensional touch sensor system. For example, the electrodes 410a to 41 Oj and 412a to 412j of the channels 414a to 414j may extend substantially across the substrate layer to form a touch sensitive panel.

Figure 5 A shows a graph 500 of a simulated frequency response of the capacitive touch circuit 400 shown in Figure 4 when none of the channels 414a to 414j is touched. The simulation was produced in Spice™. As shown in Figure 5A, the circuit includes 10 resonant frequencies indicated by the 10 separate valleys or drops in the response decibel level. Figure 5B shows a graph 550 of a simulated frequency response of the capacitive touch circuit 400 shown in Figure 4 when the sixth channel 414f (shown in Figure 4) is touched. As shown, the sixth resonant frequency 552 (also shown in Figure 5A) has shifted from about 8.57 MHz to about 8.1 1 MHz, due to the capacitance of the channel increasing by 10pF. If the applied RF input is tuned to 8.57 MHz, then by touching the corresponding pair of ITO strips, the measured response signal amplitude of the capacitive touch circuit 400 will change the amount AdB shown in Figure 5B (which is approximately 15dB in this example). The change in response level, when detected, is treated as a touch event for the sixth channel 414f. The magnitude of the response may be an indication of extent to which the channel is being touched.

Figure 6 is a block diagram of a controller 600 for a capacitive touch sensor according to some embodiments. The controller 600 may be used to control the capacitive touch sensor circuit 400 shown in Figure 4 as well as other capacitive touch circuits in various devices. The controller includes a tunable RF signal generator 630 connected to controller output 631 , a detector 632 connected to controller input 633, a processor 634, and a memory 636. The processor 634 and memory 636 together act as control circuitry for the controller 600. The memory 636 may store processor executable instructions thereon that, when executed by the processor 634, cause the processor to control the RF signal generator 630 and the detector 632 as described herein. Control circuitry may comprise any combination of hardware (e.g. microprocessor, memory, or other hardware) and/or software and embodiments are not limited to the particular example shown in Figure 6. Output of the tunable RF signal generator 630 may be input to the capacitive touch sensor circuit (via connection to controller output 631 ) to excite a plurality of resonant circuits. The detector 632 is connected to the processor 634. The tunable RF signal generator 630 is connected to and controlled by the processor 634. The detector 632 receives and measures a response from the capacitive touch sensor circuit via controller input 633. The memory 636 is connected to the processor 634 and stores executable instructions thereon to cause the processor 634 to control the RF signal generator 630 and the detector 632 as described below. In other embodiments, the processor 634 may be configured without use of external memory to control the RF signal generator 630 and the detector 632.

The controller 600 shown in Figure 6 may be connected to control the capacitive touch circuit 400 shown in Figure 4. Specifically, the controller output 631 (Figure 6) may be connected to the RF signal input 404 (Figure 4) of the touch circuit 404, and the controller input 633 (Figure 6) may be connected to the circuit output connection 408 (Figure 4) of the touch circuit 400. In operation, the RF signal generator 630 of the controller 600 may sequentially scan the unique resonant frequencies of all channels 414a to 414j of the capacitive touch circuit 400 to detect and quantify the extent of touch events on the channels 414a to 414j. The channels 414a to 414j may be scanned sequentially or in any order. If more than one channel 414a to 414j is out of resonance, a multi-touch event is registered. The scanning sequence may follow a repeating sequence or a hopping pattern.

To perform the scanning functionality, the processor 634 of the controller 600 controls the RF signal generator 630 to selectively and sequentially generate RF signals at (or near) each of the unique resonance frequencies to excite the channels 414a to 414j. The detector 632 measures the response received by the controller (via controller input 633) at circuit output connection 408 in Figure 4 and passes the measurements to the processor. The detector 632 may include an Analog to Digital Converter (ADC) for converting the response to digital signals for transmission to the processor 634. The detector 632 and/or the processor 634 also include a comparator to compare the measured response levels to the expected non-touch response level. The processor 634 analyzes the measurements to detect touch events on the channels. For example, if there is a change from the expected amplitude response for a particular resonance frequency, then the processor 634 determines that the corresponding channel 414a to 414j corresponding to that resonance frequency is touched. The input generated by the RF signal generator may remain at a given selected frequency for period of time. When multiple capacitance changes are detected on multiple channels, the microcontroller may register a multiple touch event.

In other embodiments, some or all of the controller circuitry (including the tunable signal generator and/or the detector) may be integrated directly into a touch sensor panel rather than included in a separate controller.

A person skilled in the art will appreciate that other resonant circuit configurations may also be used where each resonant circuit of a group of resonant circuits has a different resonant frequency. The example circuit configuration shown in Figures 2 and 4 to 6 are provided by way of example, and embodiments are not limited to this configuration. Any suitable resonant circuits that can be provided with different resonance frequencies may be used, and embodiments are not limited to the LCR type circuits shown in the figures.

In some embodiments, measuring the response (e.g. by the detector 632 in Figure 6) is performed by measuring the amplitude of the voltage from the capacitive touch circuit.

In some embodiments, measuring the response (e.g. by the detector 632 in Figure 6) is performed by measuring the frequency of the voltage from the capacitive touch circuit.

In some embodiments, rather than individually and sequentially exciting each channel, two or more channels may be excited concurrently and the frequency response of multiple channels may be measured. For example, all of the plurality of channels may be excited at once (or in batches) using excitation signals having broad frequency content. Measuring the channel responses (e. g. by the detector 632 in Figure 6) may be performed by measuring the frequency component content of the resulting collective response signal as the energy of the excitation diminishes. In other words, the detector circuit may sample and analyze the resulting collective response of all the excited channels and discern the frequencies and/or amplitudes of each resonance to determine which channel(s) is/are touched and the extent of each touch.

In some embodiments, two perpendicular sets of channels may be used to provide a two-dimensional touch sensor (such as a touchscreen for a mobile device or other electronic display panel). The system may still only use a single RF source for channel excitation and a single touch registration response. Each of the channels of both perpendicular sets could be connected to the single output connection of the RF source and to the single input connection of a detector to enable scanning of both sets of channels.

Figure 7 is a top view of a touch sensor panel 700 according to another embodiment. The touch sensor panel 700 includes a substrate layer 702. Distributed on the substrate layer 702 are horizontal channels 704 and vertical channels 706. Each horizontal channel 704 is a resonant circuit including a respective capacitor 710 and inductor 712 connected to a pair of first and second horizontal electrode strips 704a and 704b in a manner similar to the channels 414a to 414j of Figure 4. Each vertical channel 706 is a resonant circuit including a respective capacitor 710 and inductor 712 connected to a pair of first and second vertical electrode strips 706a and a 706b in a manner similar to the channels 414a to 414j of Figure 4. A resistor 713 is also shown in Figure 7 and is arranged similarly to the resistor R in Figure 4.

Each channel 704 and 706 in Figure 7 has a unique combination of capacitance and inductance values to provide a unique resonance frequency (similar to the capacitive touch circuit 400 in Figure 4). The horizontal channels 704 and the vertical channels 706 are distributed on opposite respective faces of the substrate layer 702. For example, the vertical channels 706 may be on a top face 705, and the horizontal channels 704 may be on a bottom face (now shown), or vice versa.

Alternatively, the sets of horizontal and vertical channels 704 and 706 may be arranged on two different substrate layers (not shown) that are stacked on one another.

Alternatively, the sets of horizontal and vertical channels 704 and 706 may be arranged on the same substrate layers (not shown) with insulating material arranged to prevent direct contact. Any conventional method of arranging a two dimensional array of touch sensitive channels on one or more substrate layers may be used.

As seen in this example, the horizontal channels 704 extend between opposite side edges 714 and 71 6 of the substrate layer 702, while the vertical channels extend substantially from the top 718 to the bottom 720 of the substrate layer 702. Each channel may include a pair of electrodes, an inductor 712 and a capacitor 710 arranged similar to the channels 414a to 414j of the capacitive touch circuit 400 shown in Figure 4. The horizontal and vertical channels 704 and 706 are collectively connected to a single circuit input connection 724 and also collectively connected to a single circuit output connection 726 in this example. A controller (such as the controller 600 shown in Figure 6) including a tunable signal generator and/or detector may be connected (e.g. using wires) to the substrate layer 702 via the circuit input connection 724 and the circuit output connection 726 to scan the channels 704 and 706. The touch sensor panel 700 may be integrated together with a controller within a single device housing (not shown). For example, the housing may be in the form of a protective tablet housing complete with gaskets and/or other seals to protect the touch sensor panel 700, as well as other parts of a tablet. The touch sensor panel 700 may typically include a transparent protective layer (not shown) such as glass or plastic covering the substrate layer 702 and the channels 704 and 706. In other embodiments, some or all of the controller circuitry (including the tunable signal generator and/or the detector) may be integrated in to the touch sensor panel 700 rather than included in a separate controller.

Each channel the 704 and 706 has a unique resonance frequency. Thus, by scanning each of the channels 704 and 706 (by cycling through the resonance frequencies and detecting changes in response when tuned to each frequency), touch may be registered in two dimensions. The two dimensional arrangement of the channels 704 and 706 will create mutual capacitances between the channels. This may be taken into account when configuring how touch is detected.

A controller, such as the controller 600 shown in Figure 6, may selectively excite the channels 704 and 706 in the touch sensor panel 700 and may detect touch events. For two dimensional sensing, the controller may detect a touch event on at least one horizontal channel 704 and at least one vertical channel 706.

A single touch may affect and be detected for multiple channels to varying degrees. For example, a touch on one channel may also be detected at the adjacent channel(s) to a lesser degree. A touch between two channels may affect those two channels in a similar manner. By measuring the degree of response for multiple channels, a controller may infer the location of a touch event, even though that touch event is not directly over a given single channel.

As mentioned above, some embodiments may use a multilayer structure to create the capacitors in the resonant circuits (such as capacitors C1 to C10 in Figure 4). Examples of calculations of the capacitance that may be achieved using a multilayer structure are provided below. The usual dielectrics used in touch sensor panel manufacturing are polyethylene terephthalate (PET) and various kinds of adhesives. The dielectric constant of the PET is typically within the range of 3 to 3.5, and most suitable adhesive materials for holding dielectric layers (such as PET) together have dielectric constant around 1 .5. The thickness of the PET films varies between 50um to 250um, and the thickness of the adhesive layer is usually between 25 and 150um.

The above results mean that if a mutual capacitive touch sensor panel has ITO strips 1 cm wide each, and they cross each other at right angles, the capacitance of this two-layer structure at every intersection may be between 8.85pF to 62pF depending on the type and thickness of the dielectric substrate. This capacitance may be varied by changing the width of the strip or by adding areas on the periphery of the touch sensor panel. If more than two layers are used this addition may take very little room on the side of the touch sensor panel, since the capacitance doubles, triples, etc. For a self-capacitive touch sensor panel, on the other hand, there may be only a single layer of dielectric substrate. Thus, to increase capacitance may require increasing the capacitance area. Thus, electrodes and/or fixed capacitor elements of resonant circuits with a desired capacitance may be created using planar conductors (e.g. ITO or metal) on a substrate layer.

In some embodiments, inductors (such as the inductors L1 to L10 in Figure 4) may be deposited on the dielectric substrate layer, similar to electrode strips. For example, planar spiral inductors may be used in some embodiments. Planar spiral inductors may be less expensive than either chip or coil inductors for surface based designs. Each inductor may include at least one layer of a conductor on a substrate layer. The one or more conductor layers may define one or more spiral-shaped inductor coils.

A multilayer inductor creates mutual inductance. For a two layer inductor, the following two equations may be used for the coupling value, Kc, to obtain the total inductor value with a mutual inductance:

$Lt = L1 + L2 + 2*Kc*(L1 + L2)^2$

When both inductor layers have the same pattern, the formula is simplified:

$Lt = 2L^{*}(1 + Kc^{*}C)$

From experiment, the coupling coefficient Kc may be approximately in the range of 0.5 - 0.7 on a standard Printed Circuit Board (PCB) with 62 mil thickness.

Figures 8A to 8D show example planar inductor coils, according to some embodiments, that may be deposited or printed onto a substrate.

Figure 8A is a top view of an inductor 802 with a square spiral shape. Other spiral types are also possible for inductors. Example spiral shape types include, but are not limited to circular, oval, square, polynomial spiral, etc. The inductor 802 in this example is created by depositing silver ink or metal mesh on a glass or transparent polyester layer. The inductor 802 is a single layer inductor with 10mm outer diameter DOUT1, traces having 125um width W1 that are spaced apart by a 125um trace spacing S1, and having 15 turns. The inner diameter DIN1 shown in Figure 8A is 2.75mm. This inductor may, for example, have approximately 1.64 uH inductance, although embodiments are not limited to any particular inductance. The inner diameter DIN provides space for a ferromagnetic core (not shown) that may be inserted.

For a two layer structure, with each layer using a layout similar to those shown in Figure 8A, the coupling coefficient Kc has been found to be approximately 0.5 for experiments with a 62 mil thick PCB. However, for a thinner PCBs the coupling coefficient Kc may be higher. Assuming that Kc = 0.5, the total inductance of a two layer structure may be approximately $2*1.64uH*(1+0.5) = 4.92$ uH. A four-layer inductor may have the value of 14.76 uH, and an eight-layer inductor may have 44.28 uH. A ferromagnetic core in the center of the inductor may increase the inductance value even further.

The total resistance of the coil of an inductor may be very important. The total length of a single layer flat inductor may be calculated. Using the layout of the inductor 802 in Figure 8A, the estimated length would be approximately 60 cm for a single layer inductor. If the inductor 802 is printed from silver ink, which has a resistivity approximately twice as high as the resistivity of pure silver and equals to $2*10^{-6}$ Ohms/cm, the total DC resistance of the single layer inductor 802 may be approximately 3.2 Ohms. A two layer or two-sided inductor using the same layout may have a DC resistance of 6.4 Ohms. A four layer or four-sided inductor may be approximately 12.8 Ohms. An eight layer or eight-sided inductor may be approximately 25.4 Ohms.

The series resistance of the coil affects the LCR quality factor Q. The quality factor Q may be calculated by the formula $Q=1/R*SQRT(L/C)$, where R is the series resistance, L is the inductance and C is the capacitance. The quality factor Q may need to be at least 10 for the circuit to properly resonate. A higher Q factor may also provide better frequency resolution (channel separation) of the frequency response curve, such that the resonance frequencies of the channels may be placed closer to each other occupying less overall frequency band. To increase the Q factor, it may be necessary to lower the series resistance and/or raise the inductance of the inductor. It may be less practical to alter capacitance to increase the Q factor because the capacitance value may need to stay in the same order of magnitude as the finger touch, which may be around 10pF.

Figure 8B is a top view of an inductor 804 with a hexagonal spiral shape. The values of DOUT2, DIN2, W2 and S2 shown in Figure 8B may be the same or different than DOUT1, DIN1, W1 and S1 shown in Figure 8A depending on the desired inductance.

Figure 8C is a top view of an inductor 806 with an octagonal spiral shape. The values of DOUT3, DIN3, W3 and S3 shown in Figure 8B may be the same or different than DOUT1 , DIN1 , W1 and S1 shown in Figure 8A depending on the desired inductance.

Figure 8D is a top view of an inductor 808 with a circular spiral shape. The values of DOUT4, DIN4, W4 and S4 shown in Figure 8B may be the same or different than DOUT1 , DIN1 , W1 and S1 shown in Figure 8A depending on the desired inductance. The inductance of the example inductors in Figures 8A to 8D depends on the exact materials (substrate and conductor) used as well as the geometry of the inductor coil. The inductance may range from 1 µH to 100 µH, for example, depending on the specific dimensions and materials.

By varying the dimensions of the inductors 802, 804, 806 and 808 in Figures 8A to 8D, including the number of turns, a variety of inductances may be provided as desired. For example, using such designs, variations in the inductances may be provided for achieving multiple unique resonance frequencies in a capacitive touch circuit (such as the circuit 400 shown in Figure 4). For example, a plurality of similar inductors could be arranged on a PCB, for either one or two dimensional sensing, with each inductor having a slight variation in one or more dimensions.

The flat inductors made of several layers of silver ink or other conductor printed of a dielectric film have their own capacitance. This capacitance of the inductor may be used as a capacitance part of a resonant circuit, such that an additional external capacitor is not needed. When the number of turns in the inductor coil changes, both the inductance and self-capacitance change, thereby also changing the resonance frequency of the resonant circuit. Thus, by using different numbers of coil turns and/or geometrical variations for inductors in different channels, different resonance frequencies for the channels may achieved.

Figure 9 shows a layout of an example capacitive touch sensor circuit 900. The capacitive touch sensor circuit 900 may be manufactured as a copper-on-PCB circuit. The capacitive touch sensor circuit 900 includes ten resonant circuits 902a to 902j forming ten respective channels 904a to 904j that are similar to the channels 414a to 414j in Figure 4. The number of channels may vary in other embodiments. Each resonant circuit 902a to 902j includes a respective planar inductor 906a to 906j deposited on the PCB and a respective chip capacitor 908a to 908j. The channels 904a to 904j, inductors 906a to 906j and capacitors 908a to 908j are connected similar to the capacitive touch sensor circuit 400 shown in Figure 4.

Each planar inductor 906a to 906j is a square spiral structure similar to that of the inductor 802 shown in Figure 8A, but with several more turns. The planar inductors 906a to 906j all have the same dimensions and inductance. Unique resonance frequencies in this example are provided by varying the capacitance of varying capacitances of the capacitors 908a to 908j.

Figure 10 is an enlarged view of the layout of the first single resonant circuit 902a of the touch circuit 900 of Figure 9, including the first channel 904a, the first inductor 906a and the first capacitor 908a. Ground connection 910a and circuit input connection 912a are also visible in Figure 10. The remaining resonant circuits 902b to 902j (shown in Figure 9) are similarly connected.
Turning again to Figure 9, to obtain an operating frequency range in the single digit megahertz range the value of the inductors 906a to 906j should be in the single digit microhenry range. On the experimental touch panel circuit that was manufactured, the inductors 906a to 906j were manufactured as square two-layer inductors. The inductors 906a to 906j each have approximate dimensions of 13x13mm, conductive trace width of 0.2mm with spacing in between of 0.2 mm, and 14 turns. The measured value of the inductance was approximately 3.9 uH, which was confirmed by the resonant frequency calculation and measurement. The capacitors 908a to 908j are ceramic capacitors of the standard 0603 size, although the particular capacitor used in other embodiments may vary.

The manufactured inductors 906a to 906j have shown the following approximate results (per inductor): single side inductance is 1 .13 uH; total inductance is 3.90 uH, mutual magnetic coupling is 0.72; inductor series resistance is 2.75 Ohms; and parasitic capacitance of capacitor pads is between 7.4 pF and 8.1 pF. To decrease the size of the planar coil inductor, a multilayer structure may be used. When the number of layers doubles, the inductance may almost triple because of the mutual inductance between the layers contributes.

The value of inductance may be increased, or the size may be decreased keeping the same value, by inserting a ferrite core inside the coil. Including such a ferrite rod may increase the resonance frequency, based on some experimentation.

Figure 1 1 is a graph 1 100 of a frequency response obtained for the capacitive touch circuit 900 of Figure 9. As seen in Figure 1 1 , the frequency response shows 10 separate valleys indicating different resonance frequencies for the ten channels.

While the examples described above include two electrode strips per channel, with one electrode strip in each channel connected to ground, other embodiments may not include electrodes connected to ground as part of the channel. Rather, some embodiments may utilize channels that comprise a single electrode and omit the second electrode connected to ground.

Government regulations and physical constraints limit the total bandwidth available for use in a touchscreen device (e.g. an RF touchscreen), which limits the number and spread of resonance frequencies that may be used. For this or other reasons it may be desirable to limit the number of resonance frequencies used in a touch sensor device. In some embodiments, a touch sensor device may include two or more sets of resonant circuits (forming two or more sets of channels). Specifically, the touch sensor device may include a first plurality or set of resonant circuits as described above, as well as one or more additional pluralities or sets of resonant circuits. Each of the sets of resonant circuits may include one or more electrodes distributed on the substrate layer. For example, the first set could form horizontal channels, and a second set could form vertical channels. Alternatively, different sets of channels (resonant circuits) could provide coverage for different areas of a panel. Each set of resonant circuits may have a corresponding set of resonance frequencies, each being unique within the respective set.

Each set of resonant circuits may include a separate input connection (e.g. connected to a controller having a signal generator). Output from a single tunable signal generator may be switched between inputs for the sets of resonant circuits to selectively excite sets of resonant circuits. For example, switching circuitry may be connected to the tunable signal generator for selectively driving the sets of resonant circuits. Two or more sets of resonant circuits may include one or more common (i.e. same or substantially similar) resonance frequencies. Thus, the resonance frequencies for two or more sets of resonant circuits may at least partially overlap. Thus, signals from a single tunable signal generator may be used to excite and scan multiple sets of resonant circuits having at least some common resonance frequencies. In this manner, the total number of resonance frequencies used in a touch circuit device may be less than the total number of resonant circuits, but the number of connections (e.g. wires) needed to connect to the resonant circuits (i.e. channels) for scanning may still be reduced in comparison to conventional touch sensor devices. Alternatively, two or more tunable signal generators may be separately connected to excite two or more respective sets of resonant circuits. In still other embodiments, two or more signal generators may be used to excite separate sets of resonant circuits.

Figure 12 is a top view of a layout for a capacitive touch sensor panel 1200 (in the form of a panel) according to yet another embodiment. The capacitive touch panel includes conductor elements discussed below printed, deposited or etched on a substrate. The substrate in this example is a PCB and including a top PCB layer 1202 and a bottom PCB layer that underlays the top PCB layer in this example, although another substrate (such as a transparent substrate) may be used as well. The touch sensor panel 1200 is a single plane pattern.

The capacitive touch sensor panel 1200 in this embodiment includes horizontal channels 1204 and vertical channels 1206. In this embodiment, each of the vertical and horizontal channels 1206 is arranged as part of resonant circuits similar to the resonant circuits 402a to 402j in Figure 4, but with no electrode connected directly to physical ground. Instead, each channel 1204 and 1206 includes a single electrode 1212 or 1214, which has a diamond pattern as discussed below. In this capacitive touch sensor panel 1200, the human finger (for example) acts as a virtual path to ground (via anything touched by the user).

The capacitive touch sensor panel 1200 may be manufactured using copper (or another conductor) on the top PCB layer 1202 and the bottom PCB layer. In this embodiment the electrodes 1214 of the vertical channels 1206 are formed on a top surface (not visible in Figure 12) of the bottom PCB layer. The conductor portions of the vertical channels 1206 including the electrodes 1214 are shown as solid black in Figure 12 for illustrative purposes, but would normally not be visible through the top PCB layer 1202. The electrodes 1212 of the horizontal channels 1204 are formed on a bottom surface (not visible in Figure 12) of the top PCB layer 1202, and thus face the electrodes 1214 of the vertical channels 1206. The conductor portions of the horizontal channels 1204 including the electrodes 1212 are shown as outlined white in Figure 12 for illustrative purposes, but would not normally be visible through the top PCB layer 1202. To prevent contact between the vertical channels 1206 and the horizontal channels 1204, an insulating layer (such as a solder mask) is provided between the horizontal and vertical channels 1204 and 1206. In other embodiments, a single substrate layer (e.g. PCB or a transparent substrate) may be used with horizontal channels on one face of the substrate layer, and horizontal channels on the opposite face. Embodiments are not limited to any particular arrangement of multiple layers of channels and/or substrate layers.

Each horizontal channel 1204 and each vertical channel 1206 includes a respective pair of a lumped capacitor 1208 or 1218 and a lumped inductor 1209 or 1219 (as opposed to PCB traces for planar inductors and/or capacitors). The lumped capacitors 1208 for the horizontal channels 1204 are each indicated by the respective vertically arranged capacitor icon 1208 shown in first legend section 1230 of Figure 12. The lumped inductors 1209 for the horizontal channels 1204 are each indicated by the respective horizontally arranged inductor icon 1209 shown in the first legend section 1230. The lumped capacitors 1218 for the vertical channels 1206 are each indicated by the respective horizontally arranged capacitor icon 1218 shown in second legend section 1232 of Figure 10. The lumped inductors 1219 for the horizontal channels 1204 are each indicated by the respective vertically arranged inductor icon 1219 shown in the second legend section 1232.

The horizontal channels 1204 are collectively connected to a first input/output connection 1240 and are collectively connected to ground 1242 (with each horizontal channel 1204 having the corresponding capacitor 1208 and inductor 1209 connected in series between the first input/output connection 1240 and ground 1242). The vertical channels 1206 are collectively connected to a second input/output connection 1244 and are also collectively connected to ground 1242 (with each horizontal channel 1206 having the corresponding capacitor 1218 and inductor 1219 connected in series between the second input/output connection 1244 and ground 1242).

The horizontal channels 1204 each have a different respective resonance frequency. The vertical channels 1206 each have a different respective resonance frequency. The resonance frequencies for the horizontal channels 1204 and the resonance frequencies for the vertical channels 1206 partially overlap in this embodiment. In particular, the capacitive touch sensor panel 1200 includes twelve horizontal channels 1204 and sixteen vertical channels 1206. For each horizontal channel 1204, the respective capacitor 1208 and inductor 1209 pair are a different combination of capacitance and inductance to provide a resonance frequency for each channel 1204 and 1206 that is different than the other horizontal channels. The vertical channels 1206 similarly each have a respective resonance frequency, provided by the capacitors 1218 and inductors 1219, that is different than the other vertical channels. The twelve resonance frequencies for the horizontal channels 1204 are repeated for the vertical channels 1206, and the vertical channels 1 206 include four additional frequencies (for 1 6 total). However, it is to be understood that the number of unique frequencies may vary. For example, the number and/or spread of frequencies used may depend on needs of the device and/or government regulations.

The capacitors 1208 and 1218 and inductors 1209 and 1219 may all be located on a top surface 1222 of the top PCB layer 1202 and connected through the top PCB layer 1202 and the bottom PCB layer (not shown) to the electrodes 1212 and 1214, respective first and second input/output connections 1240 and 1244 and ground 1242 as needed. Other arrangements are also possible. Any suitable arrangement connecting circuit elements together into the layout shown in Figure 12 may be used.

A touch event on the capacitive touch sensor panel 1200 may register a change in capacitance for at least one horizontal channel 1204 and at least one vertical channel 1206, thereby enabling a determination of a position of the touch event in two dimensions.

As shown in Figure 12, each of the vertical and horizontal channels 1204 and 1206 includes the single elongated electrode strip 1212 or 1214 that each form several consecutive diamond shapes 1215 along their length. These diamond shapes 1215 do not overlap. Rather, horizontal channels 1204 intersect (but do not make contact with) the vertical channels 1206 at narrow portions 1252 of the electrodes 1212 and 1214 between adjacent diamond shapes 1215.

The electrodes 1212 and 1214 are not directly connected to a ground plane, and the capacitors 1208 and 1218 and inductors 1209 and 1219 do not overlap on the ground plane. Therefore, the electrodes 1212 and 1214 will "hover" (in an electrical voltage sense) over the top PCB 1202 layer and the bottom PCB layer (not shown). The horizontal and vertical channels 1204 and 1206 are connected to a physical ground via ground connection 1242. The touch of a finger provides a virtual ground through the body. Thus, when a human finger is applied to the touch sensor panel 1200, the measured amplitude response will increase due to the change in capacitance, despite the absence of the ground plane. In an experimental setting, the layout described above provided a response amplitude change of 5 to 6 percent from a touch event.

Figure 13 is a block diagram of a controller 1300 that may be connected to control the touch sensor panel 1200 shown in Figure 12. The controller 1300 includes control circuitry comprising a processor 1302 and a memory 1304. As mentioned above, other control circuitry arrangements may also be used. The controller 1300 further comprises a tunable RF signal generator 1306, a detector 1308 and a switch 1310. The memory 1304 stores computer-executable code thereon for causing the processor 1302 to perform functions described below. In other embodiments, the memory 1304 may be incorporated as part of the processor 1302, rather than external to the processor 1302 as shown in Figure 13. The processor 1302 is also connected to communicate with the tunable RF signal generator 1306, the detector 1308, and the switch 1310. The communication may include providing control signals to the tunable RF signal generator 1306, the detector 1308 and the switch 1310, as well as receiving, as input, data output from the detector 1308.

A first output terminal 1312 of the controller 1300 may be connected to the first input/output connection 1240 for horizontal channels 1204 of the touch sensor panel 1200 of Figure 12 to excite the horizontal channels 1204. A second output terminal 1314 of the controller 1300 may be connected to the second input/output connection 1244 for vertical channels 1206 of the touch sensor panel 1200 of Figure 12 to excite the vertical channels 1206.

RF signals generated by the tunable RF signal generator 1306 are selectively output through the switch 1310 to either a first output terminal 1312 or a second output terminal 1314 as directed by the processor 1302. The tunable RF signal generator 1306 in this example is capable of selectively generating signals (for input to the touch sensor panel 1200) at (or near) each of the resonant frequencies of the horizontal and vertical channels 1204 and 1206 (shown in Figure 12). The processor 1302 controls the switch 1310 and the tunable RF signal generator 1306 to scan each of the horizontal and vertical channels 1204 and 1206. For example, the switch 1310 may first be set to direct the RF signals to the first output terminal 1312 while the tunable RF signal generator 1306 cycles through all of the resonance frequencies for the horizontal channels 1204. Then the switch 1310 may be set to direct the RF signals to the second output terminal 1314 terminal while the tunable RF signal generator 1306 cycles through all of the resonance frequencies for the vertical channels 1206. Other scanning sequences may also be used (including hopping sequences).

The detector 1308 in this example includes an ADC 131 6 and a comparator 1318. The detector 1308 is connected to controller input terminal 1320 to receive, as input, the response output from the touch sensor panel 1200 (shown in Figure 12). The controller input terminal 1320 may also be connected to the first and second output connections 1240 and 1244 of the touch sensor panel 1200 to measure the response of the horizontal and vertical channels 1204 and 1206 (shown in Figure 12). The detector 1308 receives analog output from the touch sensor panel 1200 and first converts the analog signal to digital values using the ADC 131 6. The digital values are compared to expected response levels (e.g. expected response for no touch event) by the comparator 1318. The comparison data from the comparator 1318 is passed to the processor 1302. Based on the output from the detector 1308, the current state of the switch 1310 and the current selected resonance frequency, the processor determines which of the horizontal channels 1204 and which of the vertical channels 1206 (shown in Figure 12) is currently touched.

The tunable RF signal generator 1306 may include a synthesizer chip or circuit. The switch 1310 of the controller 1300 may include a PIN diode (not shown) that can divert the RF signal from the tunable RF signal generator 1306 to the first or second output terminals 1312 and 1314. The processor 1302 (or possibly the switch 1310) may include a switch driver control circuit that controls the PIN diode. The switch driver control circuit may turn the PIN diode on and off, for example, by applying a forward or reverse bias. The switch driver control circuit may use a low-pass filter between the RF signal generator and the switch. Figure 14 is a graph 1400 of a frequency response obtained for the capacitive touch sensor panel 1200 of Figure 12. A first, solid line 1302 is shown for the frequency response of the horizontal channels 1204 and a second, dotted line 1304 is shown for the frequency response of the vertical channels 1206. The first line 1302 shows 12 valleys or drops for the 12 resonant frequencies of the horizontal channels 1204, and the second line 1304 shows 1 6 valleys or drops for the resonance frequencies of the vertical channels 1206. As shown, the resonant frequencies of the horizontal channels 1204 (Figure 12) shown by dips or valleys in line 1302 are close to several of the resonant frequencies of the vertical channels 1206 (Figure 12) shown by line 1304. In other words, at least some of the resonant frequencies of the horizontal channels 1204 are the same or similar to at least some of the resonant frequencies of the vertical channels 1206. Thus, the total number of resonant frequencies needed to scan all of the channels 1204 and 1206 may be less than the total number of channels 1204 and 1206. An exact match of the overlapping resonant frequencies is not necessary to allow a single frequency to be used to scan both a horizontal channel 1204 and a vertical channel 1206.

A controller of the capacitive touch circuits described herein may include functionality for programming or configuring the controller. Such software may provide a graphical interface on a PC. Such software may be created with Borland visual C++ Builder, for example. The software may include various functions and components including, but not limited to: a block of library; the description of variables; the USB block of the Open Communication Port; the ADC block of the Read File; the block of decision of the solution; the visual block that created the graphic interface. The graphic interface may show an image that represents the area covered by channels. The graphic interface may also include controls such as a "start button", selecting service information, and may display a graphical indicator in the displayed area to represent a detected touch. If multiple touches are detected, two or more graphical indicators to represent the touches may be shown. The touches will be detected at different times due to the sequential scanning. However, the speed of change of the applied RF signal for the scanning is very high, and the touch sensor panel indicators appears as simultaneous multi-touch.

Figure 15 is a flowchart of a method for controlling a touch sensor (such as the touch sensor circuits 400 and 900 shown in Figures 4 and 9 or the touch sensor panels 700 and 1200 shown in Figure 12) according to some embodiments. The touch sensor capacitive touch sensor includes a plurality of resonant circuits, each resonant circuit comprising at least one respective electrode, and each resonant circuit having a respective resonance frequency unique within the plurality of resonant circuits. In other embodiments, one or more resonant circuits may have the same resonant frequency (i.e. resonant frequencies may overlap). At block 1502, input signals at (or near) each of the resonance frequencies are sequentially generated for input to the resonant circuits. The generating step at block 1502 may include selectively generating signals to excite the resonant circuits at (or near) each of the resonance frequencies in a cyclic or hopping pattern, as described above. At block 1504, the response of the resonant circuits is measured to detect and quantify the extent of touch. This measurement may include ADC conversion and/or comparison as described above. The method may be adapted for controlling any of the touch sensor panels described above and may include the performing the functions of the controllers (such as controllers 600 and 1300 of Figures 6 and 13) described above.

The controller for a touch sensor (such as the controller 600 or 1300 shown in Figures 6 and 13) may be provided separately from the touch sensor panel. Since only a single input and single output may be required for various sizes, a single controller may be configured to work with touch sensor panels of various sizes and sensor resolutions.

In some embodiments, a single touch panel may include multiple sets of channels, where each set of channels is connected to a respective input connection of a detector and output connection of a signal generator. For example, one set of horizontal channels could have first input/output connection, and a second set of vertical channels could have second input/output connection. Each set of channels may be scanned selectively by a controller. Alternatively, a large panel may have multiple designated areas, where the channels in each area form their own circuit as described above, with their own input and output. A single controller may still control the multiple sets of channels (with resonant circuits), provided the necessary number of inputs and outputs are provided. A first set of resonance frequencies for a first set of channels may be repeated for a second set of channels that are on a different circuit.

In some cases, the value of the capacitor forming an LC resonant filter circuit has a magnitude that is not orders of magnitude larger than the capacitance introduced by a touch (i.e. "touch capacitance). In such cases, the capacitance value of the capacitor of the LC resonant filter circuit may be in the same range or even smaller than the touch capacitance. Use of the additional capacitance in series between the LC resonant filter circuit may set an upper limit on (and therefore control) the extent to which the touch capacitance alters the resonant frequency of the resonant circuit.

The available frequency band may be limited: (a) at the upper end by the 'skin effect' which causes reduced conductivity in any conductor at higher frequency; and (b) at the lower frequency end by a combination of (i) lower quality factor (broader) resonances inherent in the use of larger inductor values and (ii) a diminishing ability to discern the small capacitance change caused by a touch against a very large resonant capacitor value.

Figure 1 6 is a partial view of a modified version of the capacitive touch circuit 400 of Figure 4. Specifically, a modified version of resonant circuit 402a is shown. The remaining resonant circuits 402b to 402j shown in Figure 4 and/or other resonant circuits described herein may be similarly modified. The RF signal input 404, the resistor R, and the ground 406 are also shown.

As shown in Figure 16, a capacitor Cs is connected in series between the first ITO strip 410a (i.e. the touch electrode) and the resonant filter (comprising L1 and C1 ). Including series capacitors Cs in some or all of the resonant circuits 402a to 402j may allow the resonant frequencies for the resonant circuits 402a to 402j to be more narrowly spaced because the frequency swings caused by touches may be reduced, thereby reducing potential overlap between neighboring channels. The resonant frequency of a given channel is nominally 1 /(2*pi*sqrt(L*C)), and thus, lower capacitances (C) may be more likely to be used for higher frequencies. The series capacitor CS shown in Figure 1 6 may have the following benefits. It may allow slightly higher frequency channels to be used, and/or it may allow more channels to be squeezed into the available band.

The embodiments described herein may reduce the number of input and output connections required for capacitive touch sensor devices. Reducing the number of inputs and outputs required may allow for better use of space around the edges of a substrate layer, reduce controller complexity and increase the adaptability of the controller for use with different sensor devices. Furthermore, a single controller may be programmed to function with multiple differently configured touch sensor devices. The reduction in the amount of wires to be connected to the inputs and outputs may allow a single controller to be configured for both small and large panels by configuring the scanning process (e.g. the frequencies to be scanned).

It is to be understood that a combination of more than one of the approaches described above may be implemented. Embodiments are not limited to any particular one or more of the approaches, methods or apparatuses disclosed herein. One skilled in the art will appreciate that variations, alterations of the embodiments described herein may be made in various implementations without departing from the scope of the claims.--